United States Patent
Nagatomi et al.

(10) Patent No.: US 11,500,219 B2
(45) Date of Patent: Nov. 15, 2022

(54) DISPLAY SYSTEM

(71) Applicant: Panasonic Intellectual Property Management Co., Ltd., Osaka (JP)

(72) Inventors: Kenji Nagatomi, Osaka (JP); Norihiro Imamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/364,094

(22) Filed: Jun. 30, 2021

(65) Prior Publication Data
US 2022/0004013 A1  Jan. 6, 2022

(30) Foreign Application Priority Data

Jul. 3, 2020 (JP) .............................. JP2020-115490
Jul. 3, 2020 (JP) .............................. JP2020-115555
Mar. 12, 2021 (JP) .............................. JP2021-040844

(51) Int. Cl.
*G02F 1/1333* (2006.01)
*G02B 27/14* (2006.01)
(Continued)

(52) U.S. Cl.
CPC ............. *G02B 27/14* (2013.01); *G02B 5/208* (2013.01); *G02B 5/3025* (2013.01);
(Continued)

(58) Field of Classification Search
CPC ...................................................... G02B 27/14
See application file for complete search history.

(56) References Cited

U.S. PATENT DOCUMENTS 5,699,194 A   12/1997  Takahashi
10,017,114 B2  7/2018  Bongwald
(Continued)

FOREIGN PATENT DOCUMENTS

JP  H09-219832 A  8/1997
JP  5286750 B2   9/2013
(Continued)

OTHER PUBLICATIONS

Office Action issued in Japan Counterpart Patent Appl. No. 2021-040844, dated Mar. 8, 2022, along with an English translation thereof.

*Primary Examiner* — Sang V Nguyen
(74) *Attorney, Agent, or Firm* — Greenblum & Bernstein, P.L.C.

(57) ABSTRACT

A display system includes: a display element that includes a display surface through which light showing an image is emitted; a concave mirror that reflects the light emitted through the display surface of the display element; and an optical element that includes a wave plate and a transmissive polarizing plate that is a polarizing element, the optical element facing the concave mirror. The concave mirror and the optical element are each provided separately from the display element. The optical element (i) transmits reflected light resulting from the light emitted through the display surface of the display element being reflected by the concave mirror, and (ii) reflects light from outside off a surface of the optical element, the surface facing the concave mirror, the light from the outside entering the optical element from a side through which the reflected light exits, and being reflected by the concave mirror.

18 Claims, 36 Drawing Sheets

(51) Int. Cl.
  *G02B 5/20* (2006.01)
  *G02B 5/30* (2006.01)
  *B60R 1/00* (2022.01)

(52) U.S. Cl.
  CPC ..... *G02B 5/3083* (2013.01); *G02F 1/133308* (2013.01); *B60R 1/00* (2013.01); *B60R 2300/20* (2013.01); *B60R 2300/8046* (2013.01)

(56) References Cited

U.S. PATENT DOCUMENTS

| | | | |
|---|---|---|---|
| 11,110,861 B2 | 9/2021 | Imamura et al. | |
| 2018/0345860 A1* | 12/2018 | Imamura | G02B 27/0025 |
| 2020/0070729 A1* | 3/2020 | Imamura | B60R 1/07 |
| 2020/0377021 A1* | 12/2020 | So | B60R 1/12 |
| 2021/0129755 A1 | 5/2021 | Imamura et al. | |
| 2021/0197725 A1 | 7/2021 | Imamura et al. | |
| 2021/0261058 A1 | 8/2021 | Nagatomi et al. | |

FOREIGN PATENT DOCUMENTS

| | | | | |
|---|---|---|---|---|
| JP | 2014-213763 A | | 11/2014 | |
| JP | 2017-210229 A | | 11/2017 | |
| JP | 2019-078784 A | | 5/2019 | |
| JP | 2020-037379 A | | 3/2020 | |
| WO | WO-2016017114 | * | 2/2016 | G02B 27/01 |

* cited by examiner

DISPLAY SYSTEM

CROSS REFERENCE TO RELATED APPLICATIONS

The present application is based on and claims priority of Japanese Patent Application No. 2020-115490 filed on Jul. 3, 2020, Japanese Patent Application No. 2020-115555 filed on Jul. 3, 2020, and Japanese Patent Application No. 2021-040844 filed on Mar. 12, 2021.

FIELD

The present disclosure relates to a display system for displaying an image.

BACKGROUND

A so-called electron mirror is known which displays an image of a rear view captured by a camera provided in a vehicle, on a rearview-mirror display device in the vehicle (for example, see Patent Literature (PTL) 1).

The display device according to PTL 1 includes a display stored in an overhead console of the vehicle, and a concave mirror suspended from a windshield of the vehicle. The display displays a rear-view image captured by the camera.

Light showing the rear-view image from the display is reflected by the concave mirror and enters the eye(s) of the driver. The driver sees a virtual image of the rear-view image as if the rear-view image were displayed at a display position ahead of the concave mirror in the front-and-rear direction of the vehicle, by viewing the rear-view image reflected by the concave mirror.

CITATION LIST

Patent Literature

PTL 1: Japanese Patent No. 5286750

SUMMARY

The conventional display device described above, however, is susceptible of a further improvement.

In view of this, the present disclosure provides a display system that achieves further improvement over the conventional display device.

A display system according to an aspect of the present disclosure is a display system that is provided in a mobile body and displays an image to a user, the display system including: a display element that includes a display surface through which light showing the image is emitted; a first mirror that reflects the light emitted through the display surface of the display element; and an optical element that includes a wave plate and a polarizing element, the optical element facing the first mirror. The first mirror and the optical element are each provided separately from the display element, and the optical element (i) transmits reflected light resulting from the light emitted through the display surface of the display element being reflected by the first mirror, and (ii) reflects light from outside off a surface of the optical element, the surface facing the first mirror, the light from the outside entering the optical element from a side through which the reflected light exits, and being reflected by the first mirror.

According to a display system according to an aspect of the present disclosure, further improvement can be achieved over the conventional display device.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
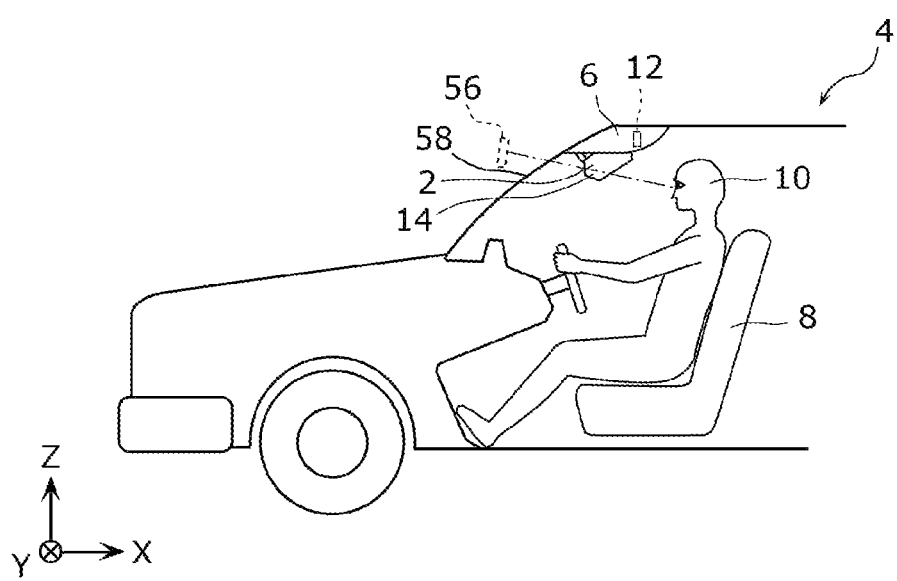
FIG. 1 illustrates an example of a vehicle provided with a display system according to Embodiment 1.

DESCRIPTION OF EMBODIMENTS (Underlying Knowledge Forming Basis of the Present Disclosure)

The present inventors have found that the display device stated in the "Background" section has a problem as follows.

The display device according to PTL 1 has a problem that the concave mirror is exposed outside the overhead console, and thus light from the outside (such as, for example, light from headlights of a vehicle behind or sunlight), which has entered from the rear of the vehicle, is reflected in the concave mirror.

In order to address such a problem, a display system according to an aspect the present disclosure is a display system that is provided in a mobile body and displays an image to a user, the display system including: a display element that includes a display surface through which light showing the image is emitted; a first mirror that reflects the light emitted through the display surface of the display element; and an optical element that includes a wave plate and a polarizing element, the optical element facing the first mirror. The first mirror and the optical element are each provided separately from the display element, and the optical element (i) transmits reflected light resulting from the light emitted through the display surface of the display element being reflected by the first mirror, and (ii) reflects light from outside off a surface of the optical element, the surface facing the first mirror, the light from the outside entering the optical element from a side through which the reflected light exits, and being reflected by the first mirror.

According to this aspect, the optical element includes a wave plate and a polarizing element, and faces the first mirror. Accordingly, even if, for example, light from the outside enters the optical element from the rear of the mobile body, the light from the outside passing through the optical element is reflected by the first mirror, and thereafter is reflected by a surface of the optical element that faces the first mirror. As a result, light from the outside can be prevented from being reflected in the first mirror.

The display system according to an aspect of the present disclosure further includes: an optical reflector that is supported rotatably relative to the mobile body, and includes: an entrance through which the light emitted through the display surface of the display element enters, the display element being fixed to the mobile body; an exit through which the light that has entered exits and travels toward an eye of the user; the first mirror; and the optical element disposed at the exit. The light emitted through the display surface of the display element is reflected at least once by the first mirror, passes through the wave plate and the polarizing element of the optical element in a stated order, and enters the eye of the user.

According to this aspect, the optical element includes a wave plate and a polarizing element, and is disposed at the exit of the optical reflector. Accordingly, even if, for example, light from the outside enters the optical element from the rear of the mobile body, the light from the outside is greatly attenuated by the polarization effect yielded by the optical element when the light from the outside passing through the optical element is reflected by the first mirror and passes through the optical element again. As a result, light from the outside can be prevented from being reflected in the first mirror.

For example, the optical reflector may further include: a second mirror that faces the display surface of the display element, and is disposed on an optical path between the display surface of the display element and the first mirror.

According to this aspect, the optical reflector includes a second mirror, and thus the light emitted through the display surface of the display element is reflected by the optical reflector multiple times, and thereafter passes through the optical element and enters the eye(s) of a user. Accordingly, the length of an optical path along which light emitted through the display surface of the display element travels until the light is reflected by the first mirror can be ensured, and thus the viewing distance from the eye(s) of the user (driver) up to the display position of a virtual image of an image can be extended.

For example, the second mirror may face the optical element, the polarizing element may be a reflective polarizing plate, and the light emitted through the display surface of the display element may be reflected by the second mirror toward the optical element, may be reflected by the optical element toward the first mirror, may be reflected by the first mirror toward the optical element, may pass through the optical element, and may enter the eye of the user.

According to this aspect, the light emitted through the display surface of the display element (i) is reflected by the second mirror, (ii) is reflected by the optical element, and (iii) is reflected by the first mirror and thereafter passes through the optical element and enters the eye(s) of the user. Accordingly, the length of an optical path along which light emitted through the display surface of the display element travels until the light is reflected by the first mirror can be ensured, and thus the viewing distance from the eye(s) of the user up to the display position of a virtual image of an image can be extended.

For example, the optical element may extend over the entrance and the exit of the optical reflector, and the light emitted through the display surface of the display element may pass through the optical element toward the second mirror, and may be reflected by the second mirror.

According to this aspect, the optical element extends over the entrance and the exit of the optical reflector, and thus when unnecessary light that does not contribute to displaying an image enters the optical element, the polarizing element of the optical element can block the unnecessary light.

For example, the optical reflector may further include a half mirror disposed at the entrance, between the display element and the second mirror, and the light emitted through the display surface of the display element may pass through the half mirror toward the second mirror, may be reflected by the second mirror toward the half mirror, may be reflected by the half mirror toward the optical element, may be reflected by the optical element toward the first mirror, may be reflected by the first mirror toward the optical element, may pass through the optical element, and may enter the eye of the user.

According to this aspect, the light emitted through the display surface of the display element (i) is reflected by the second mirror, (ii) is reflected by the half mirror, (iii) is reflected by the optical element, and (iv) is reflected by the first mirror and thereafter passes through the optical element and enters the eye(s) of the user. Accordingly, the length of an optical path along which light emitted through the display surface of the display element travels until the light is reflected by the first mirror can be ensured, and thus the viewing distance from the eye(s) of the user up to the display position of a virtual image of an image can be extended.

For example, the optical reflector may further include a half mirror disposed between the first mirror and the second mirror, and the light emitted through the display surface of the display element may be reflected by the second mirror toward the half mirror, may pass through the half mirror toward the first mirror, may be reflected by the first mirror toward the half mirror, may be reflected by the half mirror toward the optical element, may pass through the optical element, and may enter the eye of the user.

According to this aspect, the light emitted through the display surface of the display element (i) is reflected by the second mirror, (ii) is reflected by the first mirror, and (iii) is reflected by the half mirror and thereafter passes through the optical element and enters the eye(s) of the user. Accordingly, the length of an optical path along which light emitted through the display surface of the display element travels until the light is reflected by the first mirror can be ensured, and thus the viewing distance from the eye(s) of the user up to the display position of a virtual image of an image can be extended.

For example, the optical element may be disposed between the display element and the first mirror, and the light emitted through the display surface of the display element may pass through the optical element toward the first mirror, may be reflected by the first mirror toward the optical element, may be reflected by the optical element toward the first mirror, may be reflected by the first mirror again toward the optical element, may pass through the optical element, and may enter the eye of the user.

According to this aspect, the light emitted through the display surface of the display element (i) is reflected by the first mirror, (ii) is reflected by the optical element, and (iii) is reflected again by the first mirror and thereafter passes through the optical element and enters the eye(s) of the user. Accordingly, the length of an optical path along which light emitted through the display surface of the display element travels until the light is reflected by the first mirror can be ensured, and thus the viewing distance from the eye(s) of the user up to the display position of a virtual image of an image can be extended.

For example, the mobile body may include a storage, the display element and the entrance of the optical reflector may be stored in the storage, and the exit of the optical reflector may be exposed outside the storage.

According to this aspect, the display element and the entrance of the optical reflector are stored in the storage of the mobile body. Accordingly, light emitted through the display surface of the display element can be prevented from leaking outside the optical reflector.

For example, a near-infrared reflector that reflects a near infrared ray and transmits visible light may be disposed at the exit of the optical reflector.

According to this aspect, even if, for example, light from the outside entering from the rear of the mobile body enters through the exit of the optical reflector, a near infrared ray included in the light from the outside can be blocked by the near-infrared reflector, and a rise in temperature of the display surface of the display element and a rise in temperature at and around the focal of the first mirror can be reduced.

For example, the optical reflector may further include: a casing that includes an opening in the entrance, and stores therein the first mirror and the optical element; and a light-transmitting cover covering the opening of the casing.

According to this aspect, since the light-transmitting cover is covering the opening of the casing, dust and dirt, for instance, can be prevented from getting inside the casing through the opening.

For example, in a top view, the display element and the first mirror may be tilted relative to a direction in which the mobile body moves, and may be disposed substantially parallel to each other.

According to this aspect, irrespective of the position of the display surface, the lengths of optical paths between the display element and the first mirror can be made substantially the same, and thus a high-quality display system that reduces image distortion can be provided.

For example, the optical element may further include a liquid-crystal optical element for switching between a transmission mode for transmitting incident light and a reflection mode for reflecting incident light.

According to this aspect, for example, the electron mirror mode for checking the rear view of the mobile body using an image and the optical mirror mode for checking the rear view of the mobile body using optical reflection can be readily switched.

For example, the display system may further include: a holding member for maintaining a positional relation between the display element and the optical reflector by holding the display element and the optical reflector, the holding member being disposed in the mobile body.

According to this aspect, the holding member allows the display system to be provided as a unit. Accordingly, even before the display system is provided in the mobile body (for example, when the display system is delivered from a factory), optical performance, for instance, of the display system can be inspected.

For example, first linearly polarized light showing the image may be emitted through the display surface of the display element, the first mirror may face toward the display surface of the display element, the polarizing element may be a reflective polarizing plate that is disposed between the display element and the first mirror, transmits the first linearly polarized light, and reflects second linearly polarized light having a polarization direction different from a polarization direction of the first linearly polarized light, the wave plate may be disposed between the reflective polarizing plate and the first mirror, and the first linearly polarized light emitted through the display surface of the display element (a) may pass through the reflective polarizing plate and may travel toward the wave plate, (b) may be converted by the wave plate into first circularly polarized light and may travel toward the first mirror, (c) may be reflected by the first mirror and may travel toward the wave plate, (d) may be converted by the wave plate into the second linearly polarized light and may travel toward the reflective polarizing plate, (e) may be reflected by the reflective polarizing plate and may travel toward the wave plate, (f) may be converted by the wave plate into second circularly polarized light having a polarization direction different from a polarization direction of the first circularly polarized light and may travel toward the first mirror, and (g) may be reflected again by the first mirror and may enter the eye of the user.

According to this aspect, the light emitted through the display surface of the display element (i) is reflected by the first mirror, (ii) is reflected by the reflective polarizing plate, and (iii) is reflected again by the first mirror and thereafter enters the eye(s) of the user. Thus, light emitted through the display surface of the display element travels back and forth at least twice between the reflective polarizing plate and the first mirror, and thereafter enters the eye(s) of the user. Accordingly, when the length of an optical path along which light emitted through the display surface of the display element travels via the reflective polarizing plate until the light is reflected again by the first mirror is set to a predetermined length, the distances between elements (such as the display element, the reflective polarizing plate, the wave plate, and the first mirror) can be made short as much as possible. As a result, while ensuring the viewing distance, the display system can be reduced in size.

For example, the second circularly polarized light reflected again by the first mirror may further (h) travel toward the wave plate, (i) be converted by the wave plate into the first linearly polarized light and travel toward the reflective polarizing plate, and (j) pass through the reflective polarizing plate and enter the eye of the user.

According to this aspect, light reflected by the first mirror again passes through the reflective polarizing plate and thereafter enters the eye(s) of the user. Accordingly, only the first linearly polarized light reflected again by the first mirror passes through the reflective polarizing plate, whereas unnecessary light other than the first linearly polarized light (including light from the outside such as sunlight) is blocked by the reflective polarizing plate. As a result, the accuracy of displaying an image can be increased.

For example, the display system may further include: a frame that includes an opening, and is opposed to the first mirror with the display element being provided therebetween. The second circularly polarized light reflected again by the first mirror may enter the eye of the user through the opening.

According to this aspect, the user can see at least a portion of the first mirror ahead of the outer edge portion of the opening, and thus can perceive the depth of an image.

For example, the opening may have a size that allows the user to view an entire width of the first mirror, the entire width extending in a predetermined direction.

According to this aspect, the first mirror can be reduced in size.

For example, the display system may further include: a casing that stores therein the display element, the reflective polarizing plate, the wave plate, and the first mirror. The frame may be a side of the casing, the side facing the user.

According to this aspect, elements (the display element, the reflective polarizing plate, the wave plate, and the first mirror) in the display system can be compactly stored inside the casing.

For example, the display system may further include: a light-blocking member disposed between the display element and the opening.

According to this aspect, most of the light emitted through the display surface of the display element (hereinafter, referred to as "display light") passes through the reflective polarizing plate, yet a portion of the light emitted through the display surface of the display element (hereinafter, referred to as "surface reflected light") is reflected by the reflective polarizing plate. Since the light-blocking member is disposed between the display element and the opening, surface reflected light can be prevented from reaching the opening. As a result, this can reduce reflection of such surface reflected light in an image displayed on the display surface of the display element due to the surface reflected light being superposed on display light.

For example, the polarization direction of the first linearly polarized light may be perpendicular to the polarization direction of the second linearly polarized light.

According to this aspect, the intensity of display light can be increased.

For example, the wave plate may be a quarter-wave plate, and a slow axis of the quarter-wave plate may be tilted 45 degrees relative to a reflection axis of the reflective polarizing plate.

According to this aspect, the intensity of display light can be increased.

For example, the first mirror and the reflective polarizing plate may be disposed non-parallel to each other.

According to this aspect, multiple reflection of light between the first mirror and the reflective polarizing plate can be prevented.

For example, the first mirror may be a concave mirror or a Fresnel mirror.

According to this aspect, design freedom of the focal position of the first mirror can be increased, and at the same time, the first mirror can be reduced in size.

For example, the reflective polarizing plate may be cylindrical.

According to this aspect, the reflective polarizing plate can be reduced in size.

For example, the display system may further include: a transmissive polarizing plate that is disposed between the display element and the reflective polarizing plate, transmits the first linearly polarized light, and absorbs the second linearly polarized light.

According to this aspect, the transmissive polarizing plate is disposed between the display element and the reflective polarizing plate, and thus when unnecessary light that does not contribute to displaying an image enters the transmissive polarizing plate, the unnecessary light can be absorbed by the transmissive polarizing plate. Accordingly, reflection of such unnecessary light in an image displayed on the display surface of the display element can be reduced.

For example, the transmissive polarizing plate may cover a region of a surface of the reflective polarizing plate, the surface facing the display element, the region being a region through which the first linearly polarized light emitted through the display surface of the display element enters.

According to this aspect, a portion of light emitted through the display surface of the display element can be prevented from being reflected by the reflective polarizing plate. As a result, reflection of the portion of light in a rear-view image displayed on the display surface of the display element can be reduced.

For example, on a straight line that connects a center of the display surface of the display element and a center of a reflection surface of the first mirror, a distance between the display element and the reflective polarizing plate may be shorter than a distance between the wave plate and the first mirror.

According to this aspect, an optical path along which light emitted through the display surface of the display element travels via the reflective polarizing plate until the light is reflected again by the first mirror can be ensured to have a longer length.

For example, the first mirror may include: a first reflection region in which the first circularly polarized light from the wave plate is reflected; and a second reflection region in which the second circularly polarized light from the wave plate is reflected, and a portion of the first reflection region may overlap a portion of the second reflection region.

According to this aspect, the first mirror can be reduced in size.

For example, the display system may further include: a second mirror facing a surface of the reflective polarizing plate, the surface facing the display element. The first linearly polarized light passing through the reflective polarizing plate may further (k) travel toward the second mirror, and (l) be reflected by the second mirror and enter the eye of the user.

According to this aspect, reflection of light back and forth between the reflective polarizing plate and the first mirror is in, for example, the vertical direction so that the thickness of the display system can be decreased, and the view of the user can be ensured.

For example, the display system may further include: a light-transmitting substrate stacked between the reflective polarizing plate and the wave plate.

According to this aspect, when the reflective polarizing plate and the wave plate are each formed into a film, the occurrence of color irregularity (moire) caused by directly superposing the reflective polarizing plate and the wave plate can be reduced.

For example, the display surface of the display element may be in contact with a surface of the reflective polarizing plate, the surface facing the display element.

According to this aspect, the display system can be reduced in size.

For example, the first mirror may be a concave mirror, and in a side view of the display system, a normal vector at a center of a reflection surface of the first mirror may extend along an axis closer to a center of the display surface than an axis along which a half-angle vector extends, the half-angle vector dividing an angle into two, the angle being formed between (i) a line that connects the center of the display surface of the display element and the center of the reflection surface of the first mirror and (ii) a line that connects the center of the reflection surface of the first mirror and the eye of the user.

According to this aspect, a portion of light emitted through the display surface of the display element and reflected only once by the first mirror passes through the optical element and travels toward the display surface of the display element. Accordingly, the light reflected only once by the first mirror can be prevented from reaching the eye(s) of the user, and reflection of such light in an image displayed on the display surface of the display element can be prevented.

The following specifically describes embodiments, with reference to the drawings.

Note that the embodiments described below each show a general or specific example. The numerical values, shapes, materials, elements, the arrangement and connection of the elements, steps, the processing order of the steps, and others indicated in the following embodiments are mere examples, and therefore are not intended to limit the present disclosure. Therefore, among the elements in the following embodiments, elements not recited in any of the independent claims defining the most generic concept are described as arbitrary elements.

Embodiment 1

[1-1. Outline of Display System]

First, an outline of display system 2 according to Embodiment 1 is to be described with reference to FIG. 1. FIG. 1 illustrates an example of vehicle 4 provided with display system 2 according to Embodiment 1.

In the following description, the direction in which vehicle 4 advances is a direction toward the "front", and the direction in which vehicle 4 reverses is a direction toward the "rear". In FIG. 1, the front-and-rear direction of vehicle 4 is the X-axis direction, the lateral direction is the Y-axis direction, and the up-and-down direction (vertical direction) is the Z-axis direction. In FIG. 1, the "front" is on the negative side of the X axis, the "rear" is on the positive side of the X axis, "up" is on the positive side of the Z axis, and "down" is on the negative side of the Z axis.

As illustrated in FIG. 1, display system 2 is provided in, for example, overhead console 6 (an example of a storage) of vehicle 4. Accordingly, display system 2 is disposed at a position where display system 2 is in the view of driver 10 (an example of a user) in a state in which driver 10 seated in driver seat 8 is looking frontward.

Vehicle 4 is, for example, a car, a bus, or a truck. A camera (not illustrated) for capturing an image of a rear view of vehicle 4 is provided in, for instance, a rear bumper or a trunk hood of vehicle 4. Note that the present embodiment describes the case where display system 2 is provided in vehicle 4 that is a mobile body, but is not limited thereto, and may be provided in various types of mobile bodies such as a construction machine, an agricultural implement, a ship, and an aircraft, for example.

In the present embodiment, display system 2 is a so-called electron mirror for displaying a rear-view image (an example of an image) captured by the camera. Driver 10 can check the rear view of vehicle 4 that appears in a rear-view image, by looking at the rear-view image displayed by display system 2. Thus, display system 2 is used as a substitute for a conventional physical rear-view mirror that shows a rear view of vehicle 4 using light reflection.

[1-2. Configuration of Display System]

Figure 2:
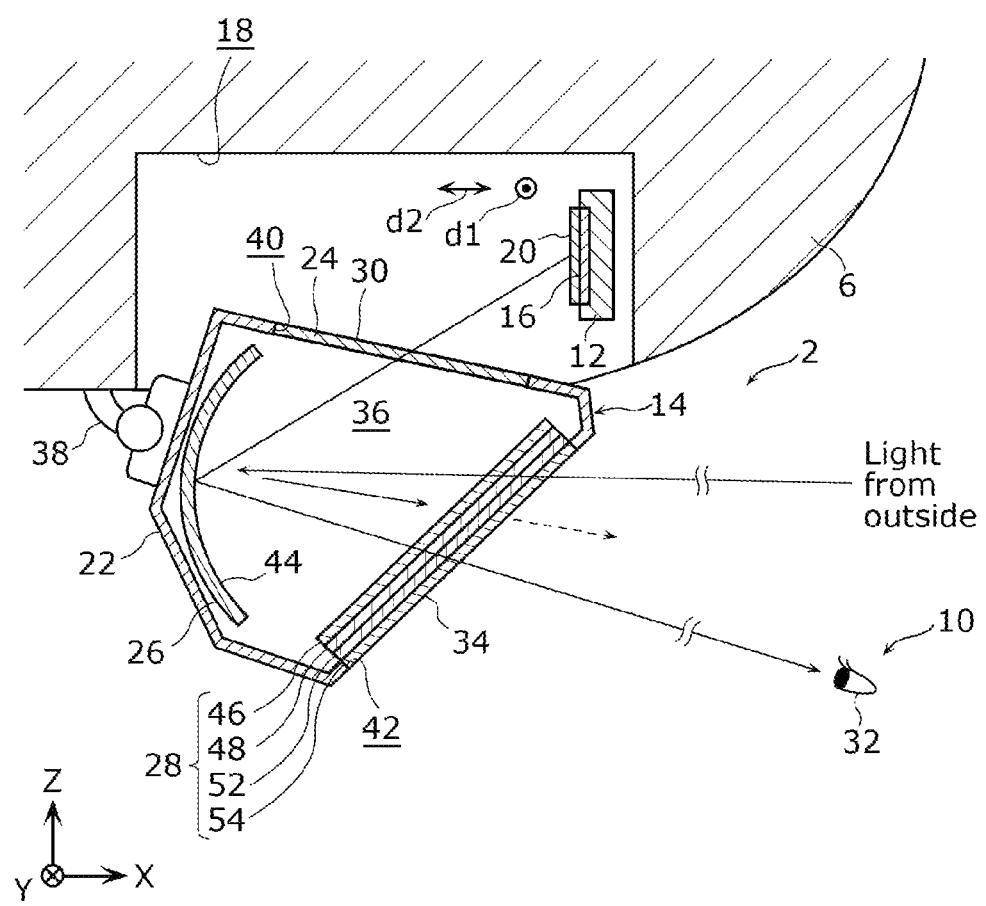
FIG. 2 is a cross-sectional view of the display system according to Embodiment 1.
Figure 3:
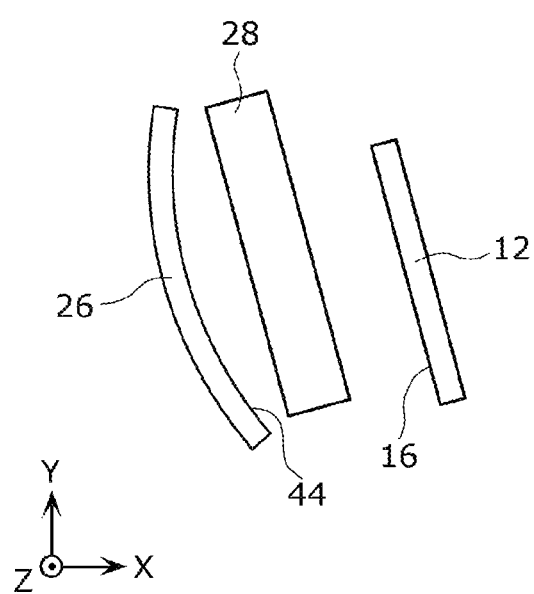
FIG. 3 illustrates a positional relation of a display element, a concave mirror, and an optical element in the display system according to Embodiment 1 in a top view.

Next, a configuration of display system 2 according to Embodiment 1 is to be described with reference to FIG. 2 and FIG. 3. FIG. 2 is a cross-sectional view of display system 2 according to Embodiment 1. FIG. 3 illustrates a positional relation of display element 12, concave mirror 26, and optical element 28 in display system 2 according to Embodiment 1 in a top view.

As illustrated in FIG. 2, display system 2 includes display element 12 and optical reflector 14. Optical reflector 14 is disposed ahead of display element 12 in the front-and-rear direction of vehicle 4.

Display element 12 is, for example, a liquid crystal display (LCD), and includes display surface 16 for displaying a rear-view image captured by the camera of vehicle 4. Display element 12 is stored in recess 18 formed in overhead console 6, and is fixed to overhead console 6. Display element 12 is disposed such that display surface 16 is facing frontward of vehicle 4. Display surface 16 is formed into a rectangle horizontally long, and is for emitting light for forming a rear-view image. The light emitted through display surface 16 is first linearly polarized light having first polarization direction d1 (the direction perpendicular to the plane of FIG. 2, which is the Y-axis direction).

Wave plate 20 is disposed on the outermost surface of display surface 16 of display element 12. Wave plate 20 is a quarter-wave plate for converting linearly polarized light entering wave plate 20 into circularly polarized light, and for converting circularly polarized light entering wave plate 20 into linearly polarized light. The slow axis of wave plate 20 is tilted 45 degrees relative to the transmission axis (described later) of transmissive reflecting plate 52 (an example of a polarizing element). Accordingly, wave plate 20 has a function of generating a phase difference of ¼ of wavelength A (that is, a phase difference of 90 degrees) between rays of linearly polarized light perpendicular to each other out of the light entering wave plate 20. Note that in the present embodiment, wave plate 20 is disposed on the outermost surface of display surface 16 of display element 12, yet instead of such a configuration, wave plate 20 may be disposed on dust cover 24 (described later).

Optical reflector 14 includes casing 22, dust cover 24 (an example of light-transmitting cover), concave mirror 26 (an example of a first mirror), and optical element 28. Concave mirror 26 and optical element 28 are provided separately from display element 12. Optical reflector 14 includes entrance 30 through which light emitted through display surface 16 of display element 12 enters, and exit 34 through which the light that has entered through entrance 30 exits and travels toward eye 32 of driver 10.

Casing 22 is formed of synthetic resin, for example, and includes storage space 36 therein. Storage space 36 of casing 22 stores concave mirror 26 and optical element 28. Casing 22 is rotatably supported by overhead console 6 via ball joint 38. The orientation of casing 22 relative to overhead console 6 can be changed by rotating casing 22 relative to ball joint 38.

Opening 40 that communicates with storage space 36 is formed in the side of casing 22 that faces display surface 16 of display element 12. Opening 40 is provided at entrance 30 of optical reflector 14, and is within recess 18 of overhead console 6. Opening 40 is formed into a rectangle horizontally long. Opening 42 that communicates with storage space 36 is formed in the side of casing 22 that faces driver 10. Opening 42 is provided at exit 34 of optical reflector 14, and is exposed outside recess 18 of overhead console 6. Opening 42 is formed into a rectangle horizontally long.

Dust cover 24 is covering opening 40 of casing 22. Thus, dust cover 24 is disposed at entrance 30 of optical reflector 14. Dust cover 24 is formed of a light-transmitting material such as, for example, transparent resin or glass. Accordingly, dust and dirt from the outside can be prevented from getting in storage space 36 of casing 22 through opening 40.

Concave mirror 26 faces dust cover 24, and is disposed ahead of display element 12 and optical element 28 in the front-and-rear direction of vehicle 4. Thus, concave mirror 26 faces toward display surface 16 of display element 12. Concave mirror 26 has concave reflection surface 44 that is a free-form surface. Concave mirror 26 is formed by depositing a reflecting metal film such as an aluminum film on the surface of a resin-molded member, for example. Concave mirror 26 is disposed such that reflection surface 44 faces wave plate 46 (described later) of optical element 28, or in other words, faces rearward of vehicle 4.

Note that in the XY top view illustrated in FIG. 3, display element 12 and concave mirror 26 are tilted relative to the front-and-rear direction (the X-axis direction) of vehicle 4 and are disposed substantially parallel to each other. Specifically, in the XY top view illustrated in FIG. 3, a tangent at the center of reflection surface 44 of concave mirror 26 is substantially parallel to a tangent at the center of display surface 16 of display element 12. In the Specification, "substantially parallel" is defined to mean not only completely parallel, but also essentially parallel, and thus, display element 12 and concave mirror 26 are "substantially parallel" in a range in which casing 22 rotates, for example. Accordingly, irrespective of a position on display surface 16, the lengths of optical paths between display element 12 and concave mirror 26 can be made substantially the same, and thus image distortion can be reduced so that image quality can be increased. In the XY top view illustrated in FIG. 3, as long as display element 12 and concave mirror 26 are substantially parallel, display element 12, concave mirror 26, and optical element 28 may be disposed symmetrically or asymmetrically.

Optical element 28 is covering opening 42 of casing 22, and faces reflection surface 44 of concave mirror 26. Stated differently, optical element 28 is disposed at exit 34 of optical reflector 14. Optical element 28 includes wave plate 46, glass substrate 48, transmissive polarizing plate 52, and wave plate 54. Note that in the Specification, "plate" is a term having a concept that includes a member referred to as a film or a sheet, for instance.

Optical element 28 is formed into a quadrilateral plate, overall. Optical element 28 has a configuration in which wave plate 46, glass substrate 48, transmissive polarizing plate 52, and wave plate 54 are stacked in this order with wave plate 46 being closest to concave mirror 26. Optical element 28 is tilted relative to the vertical direction such that the surface thereof that faces driver 10 is disposed obliquely downward.

Glass substrate 48 is for supporting wave plate 46, transmissive polarizing plate 52, and wave plate 54, and is formed of a light-transmitting material such as, for example, transparent glass. Wave plate 46 is superposed on the surface of glass substrate 48 that faces reflection surface 44 of concave mirror 26. Transmissive polarizing plate 52 and wave plate 54 are superposed on/over the surface of glass substrate 48 that faces driver 10.

Wave plate 46 is a quarter-wave plate for converting linearly polarized light entering wave plate 46 into circularly polarized light, and for converting circularly polarized light entering wave plate 46 into linearly polarized light. The slow axis of wave plate 46 is tilted 45 degrees relative to the transmission axis of transmissive polarizing plate 52. Accordingly, wave plate 46 has a function of generating a phase difference of ¼ of wavelength A between rays of linearly polarized light perpendicular to each other out of the light entering wave plate 46.

Out of light entering transmissive polarizing plate 52, transmissive polarizing plate 52 absorbs first linearly polarized light having first polarization direction d1, and transmits second linearly polarized light having second polarization direction d2 (that is the in-plane direction of FIG. 2 within the XZ plane). Thus, the absorption axis of transmissive polarizing plate 52 is in the same direction as first polarization direction d1, whereas the transmission axis of transmissive polarizing plate 52 is in the same direction as second polarization direction d2, and the axes are perpendicular to each other. Note that in the Specification, "perpendicular" means not only forming completely right angles, but also forming substantially right angles, and thus an error of several degrees, for example, is included.

Wave plate 54 is a quarter-wave plate for converting linearly polarized light entering wave plate 54 into circularly polarized light, and for converting circularly polarized light entering wave plate 54 into linearly polarized light. The slow axis of wave plate 54 is tilted 45 degrees relative to the transmission axis of transmissive polarizing plate 52. Accordingly, wave plate 54 has a function of generating a phase difference of ¼ of wavelength λ between rays of linearly polarized light perpendicular to each other out of the light entering wave plate 54.

[1-3. Operation of Display System]

Figure 4:
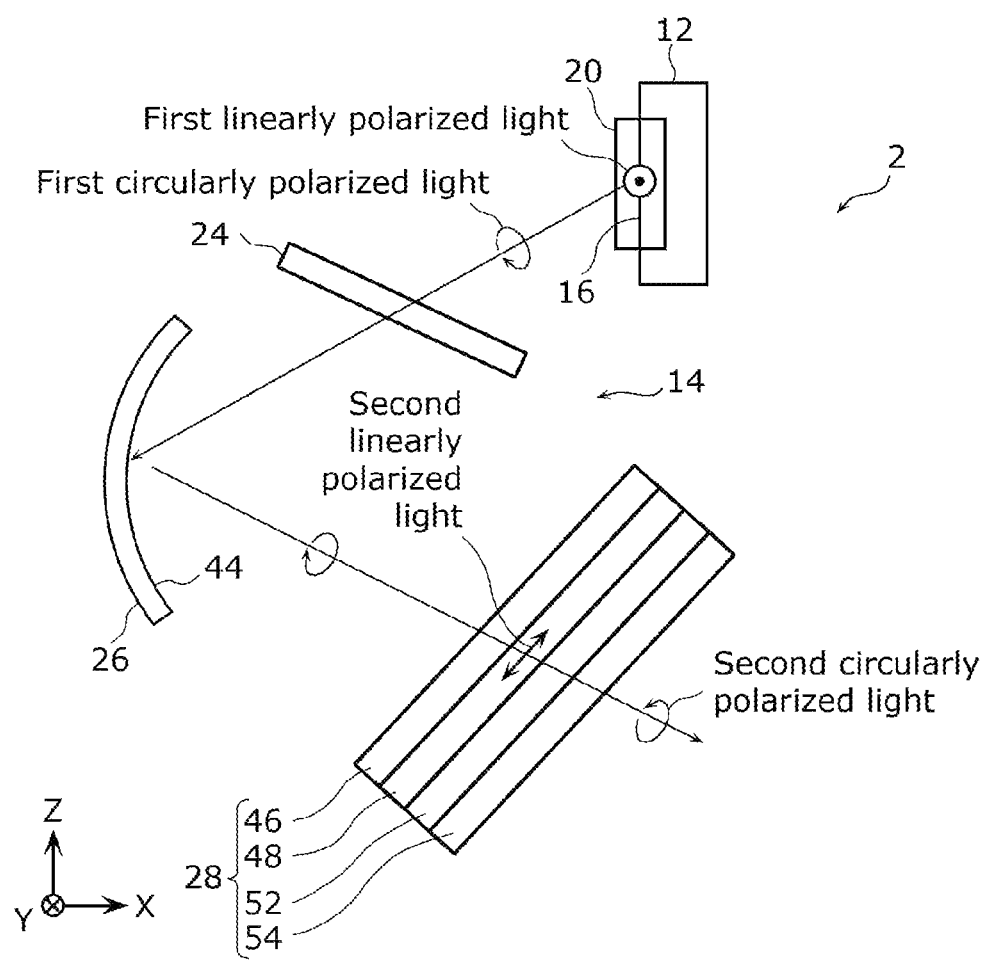
FIG. 4 is a schematic diagram illustrating an operation of the display system according to Embodiment 1.

Next, an operation of display system 2 according to Embodiment 1 is to be described with reference to FIG. 1, FIG. 2, and FIG. 4. FIG. 4 is a schematic diagram illustrating an operation of display system 2 according to Embodiment 1. Note that FIG. 4 schematically illustrates the arrangement and shapes, for instance, of elements of display system 2.

As illustrated in FIG. 4, first linearly polarized light from display surface 16 of display element 12 enters wave plate 20. The first linearly polarized light entering wave plate 20 is converted by wave plate 20 into clockwise first circularly polarized light and emitted. The first circularly polarized light emitted through wave plate 20 passes through dust cover 24, travels toward concave mirror 26, and is reflected by reflection surface 44 of concave mirror 26.

The first circularly polarized light reflected by reflection surface 44 of concave mirror 26 travels toward wave plate 46 of optical element 28. The first circularly polarized light passing through wave plate 46 is converted by wave plate 46 into second linearly polarized light. The second linearly polarized light exiting wave plate 46 passes through glass substrate 48 and enters transmissive polarizing plate 52. At this time, second polarization direction d2 of the second linearly polarized light entering transmissive polarizing plate 52 is the same as the direction of the transmission axis of transmissive polarizing plate 52. Accordingly, the second linearly polarized light entering transmissive polarizing plate 52 passes through transmissive polarizing plate 52.

The second linearly polarized light passing through transmissive polarizing plate 52 enters wave plate 54 and is converted into counterclockwise second circularly polarized light having a different polarization direction from that of the first circularly polarized light. As illustrated in FIG. 2, the second circularly polarized light exiting wave plate 54 enters eye 32 of driver 10.

As described above, light emitted through display surface 16 of display element 12 is reflected by reflection surface 44 of concave mirror 26, and thereafter passes through optical element 28 and enters eye 32 of driver 10.

Driver 10 sees virtual image 56 of a rear-view image as if the rear-view image were displayed at a display position ahead of display system 2 in the front-and-rear direction of vehicle 4, by viewing the rear-view image reflected by reflection surface 44 of concave mirror 26, as illustrated in FIG. 1. Accordingly, the amount of eye accommodation is comparatively small when driver 10 shifts the line of sight to virtual image 56 of the rear-view image in a state in which driver 10 is looking frontward of vehicle 4 through windshield 58 (front window).

[1-4. Advantageous Effects]

In the present embodiment, optical element 28 includes transmissive polarizing plate 52, for instance, and is disposed at exit 34 of optical reflector 14. Accordingly, as illustrated in FIG. 2, even when light from the outside (such as light from headlights of a vehicle behind or sunlight, for example) entering from the rear of vehicle 4 enters optical element 28 through the side through which the second circularly polarized light exits, almost half the light from the outside is absorbed by transmissive polarizing plate 52 of optical element 28. The light from the outside passing through optical element 28 is linearly polarized light (having the second polarization direction), converted into circularly polarized light by wave plate 46, and reflected by reflection surface 44 of concave mirror 26. A portion of the light from the outside reflected by reflection surface 44 of concave mirror 26 is reflected by the surface of optical element 28 that faces concave mirror 26. A remaining portion of the light from the outside reflected by reflection surface 44 of concave mirror 26 passes through optical element 28 again, and at that time, is converted into linearly polarized light (having the first polarization direction) by wave plate 46 of optical element 28. Transmissive polarizing plate 52 of optical element 28 absorbs linearly polarized light having the first polarization direction, and thus light from the outside is significantly attenuated. As a result, light from the outside can be prevented from being reflected in concave mirror 26.

Accordingly, even if light from the outside passing through optical element 28 and enters the inside of casing 22 is reflected by concave mirror 26, the light is significantly attenuated when the light reaches optical element 28 again. Thus, a possibility that light from the outside is collected by concave mirror 26 is greatly reduced. As a result, a high-temperature portion can be prevented from being generated due to light from the outside being collected by concave mirror 26.

Display element 12 and entrance 30 of optical reflector 14 are stored in recess 18 of overhead console 6. Accordingly, light emitted through display surface 16 of display element 12 can be prevented from leaking outside optical reflector 14.

Wave plate 54 is disposed on the outermost surface of optical element 28, and thus light exiting optical element 28 is converted into second circularly polarized light by wave plate 54 and enters eye 32 of driver 10. Accordingly, even if driver 10 is wearing, for instance, polarized sunglasses, light passing through wave plate 54 is allowed to enter eye 32 of driver 10.

Note that a film-shaped near-infrared reflector that reflects a near infrared ray and transmits visible light may be disposed at exit 34 of optical reflector 14. In this case, the near-infrared reflector is covering the surface of optical element 28 that faces driver 10. Accordingly, even if light from the outside entering from the rear of vehicle 4 enters optical element 28, a near infrared ray included in the light from the outside can be blocked by the near-infrared reflector, and a rise in temperature of display surface 16 of display element 12 and a rise in temperature at and around the focal of concave mirror 26 can be reduced.

Embodiment 2

[2-1. Configuration of Display System]

Figure 5:
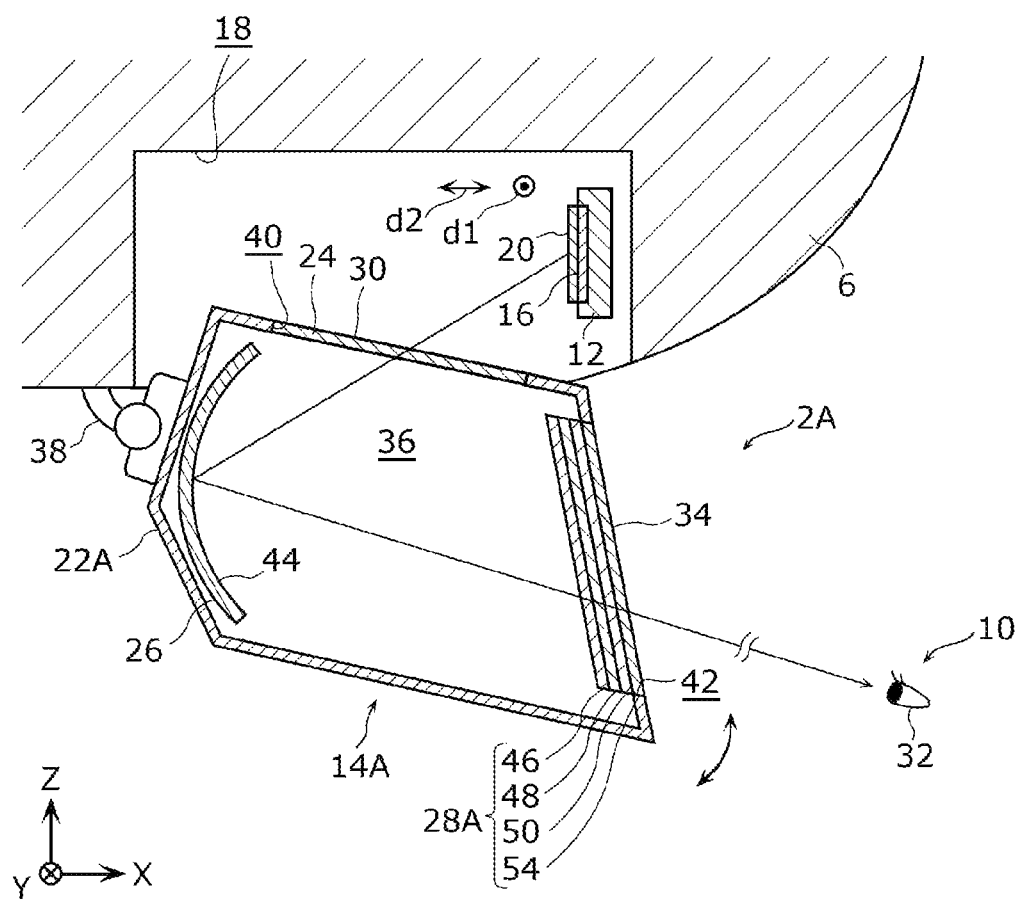
FIG. 5 is a cross-sectional view of a display system according to Embodiment 2.

A configuration of display system 2A according to Embodiment 2 is to be described with reference to FIG. 5. FIG. 5 is a cross-sectional view of display system 2A according to Embodiment 2. Note that in the embodiments described below, the same numeral is given to the same element as in Embodiment 1, and a description thereof is omitted.

As illustrated in FIG. 5, in display system 2A according to Embodiment 2, the configuration of casing 22A of optical reflector 14A, that is, the positional relation between opening 40 and opening 42 of casing 22A is different from Embodiment 1 described above. Specifically, in the XZ side view, dust cover 24 and optical element 28 form an acute angle in Embodiment 1 described above, whereas dust cover 24 and optical element 28A form an obtuse angle in the present embodiment.

In display system 2A according to Embodiment 2, the configuration of optical element 28A is different from Embodiment 1 described above. Specifically, optical element 28A includes wave plate 46, glass substrate 48, reflective polarizing plate 50 (an example of a polarizing element), and wave plate 54, but does not include transmissive polarizing plate 52 (see FIG. 2) described in Embodiment 1 above. Optical element 28A has a configuration in which wave plate 46, glass substrate 48, reflective polarizing plate 50, and wave plate 54 are stacked in this order with wave plate 46 being closest to concave mirror 26.

Out of light impinging onto reflective polarizing plate 50, reflective polarizing plate 50 reflects first linearly polarized light having first polarization direction d1, and transmits second linearly polarized light having second polarization direction d2 perpendicular to first polarization direction d1. Thus, the reflection axis of reflective polarizing plate 50 is in the same direction as first polarization direction d1, whereas the transmission axis of reflective polarizing plate 50 is in the same direction as second polarization direction d2, and the axes are perpendicular to each other.

Note that the order in which the elements of optical element 28A are stacked is not limited to this, and optical element 28A may have a configuration in which, for example, wave plate 46, reflective polarizing plate 50, glass substrate 48, and wave plate 54 are stacked in this order with wave plate 46 being closest to concave mirror 26.

[2-2. Operation of Display System]

Next, an operation of display system 2A according to Embodiment 2 is to be described with reference to FIG. 5.

In display system 2A according to Embodiment 2, optical element 28A does not include a transmissive polarizing plate, and thus can be switched between an electron mirror mode in which the rear view of vehicle 4 (see FIG. 1) is checked using a rear-view image and an optical mirror mode in which the rear view of vehicle 4 is checked using optical reflection. Note that when display system 2A is configured not to switch between the electron mirror mode and the optical mirror mode, a configuration may be adopted in which optical element 28A includes transmissive polarizing plate 52 (see FIG. 2) instead of reflective polarizing plate 50, similarly to optical element 28 described in Embodiment 1 above.

In the electron mirror mode, the display of a rear-view image by display element 12 is on. As illustrated in FIG. 5, driver 10 rotates casing 22A relative to ball joint 38 to adjust the orientation of casing 22A such that the surface of optical element 28A facing driver 10 faces obliquely upward (in other words, the ceiling of vehicle 4 is reflected in optical element 28A). Accordingly, light from the outside can be prevented from being reflected in optical element 28A. In the electron mirror mode, the optical path of light emitted through display surface 16 of display element 12 is the same as that in Embodiment 1 described above, and thus a description thereof is omitted.

On the other hand, in the electron mirror mode, the display of a rear-view image by display element 12 is off. Although not illustrated, driver 10 rotates casing 22A relative to ball joint 38 to adjust the orientation of casing 22A such that the surface of optical element 28A facing driver 10 faces rearward of vehicle 4. Light from the outside that has entered from the rear of vehicle 4 (light showing the rear of vehicle 4) is reflected by reflective polarizing plate 50 of optical element 28A. Accordingly, optical element 28A functions as a physical optical mirror.

[2-3. Advantageous Effects]

In the present embodiment, driver 10 can switch display system 2A to one of the electron mirror mode and the optical mirror mode, according to the driving state of vehicle 4, for instance. In the XZ side view, dust cover 24 and optical element 28A form an obtuse angle, and thus the amount of rotating casing 22A is small when switching from one of the electron mirror mode and the optical mirror mode to the other.

[2-4. Variation]

Figure 6:
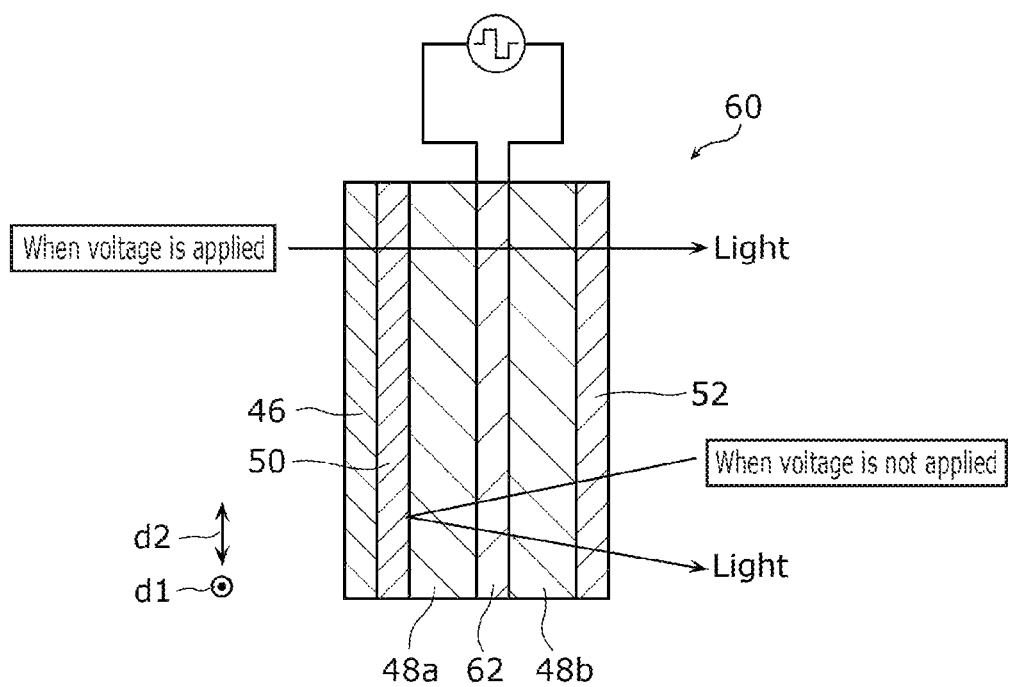
FIG. 6 is a cross-sectional view of a liquid crystal mirror according to a variation of Embodiment 2.

Liquid crystal mirror 60 as illustrated in FIG. 6 may be used as an optical element, instead of optical element 28A described above. FIG. 6 is a cross-sectional view of liquid crystal mirror 60 according to a variation of Embodiment 2.

As illustrated in FIG. 6, liquid crystal mirror 60 has a configuration in which wave plate 46, reflective polarizing plate 50, glass substrate 48a, twisted nematic (TN) liquid crystal 62 (an example of a liquid-crystal optical element), glass substrate 48b, and transmissive polarizing plate 52 are stacked in this order.

In the electron mirror mode, liquid crystal mirror 60 is switched to a transmission mode for transmitting incident light, in response to a voltage being applied to TN liquid crystal 62. First circularly polarized light reflected by reflection surface 44 of concave mirror 26 (see FIG. 5) travels toward wave plate 46 of liquid crystal mirror 60. The first circularly polarized light passing through wave plate 46 is converted by wave plate 46 into second linearly polarized light. The second linearly polarized light exiting wave plate 46 enters reflective polarizing plate 50. At this time, second polarization direction d2 of the second linearly polarized light entering reflective polarizing plate 50 is the same as the direction of the transmission axis of reflective polarizing plate 50. Accordingly, the second linearly polarized light entering reflective polarizing plate 50 passes through reflective polarizing plate 50.

The second linearly polarized light passing through reflective polarizing plate 50 passes through glass substrate 48a, enters TN liquid crystal 62, and passes through TN liquid crystal 62 still as the second linearly polarized light. The second linearly polarized light passing through TN liquid crystal 62 passes through glass substrate 48b and enters transmissive polarizing plate 52. At this time, second polarization direction d2 of the second linearly polarized light entering transmissive polarizing plate 52 is the same as the direction of the transmission axis of transmissive polarizing plate 52. Accordingly, the second linearly polarized light entering transmissive polarizing plate 52 passes through transmissive polarizing plate 52.

On the other hand, in the electron mirror mode, liquid crystal mirror 60 is switched to a reflection mode for reflecting incident light, in response to application of a voltage to TN liquid crystal 62 being stopped. Light from the outside entering from the rear of vehicle 4 (light showing the rear view of vehicle 4) enters transmissive polarizing plate 52, and is converted into second linearly polarized light when passing through transmissive polarizing plate 52. The second linearly polarized light exiting transmissive polarizing plate 52 passes through glass substrate 48b, enters TN liquid crystal 62, and is converted into first linearly polarized light when passing through TN liquid crystal 62. The first linearly polarized light exiting TN liquid crystal 62 passes through glass substrate 48a and falls onto reflective polarizing plate 50. At this time, first polarization direction d1 of the first linearly polarized light falling on reflective polarizing plate 50 is the same as the direction of the reflection axis of reflective polarizing plate 50. Accordingly, the first linearly polarized light falling on reflective polarizing plate 50 is reflected by reflective polarizing plate 50.

The first linearly polarized light reflected by reflective polarizing plate 50 passes through glass substrate 48a, enters TN liquid crystal 62, and is converted into second linearly polarized light when passing through TN liquid crystal 62. The second linearly polarized light exiting TN liquid crystal 62 passes through glass substrate 48b, enters transmissive polarizing plate 52, and passes through transmissive polarizing plate 52.

As described above, by using liquid crystal mirror 60 as a half mirror, the electron mirror mode and the optical mirror mode can be readily switched, and furthermore, reflection in the electron mirror mode can be reduced. Furthermore, the contrast of a rear-view image can be improved.

Embodiment 3

[3-1. Configuration of Display System]

Figure 7:
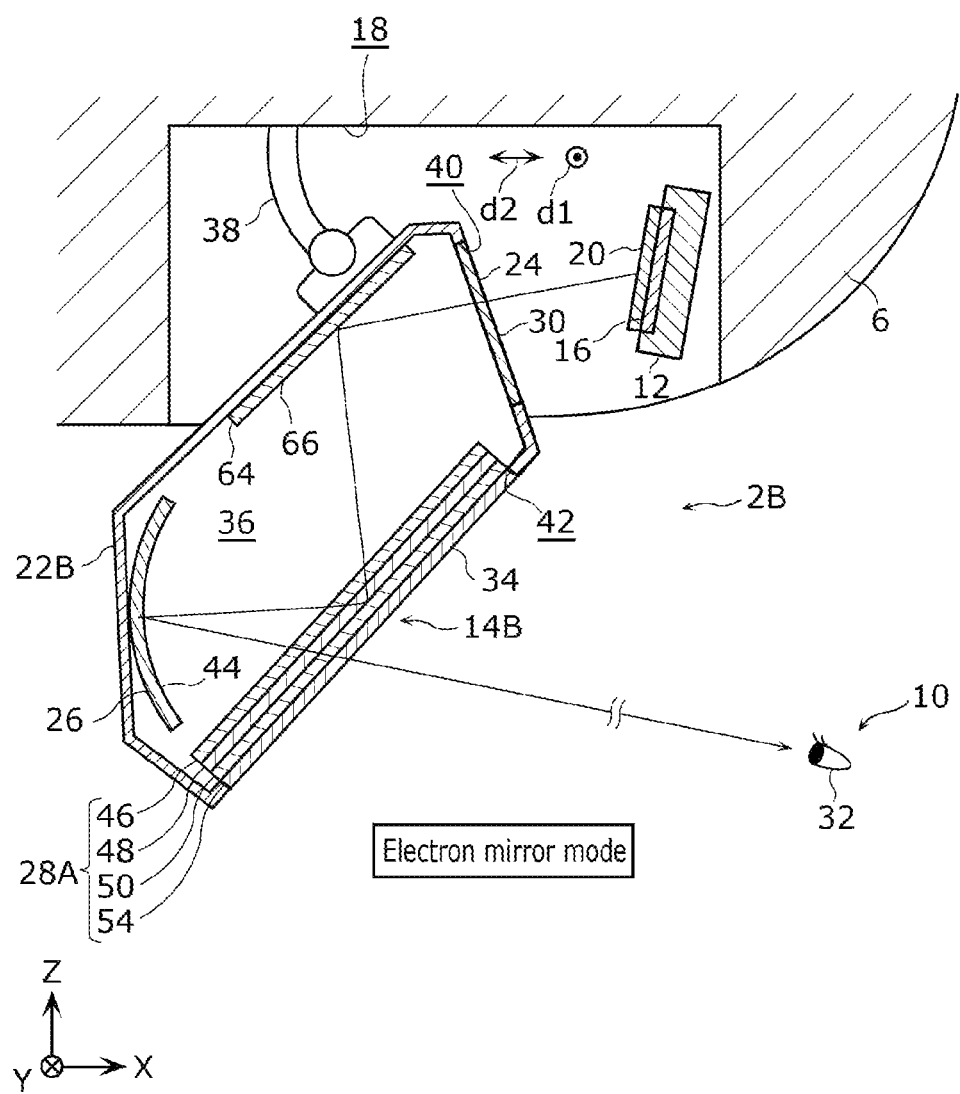
FIG. 7 is a cross-sectional view of a display system according to Embodiment 3 in an electron mirror mode.
Figure 8:
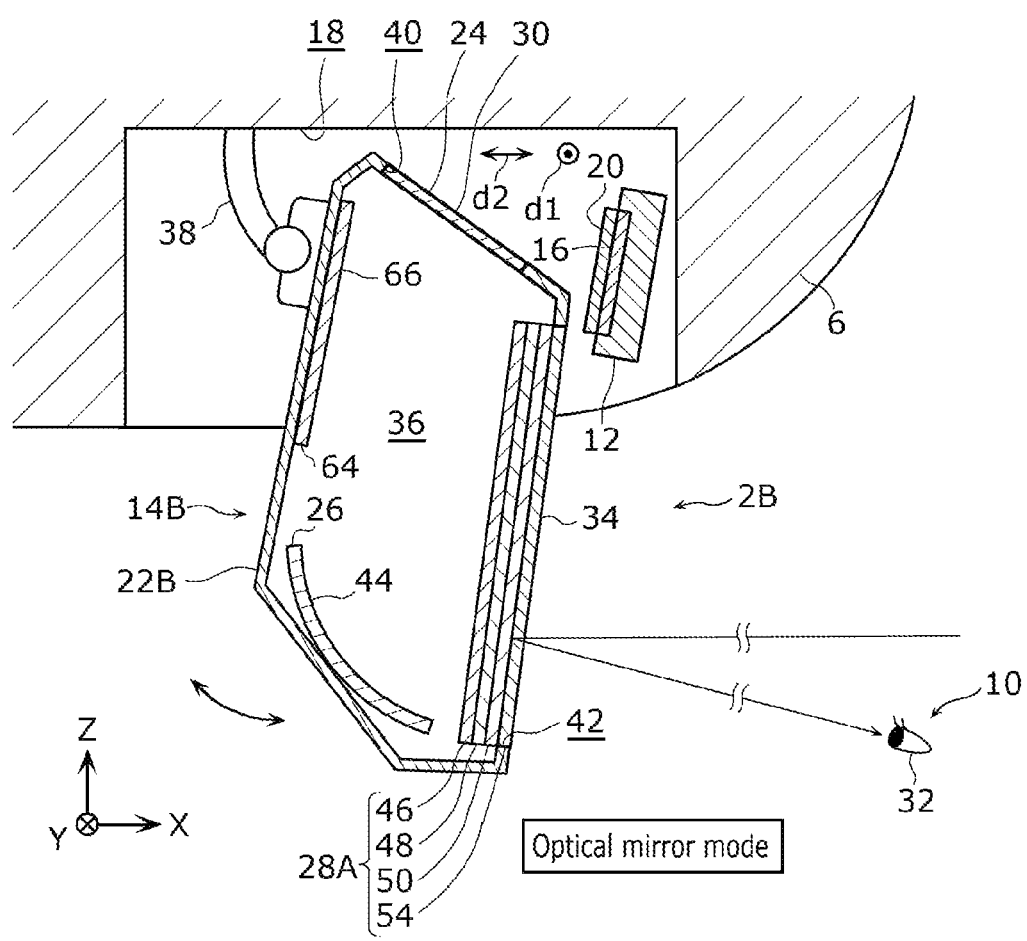
FIG. 8 is a cross-sectional view of the display system according to Embodiment 3 in an optical mirror mode.

A configuration of display system 2B according to Embodiment 3 is to be described with reference to FIG. 7 and FIG. 8. FIG. 7 is a cross-sectional view of display system 2B according to Embodiment 3 in the electron mirror mode. FIG. 8 is a cross-sectional view of display system 2B according to Embodiment 3 in the optical mirror mode.

As illustrated in FIG. 7 and FIG. 8, optical reflector 14B includes casing 22B, dust cover 24, concave mirror 26, optical element 28A, and plane mirror 64 (an example of a second mirror) in display system 2B according to Embodiment 3. Dust cover 24 is disposed such that the surface thereof facing display element 12 faces obliquely upward. Accordingly, reflection in dust cover 24 can be reduced.

Plane mirror 64 includes planar reflection surface 66. Plane mirror 64 is formed by depositing a reflecting metal film such as an aluminum film on the surface of a resin-molded member, for example. Plane mirror 64 is disposed on an optical path between display surface 16 of display element 12 and concave mirror 26. Specifically, plane mirror 64 is disposed such that reflection surface 66 faces toward both display surface 16 of display element 12 and wave plate 46 of optical element 28A. Note that in the present embodiment, optical reflector 14B includes plane mirror 64, yet a concave mirror different from concave mirror 26 may be used instead of plane mirror 64.

In the present embodiment, the shape of casing 22B is different from that in Embodiment 1 described above, due to optical reflector 14B including plane mirror 64.

In the present embodiment, the configuration of optical element 28A is basically the same as that in Embodiment 2 described above. Note that in the present embodiment, the transmission axis of reflective polarizing plate 50 is in the same direction as first polarization direction d1, whereas the reflection axis of reflective polarizing plate 50 is in the same direction as second polarization direction d2, and the axes are perpendicular to each other.

[3-2. Operation of Display System]

Figure 9:
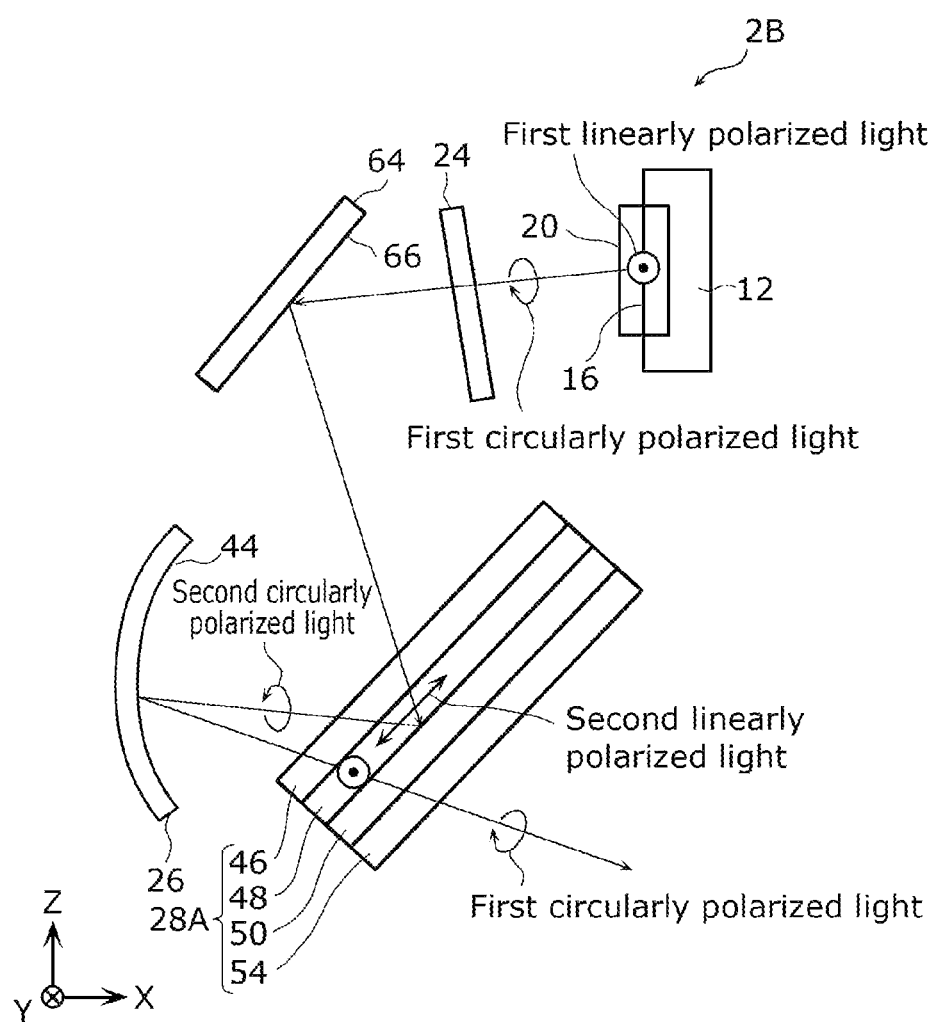
FIG. 9 is a schematic diagram illustrating the operation of the display system according to Embodiment 3.

Next, an operation of display system 2B according to Embodiment 3 is to be described with reference to FIG. 7 to FIG. 9. FIG. 9 is a schematic diagram illustrating an operation of display system 2B according to Embodiment 3. Note that FIG. 9 schematically illustrates the arrangement and shapes, for instance, of elements of display system 2B.

In display system 2B according to Embodiment 3, the electron mirror mode and the optical mirror mode can be switched similarly to Embodiment 2 described above.

As illustrated in FIG. 7, in the electron mirror mode, the display of a rear-view image by display element 12 is on. Driver 10 rotates casing 22B relative to ball joint 38 to adjust the orientation of casing 22B such that the surface of optical element 28A facing driver 10 faces obliquely downward.

As illustrated in FIG. 9, first linearly polarized light from display surface 16 of display element 12 enters wave plate 20. The first linearly polarized light passing through wave plate 20 is converted by wave plate 20 into clockwise first circularly polarized light. The first circularly polarized light exiting wave plate 20 passes through dust cover 24, travels toward plane mirror 64, and is reflected by reflection surface 66 of plane mirror 64.

The first circularly polarized light reflected by reflection surface 66 of plane mirror 64 travels toward wave plate 46 of optical element 28A. The first circularly polarized light passing through wave plate 46 is converted by wave plate 46 into second linearly polarized light. The second linearly polarized light exiting wave plate 46 passes through glass substrate 48 and falls onto reflective polarizing plate 50. At this time, second polarization direction d2 of the second linearly polarized light falling on reflective polarizing plate 50 is the same as the direction of the reflection axis of reflective polarizing plate 50. Accordingly, the second linearly polarized light falling on reflective polarizing plate 50 is reflected by reflective polarizing plate 50.

The second linearly polarized light reflected by reflective polarizing plate 50 passes through glass substrate 48 and enters wave plate 46. The second linearly polarized light passing through wave plate 46 is converted by wave plate 46 into counterclockwise second circularly polarized light. The second circularly polarized light exiting wave plate 46 travels toward concave mirror 26, and is reflected by reflection surface 44 of concave mirror 26.

The second circularly polarized light reflected by reflection surface 44 of concave mirror 26 travels toward wave plate 46 of optical element 28A. The second circularly polarized light passing through wave plate 46 is converted by wave plate 46 into first linearly polarized light. The first linearly polarized light exiting wave plate 46 passes through glass substrate 48 and enters reflective polarizing plate 50. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50.

The first linearly polarized light passing through reflective polarizing plate 50 is converted by wave plate 54 into first circularly polarized light. As illustrated in FIG. 7, the first circularly polarized light exiting wave plate 54 enters eye 32 of driver 10.

On the other hand, as illustrated in FIG. 8, in the optical mirror mode, the display of a rear-view image by display element 12 is off. Driver 10 rotates casing 22B relative to ball joint 38 to adjust the orientation of casing 22B such that the surface of optical element 28A facing driver 10 faces rearward of vehicle 4 (see FIG. 1). Light from the outside that has entered from the rear of vehicle 4 (light showing the rear view of vehicle 4) is reflected by reflective polarizing plate 50 of optical element 28A.

[3-3. Advantageous Effects]

The viewing distance from eye 32 of driver 10 to the display position of virtual image 56 of a rear-view image (see FIG. 1) is determined based on the length of an optical path along which light emitted through display surface 16 of display element 12 travels until the light is reflected by reflection surface 44 of concave mirror 26.

Accordingly, in the present embodiment, in the electron mirror mode, light emitted through display surface 16 of display element 12 (i) is reflected by reflection surface 66 of plane mirror 64, (ii) is reflected by reflective polarizing plate 50 of optical element 28A, and (iii) is reflected by reflection surface 44 of concave mirror 26, and thereafter passes through optical element 28A and enters eye 32 of driver 10.

Accordingly, the length of an optical path along which light emitted through display surface 16 of display element 12 travels until the light is reflected by reflection surface 44 of concave mirror 26 can be ensured, and the viewing distance can be increased.

Embodiment 4

[4-1. Configuration of Display System]

Figure 10:
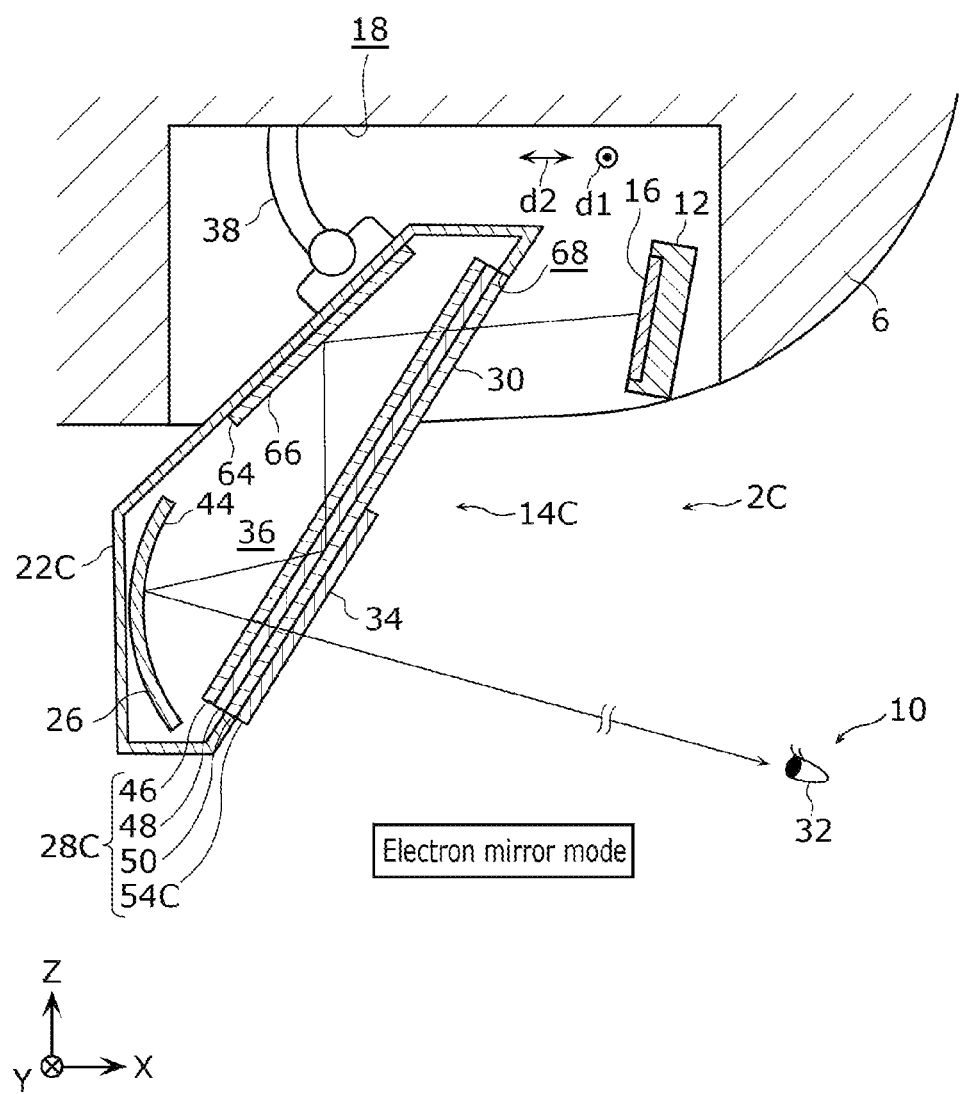
FIG. 10 is a cross-sectional view of a display system according to Embodiment 4 in the electron mirror mode.
Figure 11:
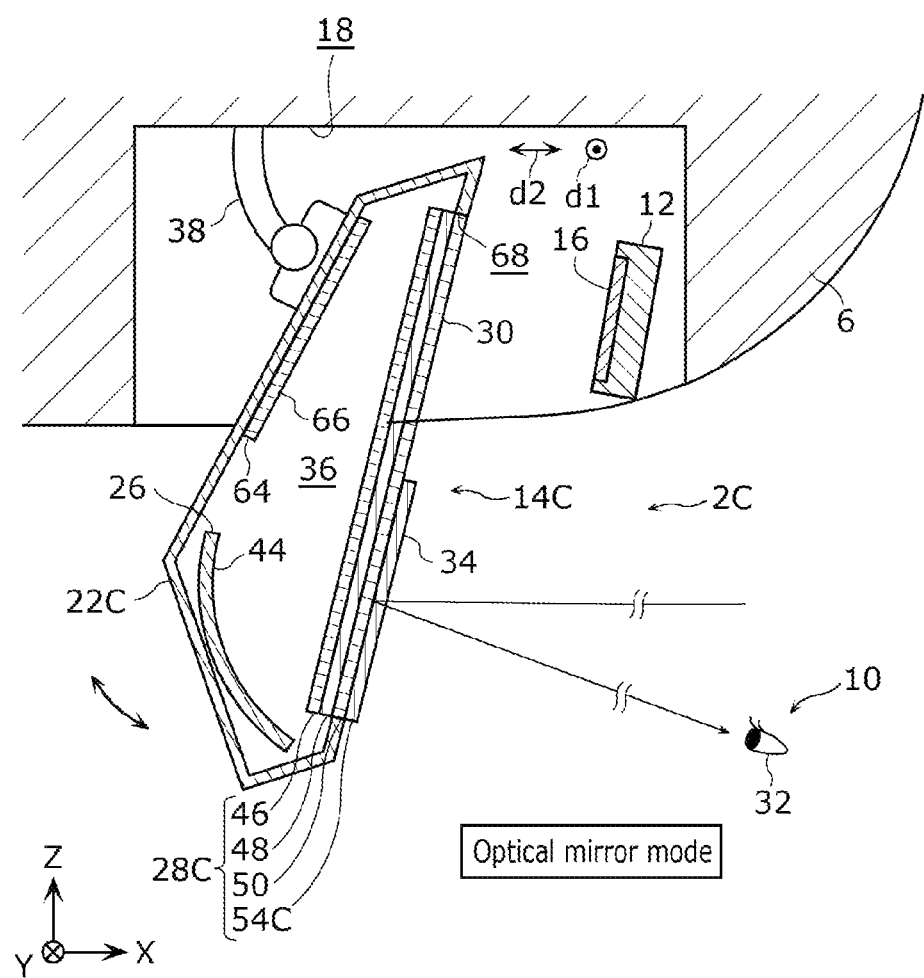
FIG. 11 is a cross-sectional view of the display system according to Embodiment 4 in the optical mirror mode.

A configuration of display system 2C according to Embodiment 4 is to be described with reference to FIG. 10 and FIG. 11. FIG. 10 is a cross-sectional view of display system 2C according to Embodiment 4 in the electron mirror mode. FIG. 11 is a cross-sectional view of display system 2C according to Embodiment 4 in the optical mirror mode.

As illustrated in FIG. 10 and FIG. 11, in display system 2C according to Embodiment 4, optical reflector 14C includes casing 22C, concave mirror 26, optical element 28C, and plane mirror 64, and does not include dust cover 24 described in Embodiment 1 above.

Opening 68 that communicates with storage space 36 is formed in the side of casing 22C that faces both display element 12 and driver 10. Opening 68 of casing 22C extends over entrance 30 and exit 34 of optical reflector 14C.

Optical element 28C is covering opening 68 of casing 22C, and faces both reflection surface 44 of concave mirror 26 and reflection surface 66 of plane mirror 64. Thus, optical element 28C extends over entrance 30 and exit 34 of optical reflector 14C.

Optical element 28C includes wave plate 46, glass substrate 48, reflective polarizing plate 50, and wave plate 54C. Optical element 28C has a configuration in which wave plate 46, glass substrate 48, reflective polarizing plate 50, and wave plate 54C are stacked in this order with wave plate 46 being closest to concave mirror 26 and plane mirror 64. Note that the order in which the elements of optical element 28C are stacked is not limited to this, and optical element 28C may have a configuration in which, for example, wave plate 46, reflective polarizing plate 50, glass substrate 48, and wave plate 54C are stacked in this order with wave plate 46 being closest to concave mirror 26 and plane mirror 64.

In the present embodiment, the transmission axis of reflective polarizing plate 50 is in the same direction as first polarization direction d1, whereas the reflection axis of reflective polarizing plate 50 is in the same direction as second polarization direction d2, and the axes are perpendicular to each other. Wave plate 54C is disposed only at exit 34 of optical reflector 14C, and is not disposed at entrance 30 of optical reflector 14C. Thus, reflective polarizing plate 50 is disposed at entrance 30 of optical reflector 14C, and wave plate 54C is disposed at exit 34 of optical reflector 14C, on the surface of optical reflector 14C that faces driver 10.

In the present embodiment, wave plate 20 (see FIG. 2) described in Embodiment 1 above is not disposed on display surface 16 of display element 12.

[4-2. Operation of Display System]

Next, an operation of display system 2C according to Embodiment 4 is to be described with reference to FIG. 10 and FIG. 11.

In display system 2C according to Embodiment 4, the electron mirror mode and the optical mirror mode can be switched similarly to Embodiment 2 described above.

As illustrated in FIG. 10, in the electron mirror mode, the display of a rear-view image by display element 12 is on. Driver 10 rotates casing 22C relative to ball joint 38 to adjust the orientation of casing 22C such that the surface of optical element 28C facing driver 10 faces obliquely downward.

As illustrated in FIG. 10, first linearly polarized light from display surface 16 of display element 12 enters through entrance 30 of optical reflector 14C, that is, enters reflective polarizing plate 50 of optical element 28C. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50. The first linearly polarized light passing through reflective polarizing plate 50 passes through glass substrate 48 and enters wave plate 46.

The first linearly polarized light passing through wave plate 46 is converted by wave plate 46 into clockwise first circularly polarized light. The first circularly polarized light exiting wave plate 46 travels toward plane mirror 64, and is reflected by reflection surface 66 of plane mirror 64.

The first circularly polarized light reflected by reflection surface 66 of plane mirror 64 travels toward wave plate 46 of optical element 28C. The first circularly polarized light passing through wave plate 46 is converted by wave plate 46 into second linearly polarized light. The second linearly polarized light exiting wave plate 46 passes through glass substrate 48 and falls onto reflective polarizing plate 50. At this time, second polarization direction d2 of the second linearly polarized light falling on reflective polarizing plate 50 is the same as the direction of the reflection axis of reflective polarizing plate 50. Accordingly, the second linearly polarized light falling on reflective polarizing plate 50 is reflected by reflective polarizing plate 50.

The second linearly polarized light reflected by reflective polarizing plate 50 passes through glass substrate 48 and enters wave plate 46. The second linearly polarized light passing through wave plate 46 is converted by wave plate 46 into counterclockwise second circularly polarized light. The second circularly polarized light exiting wave plate 46 travels toward concave mirror 26, and is reflected by reflection surface 44 of concave mirror 26.

The second circularly polarized light reflected by reflection surface 44 of concave mirror 26 travels toward wave plate 46 of optical element 28C. The second circularly polarized light passing through wave plate 46 is converted by wave plate 46 into first linearly polarized light. The first linearly polarized light exiting wave plate 46 passes through glass substrate 48 and enters reflective polarizing plate 50. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50.

The first linearly polarized light passing through reflective polarizing plate 50 enters wave plate 54C. The first linearly polarized light passing through wave plate 54C is converted by wave plate 54C into first circularly polarized light. The first circularly polarized light that has exited through exit 34 of optical reflector 14C, that is, the first circularly polarized light exiting wave plate 54C enters eye 32 of driver 10.

On the other hand, as illustrated in FIG. 11, in the optical mirror mode, the display of a rear-view image by display element 12 is off. Driver 10 rotates casing 22C relative to ball joint 38 to adjust the orientation of casing 22C such that the surface of optical element 28C facing driver 10 faces rearward of vehicle 4 (see FIG. 1). Light from the outside that has entered from the rear of vehicle 4 (light showing the rear view of vehicle 4) is reflected by reflective polarizing plate 50 of optical element 28C.

[4-3. Advantageous Effects]

Accordingly, in the present embodiment, in the electron mirror mode, light emitted through display surface 16 of display element 12 (i) is reflected by reflection surface 66 of plane mirror 64, (ii) is reflected by reflective polarizing plate 50 of optical element 28C, and (iii) is reflected by reflection surface 44 of concave mirror 26, and thereafter passes through optical element 28C and enters eye 32 of driver 10.

Accordingly, the length of an optical path along which light emitted through display surface 16 of display element 12 travels until the light is reflected by reflection surface 44 of concave mirror 26 can be ensured, and the viewing distance can be increased.

Embodiment 5

[5-1. Configuration of Display System]

Figure 12:
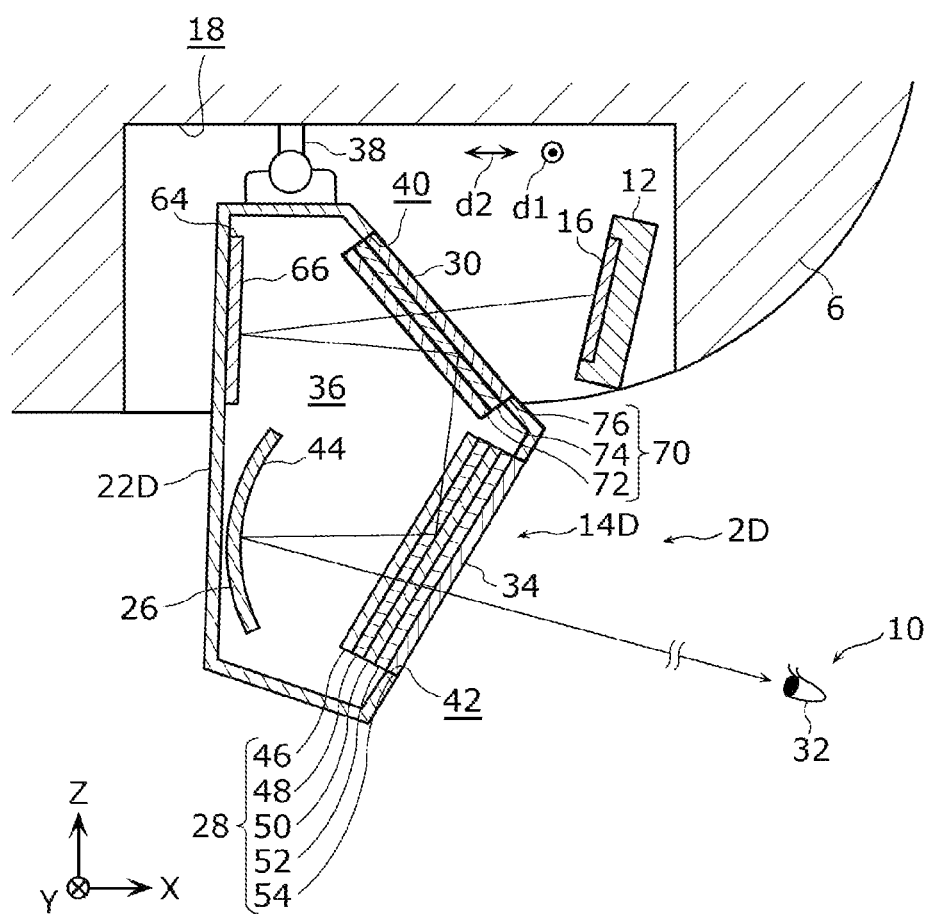
FIG. 12 is a cross-sectional view of a display system according to Embodiment 5.

A configuration of display system 2D according to Embodiment 5 is to be described with reference to FIG. 12. FIG. 12 is a cross-sectional view of display system 2D according to Embodiment 5.

As illustrated in FIG. 12, in display system 2D according to Embodiment 5, optical reflector 14D includes casing 22D, concave mirror 26, optical element 28, plane mirror 64, and half mirror 70, and does not include dust cover 24 described in Embodiment 1 above.

Half mirror 70 is covering opening 40 of casing 22D, and is disposed between display element 12 and plane mirror 64. Thus, half mirror 70 is disposed at entrance 30 of optical reflector 14D. Half mirror 70 includes wave plate 72, glass substrate 74, and reflective polarizing plate 76. Half mirror 70 has a configuration in which wave plate 72, glass substrate 74, and reflective polarizing plate 76 are stacked in this order with wave plate 72 being closest to plane mirror 64. Note that the order in which the elements of half mirror 70 are stacked is not limited to this, and half mirror 70 may have a configuration in which, for example, wave plate 72, reflective polarizing plate 76, and glass substrate 74 are stacked in this order with wave plate 72 being closest to plane mirror 64.

Wave plate 72, glass substrate 74, and reflective polarizing plate 76 of half mirror 70 have similar functions to those of wave plate 46, glass substrate 48, and reflective polarizing plate 50 of optical element 28, respectively. In the present embodiment, the transmission axis of reflective polarizing plate 76 of half mirror 70 is in the same direction as first polarization direction d1, whereas the reflection axis of reflective polarizing plate 76 is in the same direction as second polarization direction d2, and the axes are perpendicular to each other.

In the present embodiment, the reflection axis of reflective polarizing plate 50 of optical element 28 is in the same direction as first polarization direction d1, whereas the transmission axis of reflective polarizing plate 50 is in the same direction as second polarization direction d2, and the axes are perpendicular to each other.

In the present embodiment, wave plate 20 (see FIG. 2) described in Embodiment 1 above is not disposed on display surface 16 of display element 12.

[5-2. Operation of Display System]

Next, an operation of display system 2D according to Embodiment 5 is to be described with reference to FIG. 12.

As illustrated in FIG. 12, first linearly polarized light from display surface 16 of display element 12 enters reflective polarizing plate 76 of half mirror 70. At this time, first polarization direction d1 of the first linearly polarized light entering reflective polarizing plate 76 is the same as the direction of the transmission axis of reflective polarizing plate 76. Accordingly, the first linearly polarized light entering reflective polarizing plate 76 passes through reflective polarizing plate 76. The first linearly polarized light passing through reflective polarizing plate 76 passes through glass substrate 74 and enters wave plate 72.

The first linearly polarized light passing through wave plate 72 is converted by wave plate 72 into clockwise first circularly polarized light. The first circularly polarized light exiting wave plate 72 travels toward plane mirror 64, and is reflected by reflection surface 66 of plane mirror 64.

The first circularly polarized light reflected by reflection surface 66 of plane mirror 64 travels toward wave plate 72 of half mirror 70. The first circularly polarized light passing through wave plate 72 is converted by wave plate 72 into second linearly polarized light. The second linearly polarized light exiting wave plate 72 passes through glass substrate 74 and falls onto reflective polarizing plate 76. At this time, second polarization direction d2 of the second linearly polarized light falling on reflective polarizing plate 76 is the same as the direction of the reflection axis of reflective polarizing plate 76. Accordingly, the second linearly polarized light falling on reflective polarizing plate 76 is reflected by reflective polarizing plate 76.

The second linearly polarized light reflected by reflective polarizing plate 76 passes through glass substrate 74 and enters wave plate 72. The second linearly polarized light passing through wave plate 72 is converted by wave plate 72 into counterclockwise second circularly polarized light. The second circularly polarized light exiting wave plate 72 travels toward wave plate 46 of optical element 28.

The second circularly polarized light passing through wave plate 46 is converted by wave plate 46 into first linearly polarized light. The first linearly polarized light exiting wave plate 46 passes through glass substrate 48 and falls onto reflective polarizing plate 50. At this time, first polarization direction d1 of the first linearly polarized light falling on reflective polarizing plate 50 is the same as the direction of the reflection axis of reflective polarizing plate 50. Accordingly, the first linearly polarized light falling on reflective polarizing plate 50 is reflected by reflective polarizing plate 50.

The first linearly polarized light reflected by reflective polarizing plate 50 passes through glass substrate 48 and enters wave plate 46. The second linearly polarized light passing through wave plate 46 is converted by wave plate 46 into first circularly polarized light. The first circularly polarized light passing through wave plate 46 travels toward concave mirror 26, and is reflected by reflection surface 44 of concave mirror 26.

The first circularly polarized light reflected by reflection surface 44 of concave mirror 26 travels toward wave plate 46 of optical element 28. The first circularly polarized light passing through wave plate 46 is converted by wave plate 46 into second linearly polarized light. The second linearly polarized light exiting wave plate 46 passes through glass substrate 48 and enters reflective polarizing plate 50. At this time, second polarization direction d2 of the second linearly polarized light entering reflective polarizing plate 50 is the same as the direction of the transmission axis of reflective polarizing plate 50. Accordingly, the second linearly polarized light entering reflective polarizing plate 50 passes through reflective polarizing plate 50.

The second linearly polarized light passing through reflective polarizing plate 50 enters transmissive polarizing plate 52. At this time, second polarization direction d2 of the second linearly polarized light entering transmissive polarizing plate 52 is the same as the direction of the transmission axis of transmissive polarizing plate 52. Accordingly, the second linearly polarized light entering transmissive polarizing plate 52 passes through transmissive polarizing plate 52.

The second linearly polarized light passing through transmissive polarizing plate 52 enters wave plate 54, and is converted by wave plate 54 into second circularly polarized light. The second circularly polarized light exiting wave plate 54 enters eye 32 of driver 10.

[5-3. Advantageous Effects]

Accordingly, in the present embodiment, light emitted through display surface 16 of display element 12 (*i*) is reflected by reflection surface 66 of plane mirror 64, (ii) is reflected by reflective polarizing plate 76 of half mirror 70, (iii) is reflected by reflective polarizing plate 50 of optical element 28, and (iv) is reflected by reflection surface 44 of concave mirror 26, and thereafter passes through optical element 28 and enters eye 32 of driver 10.

Accordingly, the length of an optical path along which light emitted through display surface 16 of display element 12 travels until the light is reflected by reflection surface 44 of concave mirror 26 can be ensured, and the viewing distance can be increased.

Embodiment 6

[6-1. Configuration of Display System]

Figure 13:
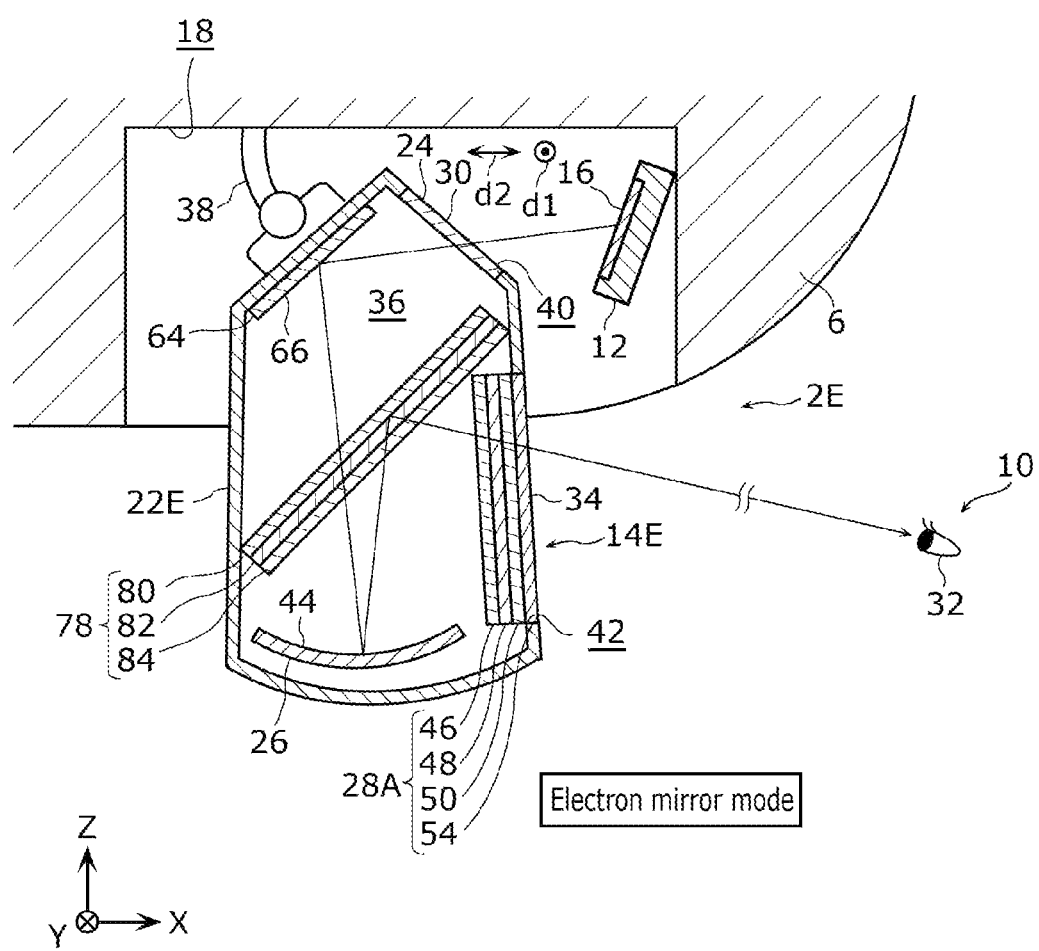
FIG. 13 is a cross-sectional view of a display system according to Embodiment 6 in the electron mirror mode.
Figure 14:
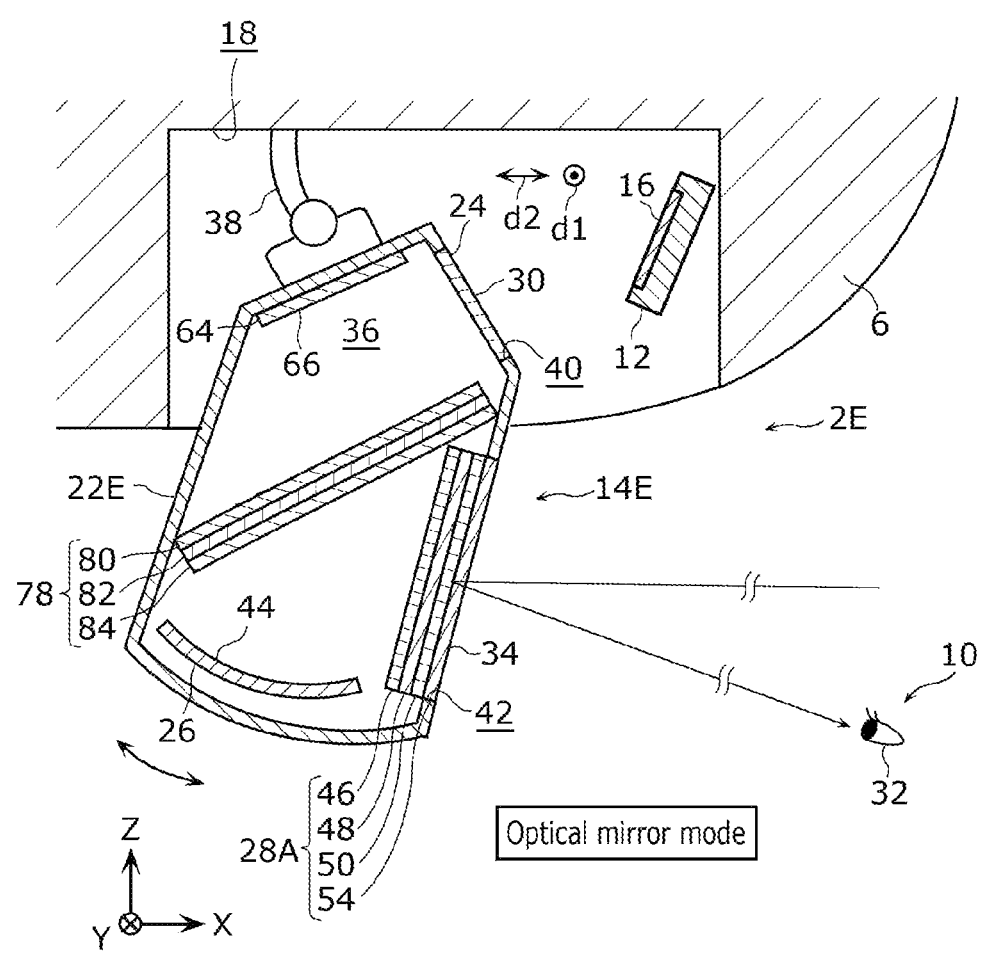
FIG. 14 is a cross-sectional view of the display system according to Embodiment 6 in the optical mirror mode.
Figure 15:
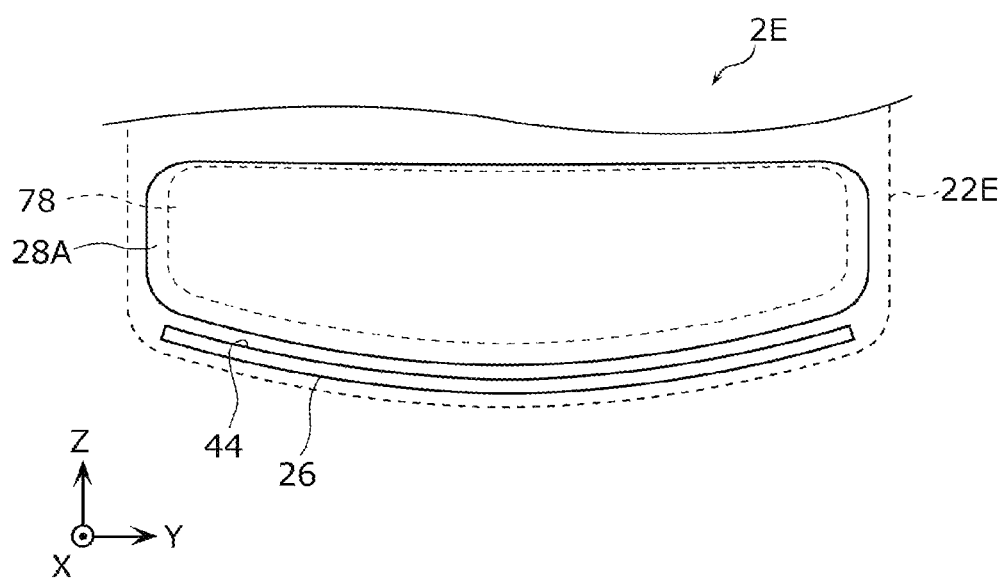
FIG. 15 is a front view illustrating a concave mirror, an optical element, and a half mirror of the display system according to Embodiment 6.

A configuration of display system 2E according to Embodiment 6 is to be described with reference to FIG. 13 to FIG. 15. FIG. 13 is a cross-sectional view of display system 2E according to Embodiment 6 in the electron mirror mode. FIG. 14 is a cross-sectional view of display system 2E according to Embodiment 6 in the optical mirror mode. FIG. 15 is a front view illustrating concave mirror 26, optical element 28A, and half mirror 78 of display system 2E according to Embodiment 6.

As illustrated in FIG. 13 and FIG. 14, optical reflector 14E includes casing 22E, dust cover 24, concave mirror 26, optical element 28A, plane mirror 64, and half mirror 78, in display system 2E according to Embodiment 6.

Half mirror 78 is disposed between plane mirror 64 and concave mirror 26 in storage space 36 of casing 22E. Half mirror 78 includes reflective polarizing plate 80, glass substrate 82, and wave plate 84. Half mirror 78 has a configuration in which reflective polarizing plate 80, glass substrate 82, and wave plate 84 are stacked in this order with reflective polarizing plate 80 being closest to plane mirror 64. Note that the order in which the elements of half mirror 78 are stacked is not limited to this, and half mirror 78 may have a configuration in which, for example, glass substrate 82, reflective polarizing plate 80, and wave plate 84 are stacked in this order with glass substrate 82 being closest to plane mirror 64. Reflective polarizing plate 80, glass substrate 82, and wave plate 84 of half mirror 78 have similar functions to those of reflective polarizing plate 50, glass substrate 48, and wave plate 46 of optical element 28, respectively. In the present embodiment, the transmission axis of reflective polarizing plate 80 of half mirror 78 is in the same direction as first polarization direction d1, whereas the reflection axis of reflective polarizing plate 80 is in the same direction as second polarization direction d2, and the axes are perpendicular to each other.

In the present embodiment, the transmission axis of reflective polarizing plate 50 of optical element 28A is in the same direction as first polarization direction d1, whereas the reflection axis of reflective polarizing plate 50 is in the same direction as second polarization direction d2, and the axes are perpendicular to each other.

As illustrated in FIG. 15, concave mirror 26 is disposed such that reflection surface 44 faces upward of vehicle 4 (see FIG. 1). Lower end portions of optical element 28A and half mirror 78 are each formed into a convex shape in conformity with the shape of concave mirror 26 on the reflection surface 44 side. Note that upper end portions (on the plane mirror 64 side) of optical element 28A and half mirror 78 are each linearly formed. Accordingly, the lower end portions of optical element 28A and half mirror 78 can be disposed adjacent to reflection surface 44 of concave mirror 26, so that casing 22E can be reduced in size.

In the present embodiment, wave plate 20 (see FIG. 2) described in Embodiment 1 above is not disposed on display surface 16 of display element 12.

[6-2. Operation of Display System]

Next, an operation of display system 2E according to Embodiment 6 is to be described with reference to FIG. 13 and FIG. 14.

In display system 2E according to Embodiment 6, the electron mirror mode and the optical mirror mode can be switched similarly to Embodiment 2 described above.

As illustrated in FIG. 13, in the electron mirror mode, the display of a rear-view image by display element 12 is on. Driver 10 rotates casing 22E relative to ball joint 38 to adjust the orientation of casing 22E such that the surface of optical element 28A facing driver 10 faces obliquely upward (in other words, the ceiling of vehicle 4 is reflected in optical element 28A). Accordingly, light from the outside can be prevented from being reflected in optical element 28A. As will be described later, the amount of rotating casing 22E is small when switching from the electron mirror mode to the optical mirror mode.

As illustrated in FIG. 13, first linearly polarized light from display surface 16 of display element 12 passes through dust cover 24, travels toward plane mirror 64, and is reflected by reflection surface 66 of plane mirror 64.

The first linearly polarized light reflected by reflection surface 66 of plane mirror 64 travels toward reflective polarizing plate 80 of half mirror 78 and enters reflective polarizing plate 80. At this time, first polarization direction d1 of the first linearly polarized light entering reflective polarizing plate 80 is the same as the direction of the transmission axis of reflective polarizing plate 80. Accordingly, the first linearly polarized light entering reflective polarizing plate 80 passes through reflective polarizing plate 80.

The first linearly polarized light passing through reflective polarizing plate 80 passes through glass substrate 82 and enters wave plate 84. The first linearly polarized light passing through wave plate 84 is converted by wave plate 84 into first circularly polarized light. The first circularly polarized light exiting wave plate 84 travels toward concave mirror 26, and is reflected by reflection surface 44 of concave mirror 26.

The first circularly polarized light reflected by reflection surface 44 of concave mirror 26 travels toward wave plate 84 of half mirror 78. The first circularly polarized light passing through wave plate 84 is converted by wave plate 84 into second linearly polarized light. The second linearly polarized light exiting wave plate 84 passes through glass substrate 82 and falls onto reflective polarizing plate 80. At this time, second polarization direction d2 of the second linearly polarized light falling on reflective polarizing plate 80 is the same as the direction of the reflection axis of reflective polarizing plate 80. Accordingly, the second linearly polarized light falling on reflective polarizing plate 80 is reflected by reflective polarizing plate 80.

The second linearly polarized light reflected by reflective polarizing plate 80 passes through glass substrate 82 and enters wave plate 84. The second linearly polarized light passing through wave plate 84 is converted by wave plate 84 into second circularly polarized light. The second circularly polarized light exiting wave plate 84 travels toward wave plate 46 of optical element 28A.

The second circularly polarized light passing through wave plate 46 is converted by wave plate 46 into first linearly polarized light. The first linearly polarized light exiting wave plate 46 passes through glass substrate 48 and enters reflective polarizing plate 50. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50.

The first linearly polarized light passing through reflective polarizing plate 50 is converted by wave plate 54 into first circularly polarized light. The first circularly polarized light exiting wave plate 54 enters eye 32 of driver 10.

On the other hand, as illustrated in FIG. 14, the display of a rear-view image by display element 12 is off in the optical mirror mode. Driver 10 rotates casing 22E relative to ball joint 38 to adjust the orientation of casing 22E such that the surface of optical element 28A facing driver 10 faces rearward of vehicle 4. Light from the outside that has entered from the rear of vehicle 4 is reflected by reflective polarizing plate 50 of optical element 28A.

[6-3. Advantageous Effects]

In the present embodiment, light emitted through display surface 16 of display element 12 (i) is reflected by reflection surface 66 of plane mirror 64, (ii) is reflected by reflection surface 44 of concave mirror 26, and (iii) is reflected by reflective polarizing plate 80 of half mirror 78, and thereafter passes through optical element 28A and enters eye 32 of driver 10.

Accordingly, the length of an optical path along which light emitted through display surface 16 of display element 12 travels until the light is reflected by reflection surface 44 of concave mirror 26 can be ensured, and the viewing distance can be increased.

[6-4. Variation]

Figure 16:
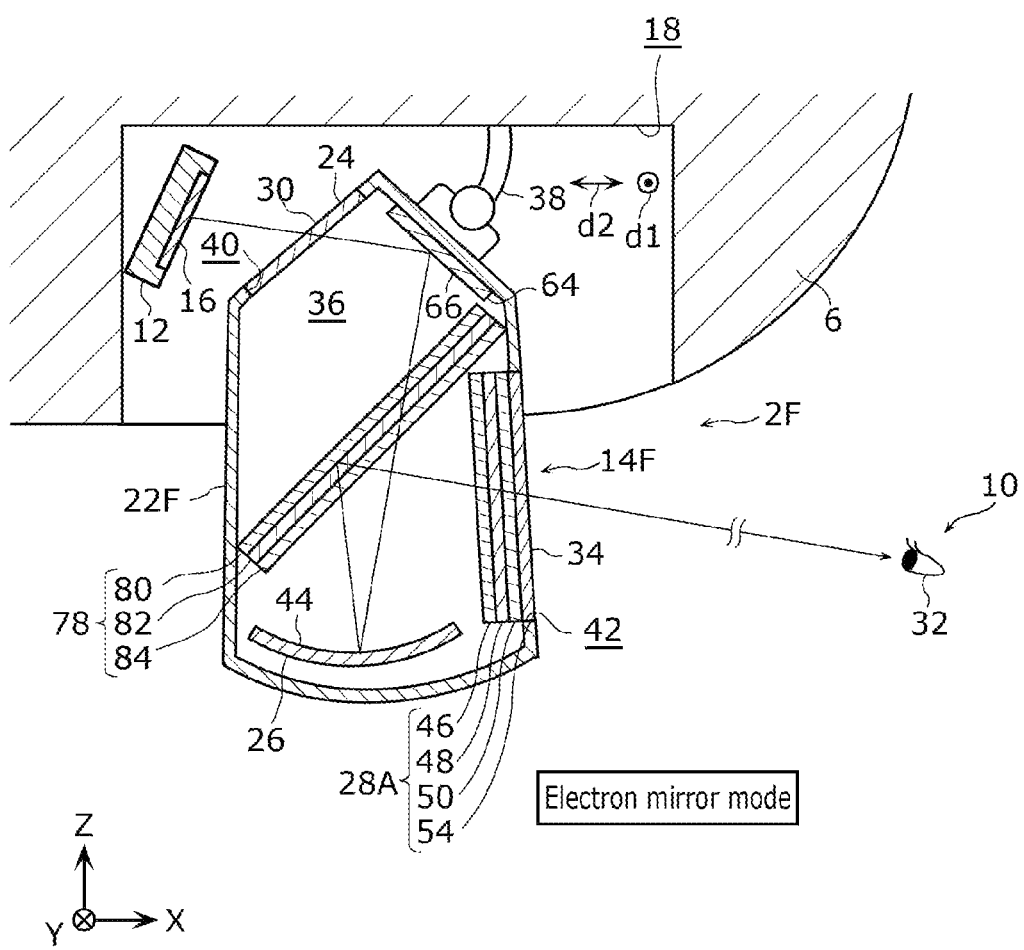
FIG. 16 is a cross-sectional view of a display system according to a variation of Embodiment 6 in the electron mirror mode.

A configuration of display system 2F according to a variation of Embodiment 6 is to be described with reference to FIG. 16. FIG. 16 is a cross-sectional view of display system 2F according to the variation of Embodiment 6 in the electron mirror mode.

As illustrated in FIG. 16, in display system 2F according to the variation of Embodiment 6, the position of opening 40 of casing 22F of optical reflector 14F and the position of plane mirror 64 are switched in the front-and-rear direction. In consequence, display element 12 is disposed ahead of optical reflector 14F in the front-and-rear direction of vehicle 4. This configuration also yields advantageous effects as described above.

Embodiment 7

[7-1. Configuration of Display System]

Figure 17:
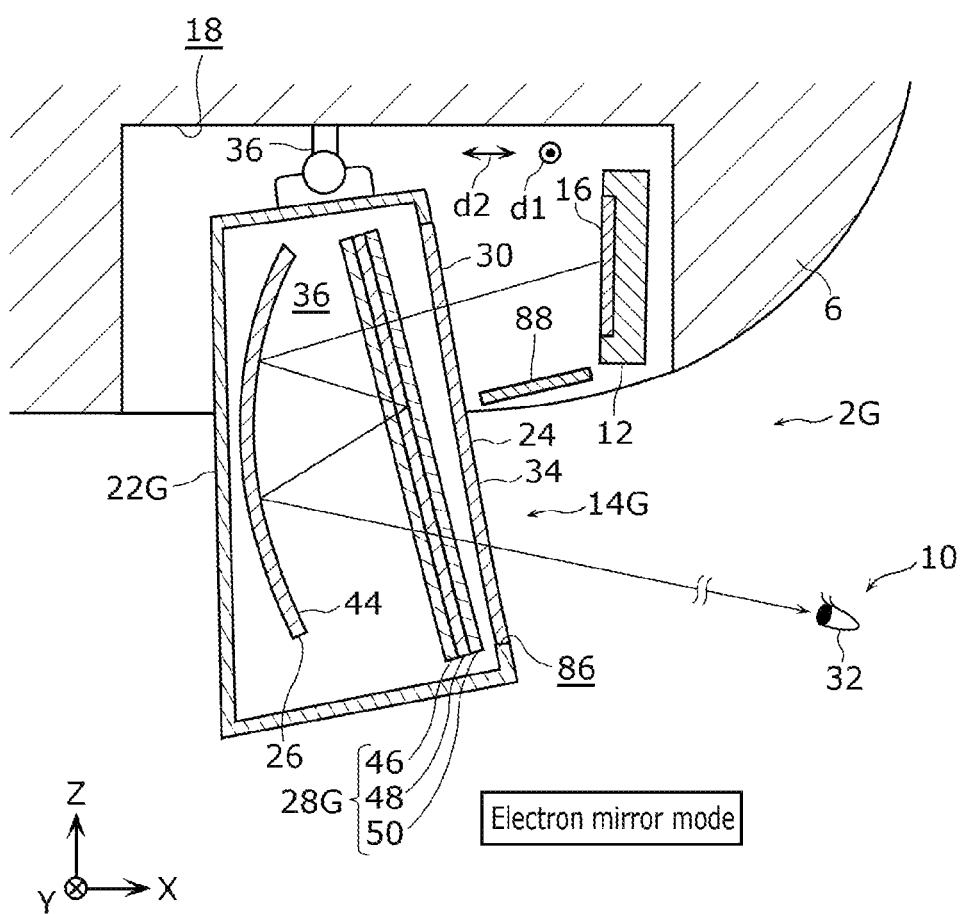
FIG. 17 is a cross-sectional view of a display system according to Embodiment 7 in the electron mirror mode.
Figure 18:
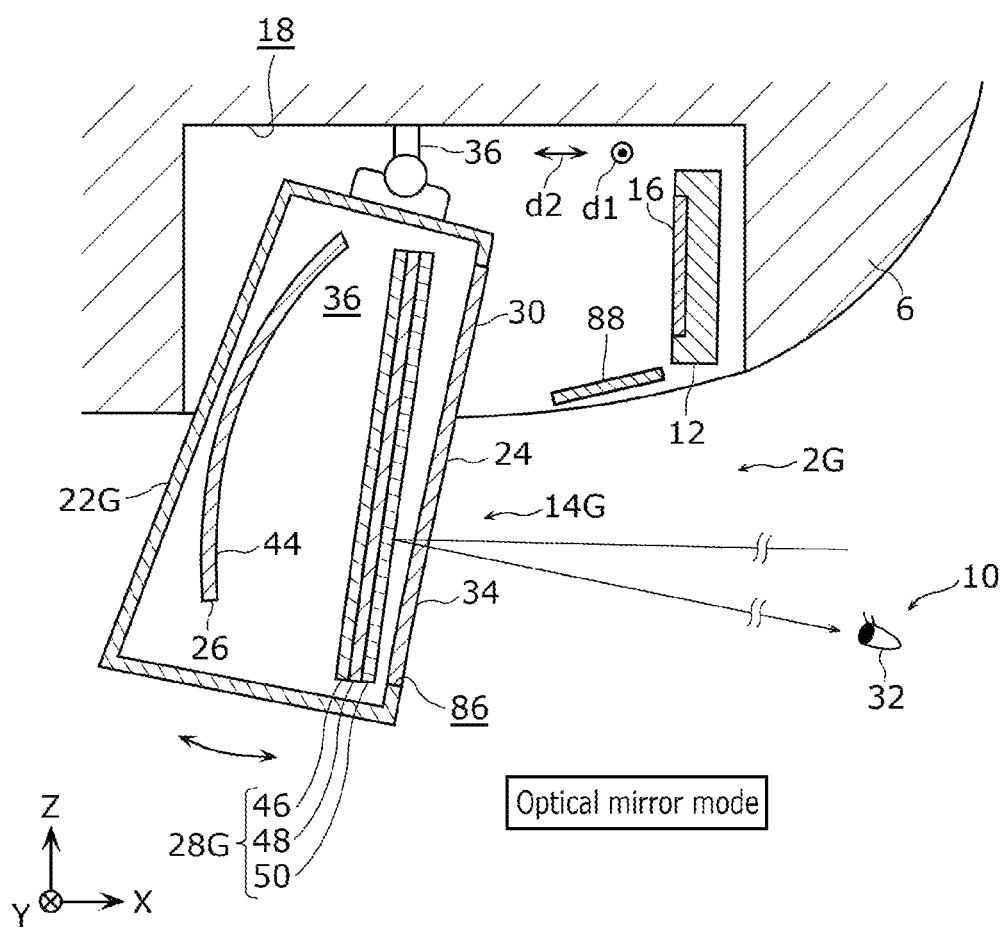
FIG. 18 is a cross-sectional view of the display system according to Embodiment 7 in the optical mirror mode.

A configuration of display system 2G according to Embodiment 7 is to be described with reference to FIG. 17 and FIG. 18. FIG. 17 is a cross-sectional view of display system 2G according to Embodiment 7 in the electron mirror mode. FIG. 18 is a cross-sectional view of display system 2G according to Embodiment 7 in the optical mirror mode.

As illustrated in FIG. 17 and FIG. 18, in display system 2G according to Embodiment 7, optical reflector 14G includes casing 22G, dust cover 24, concave mirror 26, and optical element 28G.

Opening 86 that communicates with storage space 36 is formed in the side of casing 22G that faces both display element 12 and driver 10. Opening 86 of casing 22G extends over entrance 30 and exit 34 of optical reflector 14G. Dust cover 24 is covering opening 86 of casing 22G.

Optical element 28G is disposed between dust cover 24 and concave mirror 26 in storage space 36 of casing 22G. Optical element 28G includes wave plate 46, glass substrate 48, and reflective polarizing plate 50. Optical element 28G has a configuration in which wave plate 46, glass substrate 48, and reflective polarizing plate 50 are stacked in this order with wave plate 46 being closest to concave mirror 26. Note that the order in which the elements of optical element 28G are stacked is not limited to this, and optical element 28G may have a configuration in which, for example, wave plate 46, reflective polarizing plate 50, and glass substrate 48 are stacked in this order with wave plate 46 being closest to concave mirror 26. In the present embodiment, optical element 28G is formed into a flat plate, but the shape is not limited thereto and optical element 28G may be formed into a cylinder, for example.

Reflective polarizing plate 50 faces dust cover 24. Stated differently, reflective polarizing plate 50 extends over entrance 30 and exit 34 of optical reflector 14G. In the present embodiment, the transmission axis of reflective polarizing plate 50 is in the same direction as first polarization direction d1, whereas the reflection axis of reflective polarizing plate 50 is in the same direction as second polarization direction d2, and the axes are perpendicular to each other.

Light-blocking member 88 is disposed between display element 12 and dust cover 24, covering an opening of recess 18 of overhead console 6. Light-blocking member 88 is formed of a light-blocking material, and is formed into a flat plate shape elongated in the lateral direction, for example.

In the present embodiment, wave plate 20 (see FIG. 2) described in Embodiment 1 above is not disposed on display surface 16 of display element 12.

[7-2. Operation of Display System]

Next, an operation of display system 2G according to Embodiment 7 is to be described with reference to FIG. 17 and FIG. 18.

In display system 2G according to Embodiment 7, the electron mirror mode and the optical mirror mode can be switched similarly to Embodiment 2 described above.

As illustrated in FIG. 17, the display of a rear-view image by display element 12 is on in the electron mirror mode.

Driver 10 rotates casing 22G relative to ball joint 38 to adjust the orientation of casing 22G such that the surface of dust cover 24 facing driver 10 faces obliquely upward.

As illustrated in FIG. 17, first linearly polarized light from display surface 16 of display element 12 passes through dust cover 24 and enters reflective polarizing plate 50 of optical element 28G. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50.

The first linearly polarized light passing through reflective polarizing plate 50 passes through glass substrate 48 and enters wave plate 46. The first linearly polarized light passing through wave plate 46 is converted by wave plate 46 into clockwise first circularly polarized light. The first circularly polarized light exiting wave plate 46 travels toward concave mirror 26, and is reflected by reflection surface 44 of concave mirror 26.

The first circularly polarized light reflected by reflection surface 44 of concave mirror 26 travels toward wave plate 46 of optical element 28G. The first circularly polarized light passing through wave plate 46 is converted by wave plate 46 into second linearly polarized light. The second linearly polarized light exiting wave plate 46 passes through glass substrate 48 and falls onto reflective polarizing plate 50. At this time, second polarization direction d2 of the second linearly polarized light falling on reflective polarizing plate 50 is the same as the direction of the reflection axis of reflective polarizing plate 50. Accordingly, the second linearly polarized light falling on reflective polarizing plate 50 is reflected by reflective polarizing plate 50.

The second linearly polarized light reflected by reflective polarizing plate 50 passes through glass substrate 48 and enters wave plate 46. The second linearly polarized light passing through wave plate 46 is converted by wave plate 46 into counterclockwise second circularly polarized light. The second circularly polarized light exiting wave plate 46 travels toward concave mirror 26, and is reflected by reflection surface 44 of concave mirror 26.

The second circularly polarized light reflected by reflection surface 44 of concave mirror 26 travels toward wave plate 46 of optical element 28G. The second circularly polarized light passing through wave plate 46 is converted by wave plate 46 into first linearly polarized light. The first linearly polarized light exiting wave plate 46 passes through glass substrate 48 and enters reflective polarizing plate 50. At this time, first polarization direction d1 of the first linearly polarized light entering reflective polarizing plate 50 is the same as the direction of the transmission axis of reflective polarizing plate 50. Accordingly, the first linearly polarized light entering reflective polarizing plate 50 passes through reflective polarizing plate 50. The first linearly polarized light passing through reflective polarizing plate 50 passes through dust cover 24 and enters eye 32 of driver 10.

On the other hand, as illustrated in FIG. 18, the display of a rear-view image by display element 12 is off in the optical mirror mode. Driver 10 rotates casing 22G relative to ball joint 38 to adjust the orientation of casing 22G such that the surface of optical element 28G facing driver 10 faces rearward of vehicle 4 (see FIG. 1). Light from the outside that has entered from the rear of vehicle 4 is reflected by reflective polarizing plate 50 of optical element 28G.

[7-3. Advantageous Effects]

Accordingly, in the present embodiment, light emitted through display surface 16 of display element 12 (*i*) is reflected by reflection surface 44 of concave mirror 26, (ii) is reflected by reflective polarizing plate 50 of optical element 28G, and (iii) is reflected by reflection surface 44 of concave mirror 26 again, and thereafter passes through optical element 28G and enters eye 32 of driver 10. Thus, light emitted through display surface 16 of display element 12 travels back and forth twice between optical element 28G and concave mirror 26, and thereafter enters eye 32 of driver 10.

Accordingly, the length of an optical path along which light emitted through display surface 16 of display element 12 travels until the light is reflected by reflection surface 44 of concave mirror 26 can be ensured, and the viewing distance can be increased.

Optical reflector 14G has a configuration in which concave mirror 26 and optical element 28G face each other, and thus the size of casing 22G in the front-and-rear direction can be decreased. Note that in the present embodiment, optical element 28G and dust cover 24 are provided separately from each other, yet a configuration can be adopted in which optical element 28G itself also functions as dust cover 24 as in Embodiment 4. Furthermore, a configuration may be adopted in which wave plate 34 (see FIG. 10) is disposed only in a light-exiting region of optical element 28G as in Embodiment 4.

[7-4. Variation]

Figure 19:
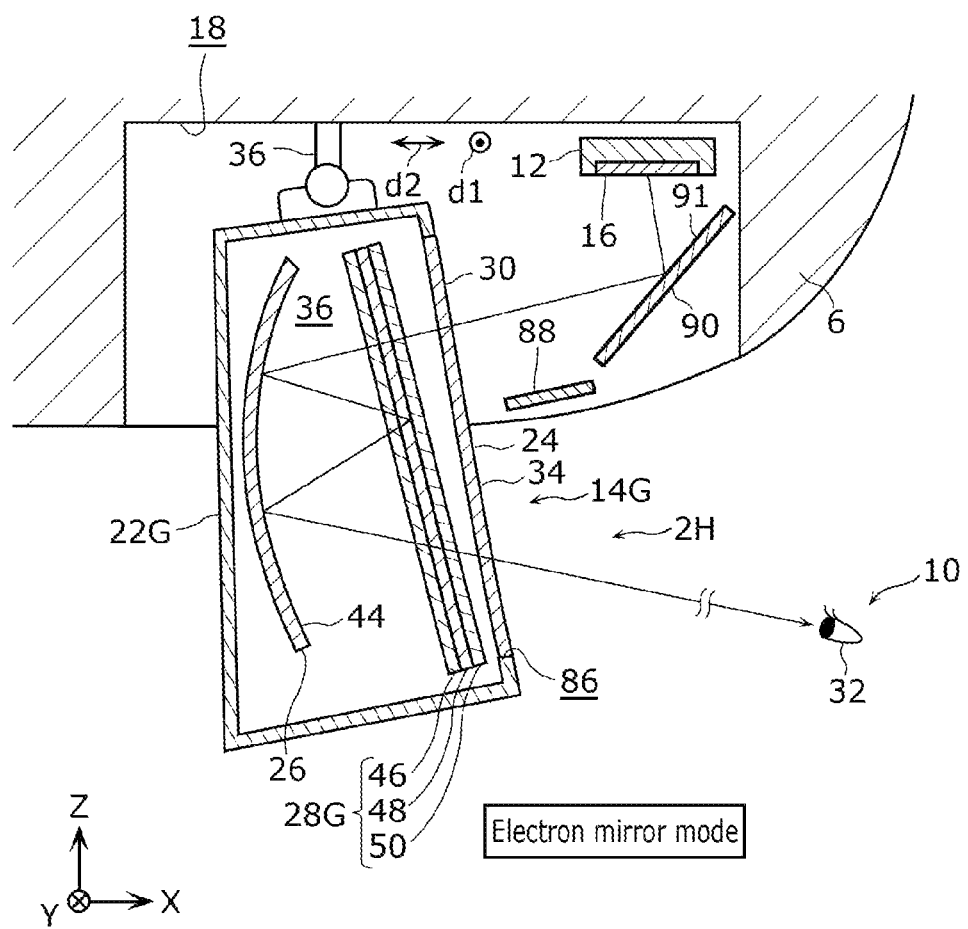
FIG. 19 is a cross-sectional view of a display system according to a variation of Embodiment 7 in the electron mirror mode.

A configuration of display system 2H according to a variation of Embodiment 7 is to be described with reference to FIG. 19. FIG. 19 is a cross-sectional view of display system 2H according to the variation of Embodiment 7 in the electron mirror mode.

As illustrated in FIG. 19, display element 12 is disposed such that display surface 16 faces downward of vehicle 4, in display system 2H according to the variation of Embodiment 7. Plane mirror 90 is disposed between display element 12 and light-blocking member 88. Plane mirror 90 includes planar reflection surface 91. Plane mirror 90 is tilted relative to the vertical direction such that reflection surface 91 faces both display element 12 and dust cover 24.

Light emitted through display surface 16 of display element 12 is reflected by reflection surface 91 of plane mirror 90, and thereafter enters dust cover 24.

In this variation, an optical path along which light emitted through display surface 16 of display element 12 travels until the light is reflected by concave mirror 26 can be ensured to have a still longer length, and thus a viewing distance can be more effectively increased.

Embodiment 8

[8-1. Configuration of Display System]

Figure 20:
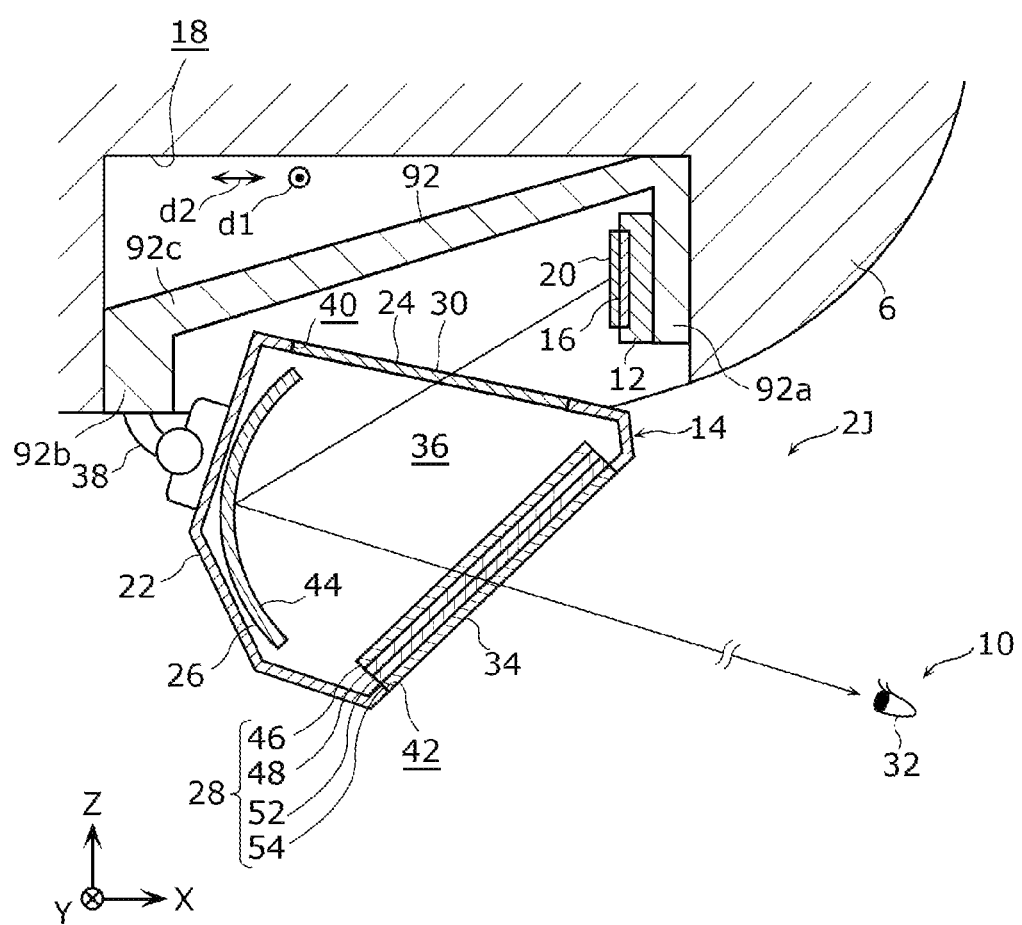
FIG. 20 is a cross-sectional view of a display system according to Embodiment 8.

A configuration of display system 23 according to Embodiment 8 is to be described with reference to FIG. 20. FIG. 20 is a cross-sectional view of display system 23 according to Embodiment 8.

As illustrated in FIG. 20, display system 23 according to Embodiment 8 includes holding member 92, in addition to the elements described in Embodiment 1 above.

Holding member 92 is disposed in recess 18 of overhead console 6, and is for maintaining the positional relation between display element 12 and optical reflector 14. Holding member 92 includes first holder 92*a* that holds display element 12, second holder 92*b* that holds optical reflector 14 via ball joint 38, and connector 92*c* that connects first holder 92*a* and second holder 92*b*. Accordingly, display element 12 is fixed to overhead console 6 via holding member 92.

[8-2. Advantageous Effects]

In the present embodiment, holding member 92 allows display system 23 to be provided as a unit. Accordingly, even before display system 23 is provided in vehicle 4 (see FIG. 1) (for example, when display system 23 is delivered from a factory), optical performance, for instance, of display system 23 can be inspected. Note that holding member 92 can be applied also to Embodiments 2 to 7 described above.

Embodiment 9

[9-1. Outline of Display System]

Figure 21:
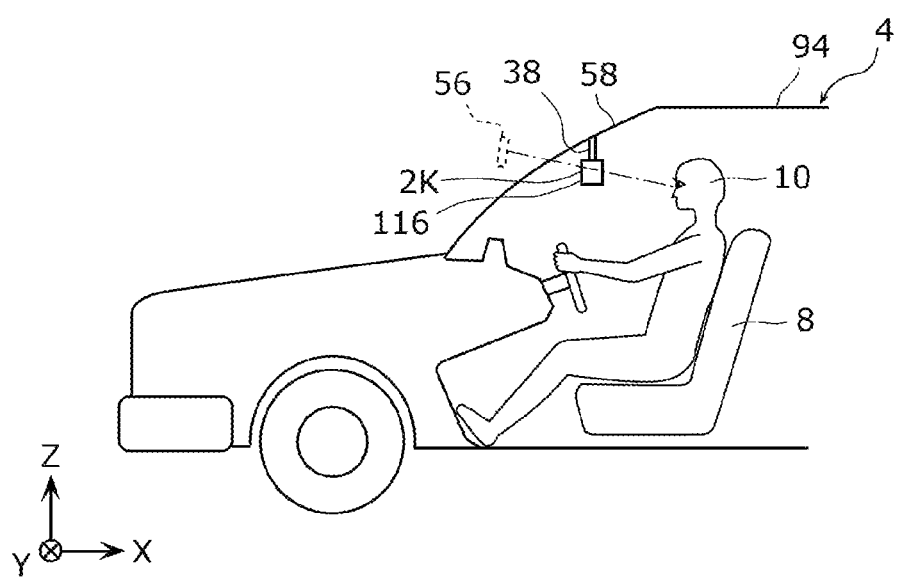
FIG. 21 illustrates an example of a vehicle provided with a display system according to Embodiment 9.

An outline of display system 2K according to Embodiment 9 is to be described with reference to FIG. 21. FIG. 21 illustrates an example of vehicle 4 provided with display system 2K according to Embodiment 9.

As illustrated in FIG. 21, display system 2K is attached to, for example, a portion of windshield 58 of vehicle 4 near ceiling 94 via ball joint 38. Accordingly, display system 2K is disposed at a position where display system 2K is in the view of driver 10 in a state in which driver 10 seated in driver seat 8 is looking frontward. Note that the present embodiment describes the case where display system 2K is attached to windshield 58, but is not limited thereto, and display system 2K may be attached to an overhead console, for example.

The coordinate system is defined as follows in the following description.

First, as illustrated in FIG. 21, a plane that includes an optical path (included in the dash-dot line in FIG. 21) along which light exiting display system 2K travels until the light reaches the eye(s) of driver 10 is defined as an XZ plane. Thus, FIG. 21 corresponds to a cross section of vehicle 4 cut along the XZ plane. Next, in the XZ plane, the up-and-down direction (the vertical direction) of vehicle 4 is define as the Z-axis direction. Next, the direction perpendicular to the XZ plane is defined as a Y-axis direction. Thus, the X-axis direction perpendicular to the Y-axis direction and the Z-axis direction is slightly tilted toward the Y-axis direction, relative to a straight line that connects the forward direction (hereinafter, also referred to as toward the front) of vehicle 4 and the rearward direction (hereinafter, also referred to as toward the rear) of vehicle 4. In FIG. 21, the "front" is on the negative side of the X axis, the "rear" is on the positive side of the X axis, "up" is on the positive side of the Z axis, and "down" is on the negative side of the Z axis.

Vehicle 4 is, for example, a car, a bus, or a truck. A camera (not illustrated) for capturing an image of a rear view of vehicle 4 is provided in, for instance, a rear bumper or a trunk hood of vehicle 4. Note that the present embodiment describes the case where display system 2K is provided in vehicle 4 that is a mobile body, but is not limited thereto, and may be provided in various types of mobile bodies such as a construction machine, an agricultural implement, a ship, and an aircraft, for example.

In the present embodiment, display system 2K is a so-called electron mirror for displaying a rear-view image (an example of an image) captured by the camera. Driver 10 can check the rear view of vehicle 4 that appears in a rear-view image, by looking at the rear-view image displayed by display system 2K. Thus, display system 2K is used as a substitute for a conventional physical rear-view mirror that shows a rear view of vehicle 4 using light reflection.

[9-2. Configuration of Display System]

Figure 22:
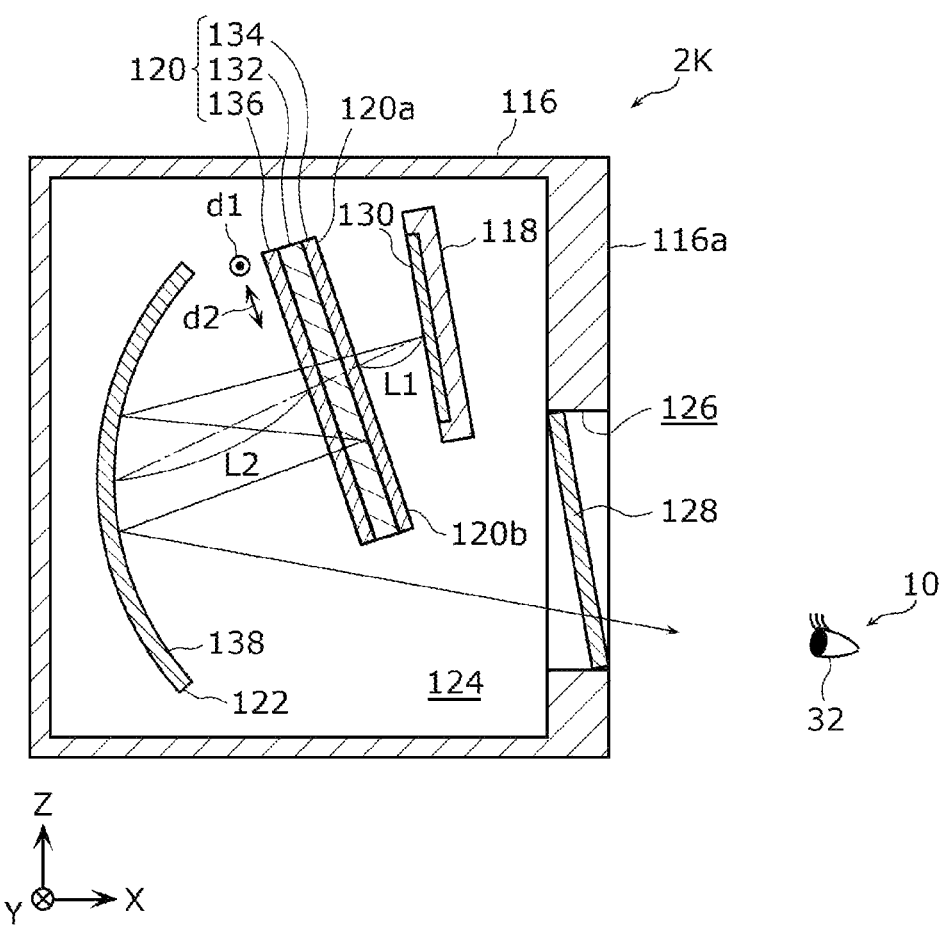
FIG. 22 is a cross-sectional view of the display system according to Embodiment 9.
Figure 23:
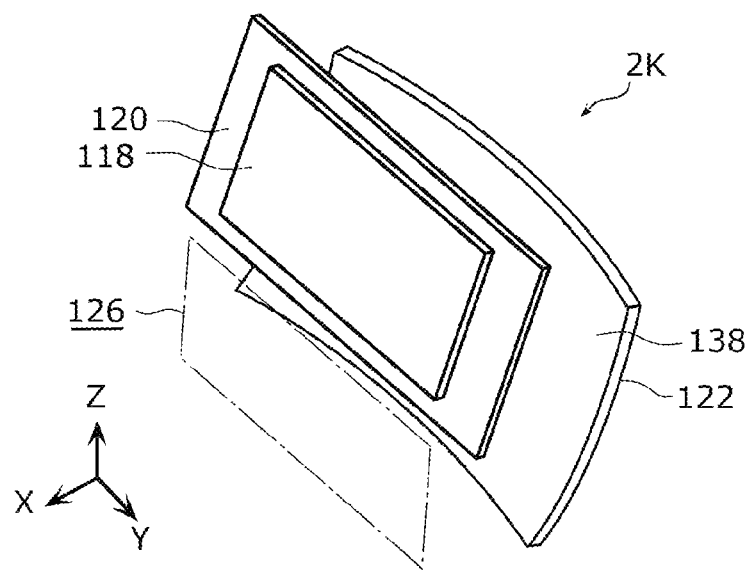
FIG. 23 is a perspective view of an internal structure of the display system according to Embodiment 9.

Next, a configuration of display system 2K according to Embodiment 9 is to be described with reference to FIG. 21 to FIG. 23. FIG. 22 is a cross-sectional view of display system 2K according to Embodiment 9. FIG. 23 is a perspective view of an internal structure of display system 2K according to Embodiment 9.

As illustrated in FIG. 22, display system 2K includes casing 116, display element 118, optical element 120, and mirror 122 (an example of a first mirror).

Casing 116 is formed of synthetic resin, for example, and includes storage space 124 therein. Storage space 124 of casing 116 stores display element 118, optical element 120, and mirror 122. As illustrated in FIG. 21, casing 116 is suspended from windshield 58 of vehicle 4 via ball joint 38. The orientation of casing 116 relative to windshield 58 of vehicle 4 can be changed by rotating casing 116 relative to ball joint 38.

Opening 126 that communicates with storage space 124 is formed in side 116a (an example of a frame) of casing 116 that faces driver 10. Opening 126 is formed into a rectangle horizontally long. Specifically, the size of opening 126 in the lateral direction (the Y-axis direction) is greater than the size thereof in the up-and-down direction (the Z-axis direction). As illustrated in FIG. 23, the size of opening 126 allows driver 10 to see a portion of the lateral width of reflection surface 138 (described later) of mirror 122.

Opening 126 of casing 116 is covered with plate-shaped dust cover 128 formed of transparent resin or glass, for example. Accordingly, dust and dirt from the outside can be prevented from getting in storage space 124 of casing 116 through opening 126. Note that dust cover 128 is tilted relative to the vertical direction such that the surface of dust cover 128 facing driver 10 faces obliquely upward. Accordingly, reflection of light from the outside in dust cover 128 can be reduced.

Display element 118 is an LCD, for example. Display element 118 includes display surface 130 for displaying a rear-view image captured by the camera of vehicle 4, and is disposed obliquely upward of opening 126 of casing 116. Display surface 130 is formed into a rectangle horizontally long, and is tilted relative to the vertical direction so as to face obliquely downward, for example. Display surface 130 is a surface through which light for forming a rear-view image is emitted. The light emitted through display surface 130 is first linearly polarized light having first polarization direction d1 (the direction perpendicular to the plane of FIG. 22, which is the Y-axis direction).

Optical element 120 is disposed between display element 118 and mirror 122. Specifically, optical element 120 is disposed ahead of display element 118, facing display surface 130 of display element 118. Optical element 120 includes glass substrate 132 (an example of a light-transmitting substrate), reflective polarizing plate 134 (an example of a polarizing element), and wave plate 136. Note that in the Specification, "plate" is a term having a concept that includes a member referred to as a film or sheet, for instance.

Optical element 120 is formed into a flat plate overall, and is tilted relative to display surface 130, being rotated about an axis (the Y axis) parallel to first polarization direction d1 described above. Note that in the Specification, "parallel" means not only being completely parallel, but also being substantially parallel, and thus an error of several degrees, for example, is included. Here, upper end portion 120a (an end portion on the positive side of the Z axis) of optical element 120 is closer to mirror 122, whereas lower end portion 120b (an end portion on the negative side of the Z axis) of optical element 120 is farther from mirror 122. Optical element 120 has a configuration in which reflective polarizing plate 134, glass substrate 132, and wave plate 136 are stacked in this order with reflective polarizing plate 134 being closest to display surface 130 of display element 118.

Glass substrate 132 is for supporting reflective polarizing plate 134 and wave plate 136, and is formed of a light-transmitting material such as, for example, transparent glass. Reflective polarizing plate 134 is superposed on the surface of glass substrate 132 that faces display element 118. Wave plate 136 is superposed on the surface of glass substrate 132 that faces mirror 122. Specifically, glass substrate 132 is stacked between reflective polarizing plate 134 and wave plate 136. Accordingly, when reflective polarizing plate 134 and wave plate 136 are each formed into a film, the occurrence of color irregularity (moire) caused by directly superposing reflective polarizing plate 134 and wave plate 136 can be reduced.

Out of light impinging onto reflective polarizing plate 134, reflective polarizing plate 134 transmits first linearly polarized light having first polarization direction d1, and reflects second linearly polarized light having second polarization direction d2 (that is the in-plane direction of FIG. 22 within the XZ plane) perpendicular to first polarization direction d1. Thus, the transmission axis of reflective polarizing plate 134 is in the same direction as first polarization direction d1, whereas the reflection axis of reflective polarizing plate 134 is in the same direction as second polarization direction d2, and the axes are perpendicular to each other. Note that in the Specification, "perpendicular" means not only forming completely right angles, but also forming substantially right angles, and thus an error of several degrees, for example, is included.

Wave plate 136 is a quarter-wave plate for converting linearly polarized light entering wave plate 136 into circularly polarized light, and converting circularly polarized light entering wave plate 136 into linearly polarized light. The slow axis of wave plate 136 is tilted 45 degrees relative to the reflection axis of reflective polarizing plate 134. Accordingly, wave plate 136 has a function of generating a phase difference of ¼ of wavelength λ (that is, a phase difference of 90 degrees) between rays of linearly polarized light perpendicular to each other out of the light entering wave plate 136.

Mirror 122 is disposed ahead of optical element 120, facing wave plate 136 of optical element 120. Thus, mirror 122 faces toward display surface 130 of display element 118. Mirror 122 is a concave mirror, and includes concave reflection surface 38 that is a free-form surface. Mirror 122 is formed by depositing a reflecting metal film such as an aluminum film on the surface of a resin-molded member, for example. Mirror 122 is disposed such that reflection surface 138 faces wave plate 136 of optical element 120.

Note that mirror 122 and reflective polarizing plate 134 are disposed non-parallel to each other. Specifically, in the XZ side view illustrated in FIG. 22, a tangent at the center of reflection surface 138 of mirror 122 and a tangent at the center of a surface of reflective polarizing plate 134 that faces display element 118 are non-parallel to each other.

[9-3. Operation of Display System]

Figure 24:
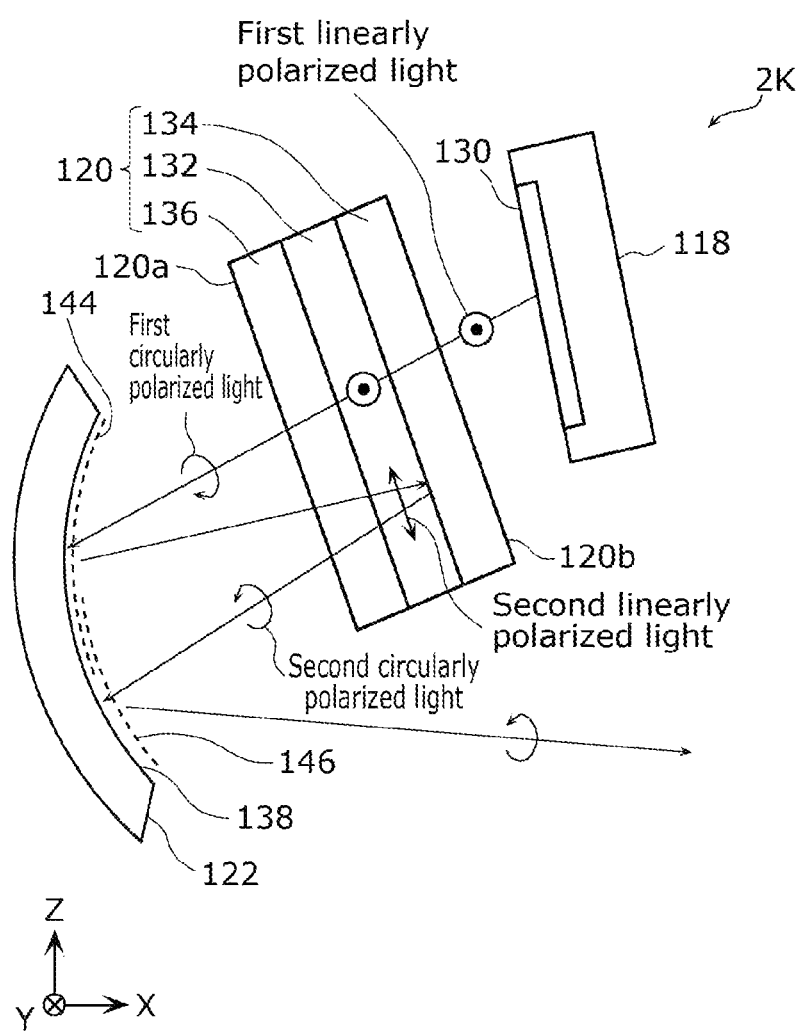
FIG. 24 is a schematic diagram illustrating the operation of the display system according to Embodiment 9.

Next, an operation of display system 2K according to Embodiment 9 is to be described with reference to FIG. 21, FIG. 22, and FIG. 24. FIG. 24 is a schematic diagram illustrating the operation of display system 2K according to Embodiment 9. Note that FIG. 24 schematically illustrates the arrangement and shapes, for instance, of elements of display system 2K.

As illustrated in FIG. 24, first linearly polarized light from display surface 130 of display element 118 enters reflective polarizing plate 134 of optical element 120. At this time, first polarization direction d1 of the first linearly polarized light entering reflective polarizing plate 134 is the same as the direction of the transmission axis of reflective polarizing plate 134. Accordingly, the first linearly polarized light entering reflective polarizing plate 134 passes through reflective polarizing plate 134.

The first linearly polarized light passing through reflective polarizing plate 134 passes through glass substrate 132 and travels into wave plate 136. The first linearly polarized light passing through wave plate 136 is converted by wave plate 136 into clockwise first circularly polarized light. The first circularly polarized light exiting wave plate 136 travels toward mirror 122, and is reflected by reflection surface 138 of mirror 122. Here, the first circularly polarized light exiting wave plate 136 may not necessary be circularly polarized light in a strict sense, and may be elliptically polarized light having an ellipticity (=the minor axis/the major axis) of 70% or less, for example. At this time, as will be described later, when the first circularly polarized light passing through wave plate 136 is converted into second linearly polarized light, loss in the amount of light due to a deviation from linearly polarized light in a strict sense is desirably one third or less. In this case, desired light is 66% or more of the linearly polarized light in a strict sense and visibility can be gained.

The first circularly polarized light reflected by reflection surface 138 of mirror 122 travels toward wave plate 136. The first circularly polarized light passing through wave plate 136 is converted by wave plate 136 into second linearly polarized light. The second linearly polarized light exiting wave plate 136 passes through glass substrate 132 and falls onto reflective polarizing plate 134. At this time, second polarization direction d2 of the second linearly polarized light falling on reflective polarizing plate 134 is the same as the direction of the reflection axis of reflective polarizing plate 134. Accordingly, the second linearly polarized light falling on reflective polarizing plate 134 is reflected by reflective polarizing plate 134.

The second linearly polarized light reflected by reflective polarizing plate 134 passes through glass substrate 132 and travels into wave plate 136. The second linearly polarized light passing through wave plate 136 is converted by wave plate 136 into counterclockwise second circularly polarized light having a different polarization direction from that of the first circularly polarized light. The second circularly polarized light exiting wave plate 136 travels toward mirror 122, and is reflected by reflection surface 138 of mirror 122.

As illustrated in FIG. 22, the second circularly polarized light reflected by reflection surface 138 of mirror 122 travels toward dust cover 128 without passing through optical element 120, passes through dust cover 128 (in other words, through opening 126), and enters eye 32 of driver 10.

As described above, light emitted through display surface 130 of display element 118 (i) is reflected by reflection surface 138 of mirror 122, (ii) is reflected by reflective polarizing plate 134, and (iii) is reflected by reflection surface 138 of mirror 122 again, and thereafter enters the eye(s) of driver 10. Thus, light emitted through display surface 130 of display element 118 travels back and forth twice between reflective polarizing plate 134 and mirror 122, and thereafter enters the eye(s) of driver 10.

Driver 10 sees virtual image 56 of a rear-view image as if the rear-view image were displayed at a display position ahead of display system 2K in the front-and-rear direction of vehicle 4, by viewing the rear-view image reflected by reflection surface 138 of mirror 122, as illustrated in FIG. 21. Accordingly, the amount of eye accommodation is comparatively small when driver 10 shifts the line of sight to virtual image 56 of the rear-view image in a state in which driver 10 is looking frontward of vehicle 4 through windshield 58.

Note that as illustrated in FIG. 24, reflection surface 138 of mirror 122 includes first reflection region 144 in which first circularly polarized light from wave plate 136 is reflected and second reflection region 146 in which second circularly polarized light is reflected. First reflection region 144 is located in an upper portion of reflection surface 138, and second reflection region 146 is located in a lower portion of reflection surface 138. At this time, a portion (a lower end portion) of first reflection region 144 overlaps a portion (an upper end portion) of second reflection region 146. Accordingly, the size of mirror 122 in the up-and-down direction can be reduced.

[9-4. Advantageous Effects]

Figure 25:
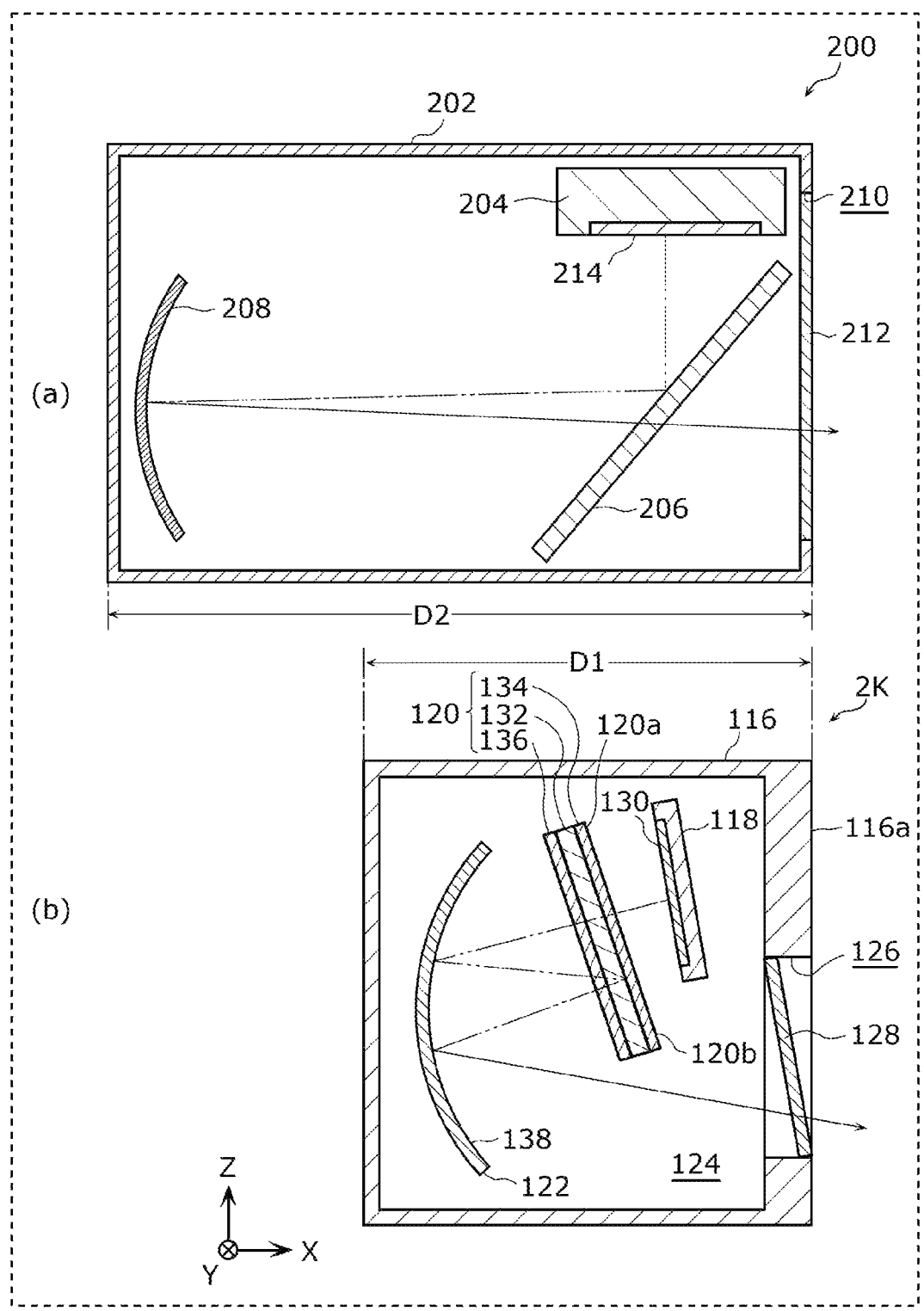
FIG. 25 illustrates a comparison between the display system according to Embodiment 9 and a display system according to a comparative example.

The following describes advantageous effects obtained by display system 2K according to Embodiment 9, by comparing display system 2K according to Embodiment 9 with display system 200 according to a comparative example, with reference to FIG. 25. FIG. 25 illustrates a comparison between display system 2K according to Embodiment 9 and display system 200 according to the comparative example.

As illustrated in (a) of FIG. 25, display system 200 according to the comparative example includes casing 202, display element 204 that includes, for instance, a liquid crystal display, optical element 206, and concave mirror 208.

Casing 202 stores therein display element 204, optical element 206, and concave mirror 208. Dust cover 212 is disposed over opening 210 of casing 202. Display element 204 includes display surface 214 for displaying a rear-view image, and a quarter-wave plate (not illustrated) is disposed on the outermost surface.

Optical element 206 faces display surface 214 of display element 204, and is tilted relative to display surface 214. Although not illustrated, optical element 206 is configured by superposing a reflective polarizing plate and a quarter-wave plate.

Concave mirror 208 has a free-form surface, and faces optical element 206.

Light emitted through display surface 214 of display element 204 is reflected by optical element 206, and thereafter falls onto concave mirror 208. Outgoing light reflected by concave mirror 208 passes through optical element 206, and thereafter passes through dust cover 212 and enters the eye(s) of a driver.

As described above, light emitted through display surface 214 of display element 204 (i) is reflected by optical element 206, and (ii) is reflected by concave mirror 208 and thereafter enters the eye(s) of the driver. Thus, light emitted through display surface 214 of display element 204 travels back and forth once between optical element 206 and concave mirror 208, and thereafter enters the eye(s) of the driver.

Here, the viewing distance from the eye(s) of the driver to the display position of a virtual image of a rear-view image is determined based on the length of an optical path along which outgoing light from display surface 214 of display element 204 travels via optical element 206 until the light reaches concave mirror 208 (the distance shown by the long dashed double-short dashed line in (a) of FIG. 25). Accordingly, it is necessary to set the length of the optical path to a predetermined length in order to ensure the viewing distance, but nevertheless the distances between elements (distances between optical element 206, display element 204, and concave mirror 208) are long, which results in an increase in the size of casing 202.

To address this, as illustrated in (b) of FIG. 25, in display system 2K according to Embodiment 9, light emitted through display surface 130 of display element 118 (i) is reflected by reflection surface 138 of mirror 122, (ii) is reflected by reflective polarizing plate 134, and (iii) is reflected by reflection surface 138 of mirror 122 again, and thereafter enters the eye(s) of driver 10. Thus, light emitted through display surface 130 of display element 118 travels back and forth twice between reflective polarizing plate 134 and mirror 122, and thereafter enters the eye(s) of driver 10.

Accordingly, when the length of an optical path along which outgoing light from display surface 130 of display element 118 travels via optical element 120 until the light is reflected again by mirror 122 (the distance shown by the long dashed double-short dashed line in (b) of FIG. 25) is set to the predetermined length, the distances between elements (distances between optical element 120, display element 118, and mirror 122 can be made short, and thus the size of casing 116 can be reduced.

Specifically, although the length of the optical path in (a) of FIG. 25 is the same as the length of the optical path in (b) of FIG. 25, size D1 of casing 116 in the front-and-rear direction of display system 2K according to Embodiment 9 is smaller than size D2 of casing 202 in the front-and-rear direction of display system 200 according to the comparative example. Thus, display system 2K according to Embodiment 9 yields advantageous effects of reducing the size while ensuring the viewing distance.

Note that as illustrated in FIG. 22, distance L1 between display element 118 and reflective polarizing plate 134 on the straight line (shown by the dash-dot line in FIG. 22) that connects the center of display surface 130 of display element 118 and the center of reflection surface 138 of mirror 122 may be shorter than distance L2 between wave plate 136 and mirror 122. Accordingly, the optical path described above can be ensured to have a longer length. On the contrary, although not illustrated, distance L1 between display element 118 and reflective polarizing plate 134 may be made longer than distance L2 between wave plate 136 and mirror 122. Accordingly, when optical element 120 and mirror 122 are stored in a single casing, the casing can be made thin.

As described above, the size of opening 126 of casing 116 allows driver 10 to see a portion of the lateral width of reflection surface 138 of mirror 122. Accordingly, driver 10 can see the portion of reflection surface 138 of mirror 122 ahead of the outer edge portion of opening 126, and thus can perceive the depth of a rear-view image.

Note that the size of opening 126 of casing 116 may allow driver 10 to see the entire lateral width of reflection surface 138 of mirror 122. Accordingly, it is not necessary to make the lateral width of mirror 122 greater than the lateral width of opening 126 of casing 116, and thus the size of mirror 122 can be reduced.

As described above, mirror 122 and reflective polarizing plate 134 are disposed non-parallel to each other in the XZ side view illustrated in FIG. 22. Accordingly, multiple reflection of light between mirror 122 and reflective polarizing plate 134 can be prevented.

Note that in the present embodiment, the elements illustrated in FIG. 22 are disposed in the XZ side view, but is not limited thereto, and the elements illustrated in FIG. 22 may be disposed in the XY top view. In this case, display system 2K can be used as an electronic outer mirror, and mirror 122 and reflective polarizing plate 134 are disposed non-parallel to each other in the XY top view. Accordingly, the position of display element 118 relative to mirror 122 can be shifted in the lateral direction (in the Y-axis direction), and the degree of freedom of the position of display element 118 can be enhanced. Note that in this case, display element 118 is disposed on a front door or an A-pillar, for example.

Embodiment 10

[10-1. Configuration of Display System]

Figure 26:
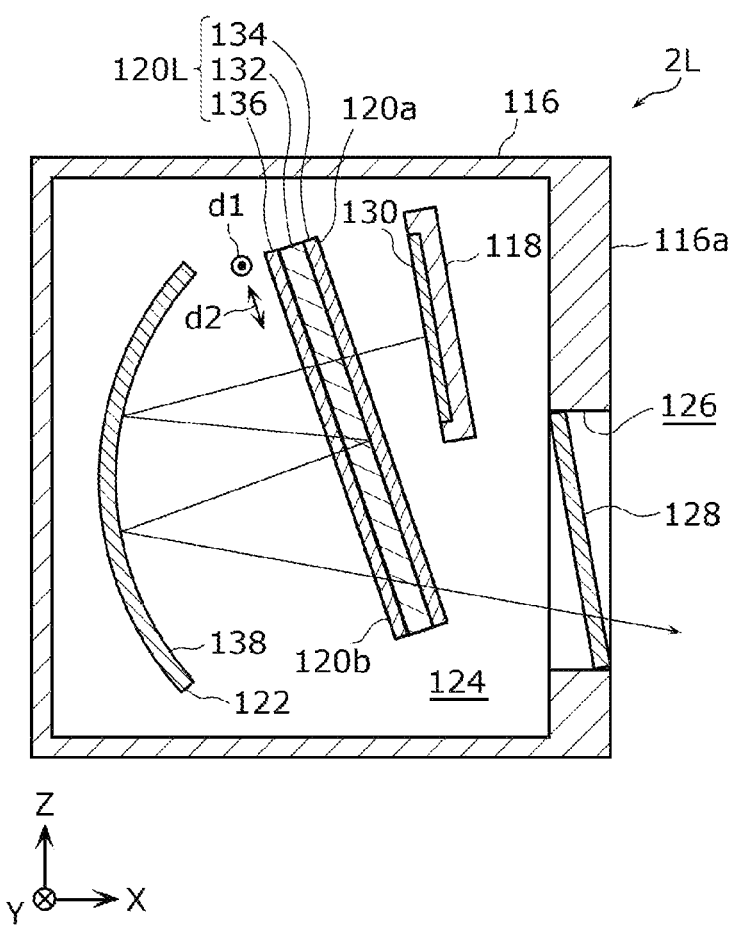
FIG. 26 is a cross-sectional view of a display system according to Embodiment 10.

A configuration of display system 2L according to Embodiment 10 is to be described with reference to FIG. 26. FIG. 26 is a cross-sectional view of display system 2L according to Embodiment 10. Note that in embodiments described below, the same numeral is given to the same element as in Embodiment 9 described above, and a description thereof is omitted.

In display system 2L according to Embodiment 10, the size of optical element 120L is different from Embodiment 9 described above, as illustrated in FIG. 26. Specifically, optical element 120L has a size that covers almost all the light reflected by reflection surface 138 of mirror 122. Thus, the height position of lower end portion 120b of optical element 120L from the bottom of casing 116 is lower than the height position in Embodiment 9 described above. Note that the height position of upper end portion 120a of optical element 120L from the bottom of casing 116 is the same as the height position in Embodiment 9 described above.

[10-2. Operation of Display System]

Figure 27:
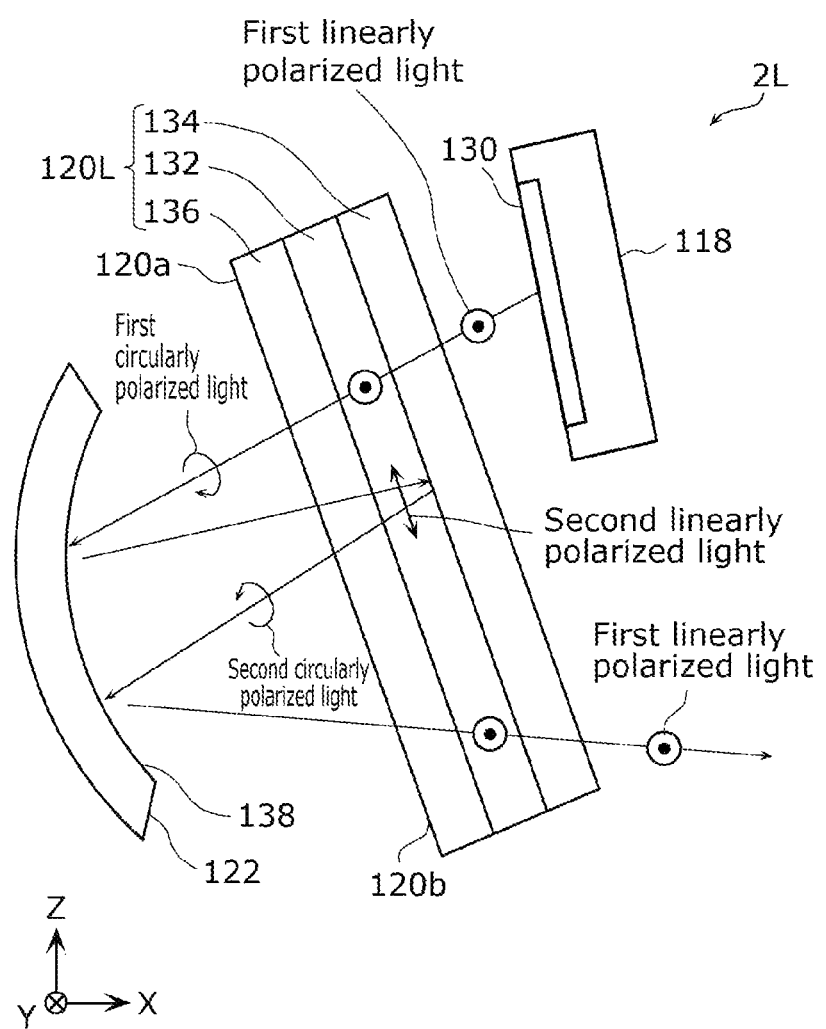
FIG. 27 is a schematic diagram illustrating an operation of the display system according to Embodiment 10.

Next, an operation of display system 2L according to Embodiment 10 is to be described with reference to FIG. 26 and FIG. 27. FIG. 27 is a schematic diagram illustrating an operation of display system 2L according to Embodiment 10. Note that FIG. 27 schematically illustrates the arrangement and shapes, for instance, of elements of display system 2L.

As illustrated in FIG. 27, light emitted through display surface 130 of display element 118 (i) is reflected by reflection surface 138 of mirror 122, (ii) is reflected by reflective polarizing plate 134, and (iii) is reflected by reflection surface 138 of mirror 122 again, similarly to Embodiment 9 described above.

After that, the light (second circularly polarized light) reflected again by reflection surface 138 of mirror 122 travels toward wave plate 136. The second circularly polarized light passing through wave plate 136 is converted by wave plate 136 into first linearly polarized light. The first linearly polarized light exiting wave plate 136 passes through glass substrate 132 and enters reflective polarizing plate 134. At this time, first polarization direction d1 of the first linearly polarized light entering reflective polarizing plate 134 is the same as the direction of the transmission axis of reflective polarizing plate 134. Accordingly, the first linearly polarized light entering reflective polarizing plate 134 passes through reflective polarizing plate 134.

As illustrated in FIG. 26, the first linearly polarized light passing through reflective polarizing plate 134 passes through dust cover 128 and enters eye 32 of driver 10 (see FIG. 22).

[10-3. Advantageous Effects]

As described above, in the present embodiment, light reflected again by reflection surface 138 of mirror 122 passes through reflective polarizing plate 134, and thereafter enters eye 32 of driver 10. Accordingly, only first linearly polarized light reflected again by reflection surface 138 of mirror 122 passes through reflective polarizing plate 134, whereas unnecessary light other than the first linearly polarized light (light that does not contribute to displaying a rear-view image) is blocked by reflective polarizing plate 134. The unnecessary light includes sunlight entering from the rear of vehicle 4 (see FIG. 21) through dust cover 128 for opening 126. As a result, the accuracy of displaying a rear-view image can be increased. Furthermore, a rise in temperature caused by sunlight being collected by mirror 122 can be reduced.

Embodiment 11

[11-1. Configuration of Display System]

Figure 28:
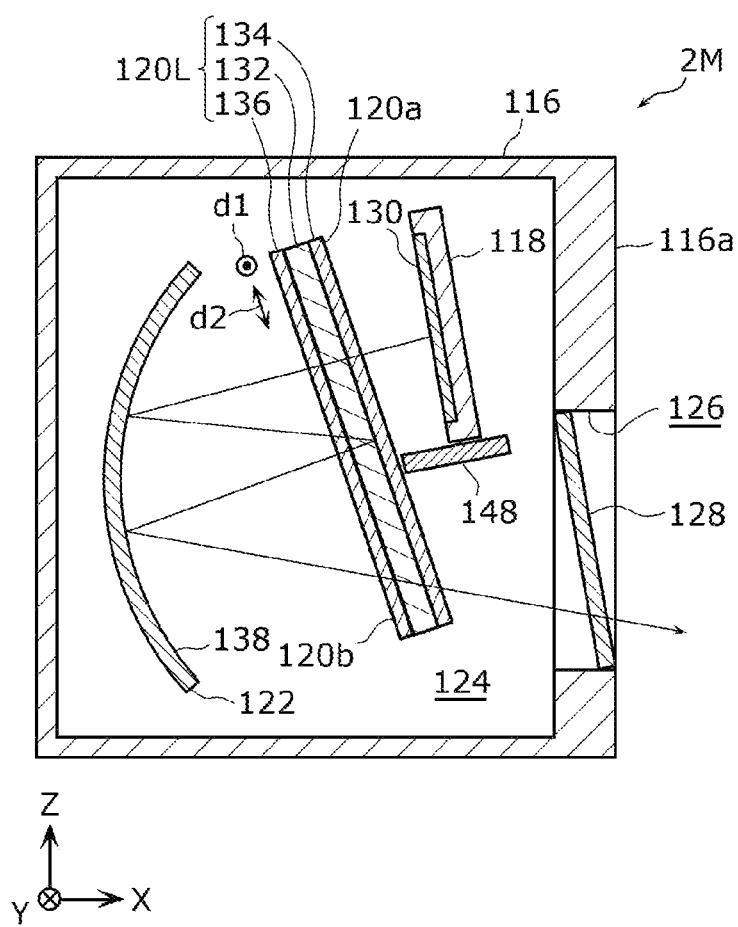
FIG. 28 is a cross-sectional view of a display system according to Embodiment 11.

A configuration of display system 2M according to Embodiment 11 is to be described with reference to FIG. 28. FIG. 28 is a cross-sectional view of display system 2M according to Embodiment 11.

As illustrated in FIG. 28, display system 2M according to Embodiment 11 includes light-blocking member 148, in addition to the elements described in Embodiment 10 above. Light-blocking member 148 is formed of a light-blocking material, and is formed into a flat plate elongated in the lateral direction, for example. Light-blocking member 148 is stored in storage space 124 of casing 116, and is disposed between display element 118 and opening 126 of casing 116.

[11-2. Advantageous Effects]

Most of the light emitted through display surface 130 of display element 118 (hereinafter, referred to as "display light") passes through reflective polarizing plate 134 of optical element 120L. A portion of the light emitted through display surface 130 of display element 118 (hereinafter, referred to as "surface reflected light") is reflected by reflective polarizing plate 134 of optical element 120L.

As described above, in the present embodiment, light-blocking member 148 is disposed between display element 118 and opening 126 of casing 116, and thus surface reflected light that is reflected by reflective polarizing plate 134 of optical element 120L can be prevented from reaching opening 126 of casing 116. As a result, this can reduce reflection of such surface reflected light in a rear-view image due to the surface reflected light being superposed on display light.

Embodiment 12

[12-1. Configuration of Display System]

Figure 29:
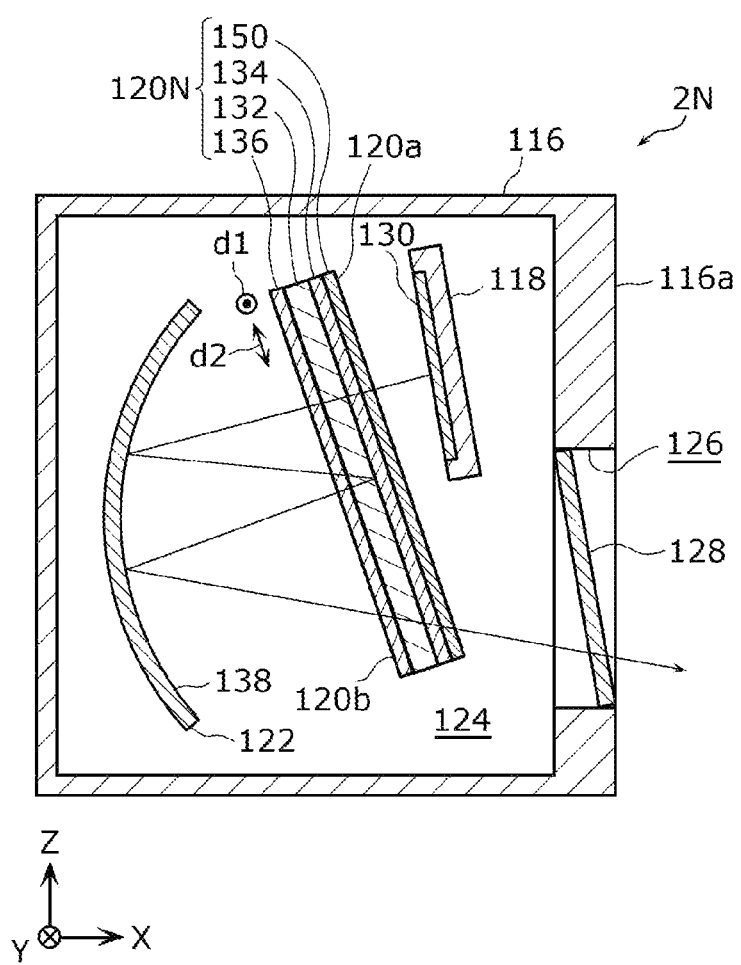
FIG. 29 is a cross-sectional view of a display system according to Embodiment 12.

A configuration of display system 2N according to Embodiment 12 is to be described with reference to FIG. 29. FIG. 29 is a cross-sectional view of display system 2N according to Embodiment 12.

As illustrated in FIG. 29, the configuration of optical element 120N is different from Embodiment 10 described above, in display system 2N according to Embodiment 12. Specifically, optical element 120N includes transmissive polarizing plate 150, in addition to glass substrate 132, reflective polarizing plate 134, and wave plate 136. Optical element 120N has a configuration in which transmissive polarizing plate 150, reflective polarizing plate 134, glass substrate 132, and wave plate 136 are stacked in this order with transmissive polarizing plate 150 being closest to display surface 130 of display element 118. Thus, transmissive polarizing plate 150 is disposed between display element 118 and reflective polarizing plate 134. Transmissive polarizing plate 150 covers the entire region of the surface of reflective polarizing plate 134 facing display element 118.

Out of light impinging onto transmissive polarizing plate 150, transmissive polarizing plate 150 transmits first linearly polarized light having first polarization direction d1, and absorbs second linearly polarized light having second polarization direction d2. Thus, the transmission axis of transmissive polarizing plate 150 is in the same direction as first polarization direction d1, whereas the absorption axis of transmissive polarizing plate 150 is in the same direction as second polarization direction d2, and the axes are perpendicular to each other.

[12-2. Operation of Display System]

Next, an operation of display system 2N according to Embodiment 12 is to be described with reference to FIG. 29.

As illustrated in FIG. 29, first linearly polarized light emitted through display surface 130 of display element 118 passes through transmissive polarizing plate 150 and travels into reflective polarizing plate 134. After that, light passing through transmissive polarizing plate 150 (i) is reflected by reflection surface 138 of mirror 122, (ii) is reflected by reflective polarizing plate 134, and (iii) is reflected by reflection surface 138 of mirror 122 again, similarly to Embodiment 9 described above.

After that, light reflected again by reflection surface 138 of mirror 122 (second circularly polarized light) is converted into first linearly polarized light by wave plate 136, and passes through glass substrate 132 and reflective polarizing plate 134, similarly to Embodiment 10 described above. After that, in the present embodiment, the first linearly polarized light passing through reflective polarizing plate 134 passes through transmissive polarizing plate 150, travels toward dust cover 128, passes through dust cover 128, and enters eye 32 of driver 10 (see FIG. 22).

[12-3. Advantageous Effects]

In the present embodiment, transmissive polarizing plate 150 covers the entire region of the surface of reflective polarizing plate 134 facing display element 118, and thus when unnecessary light that does not contribute to displaying an image enters transmissive polarizing plate 150, transmissive polarizing plate 150 can absorb the unnecessary light. As a result, reflection of such unnecessary light in a rear-view image displayed on display surface 130 of display element 118 can be reduced.

Embodiment 13

[13-1. Configuration of Display System]

Figure 30:
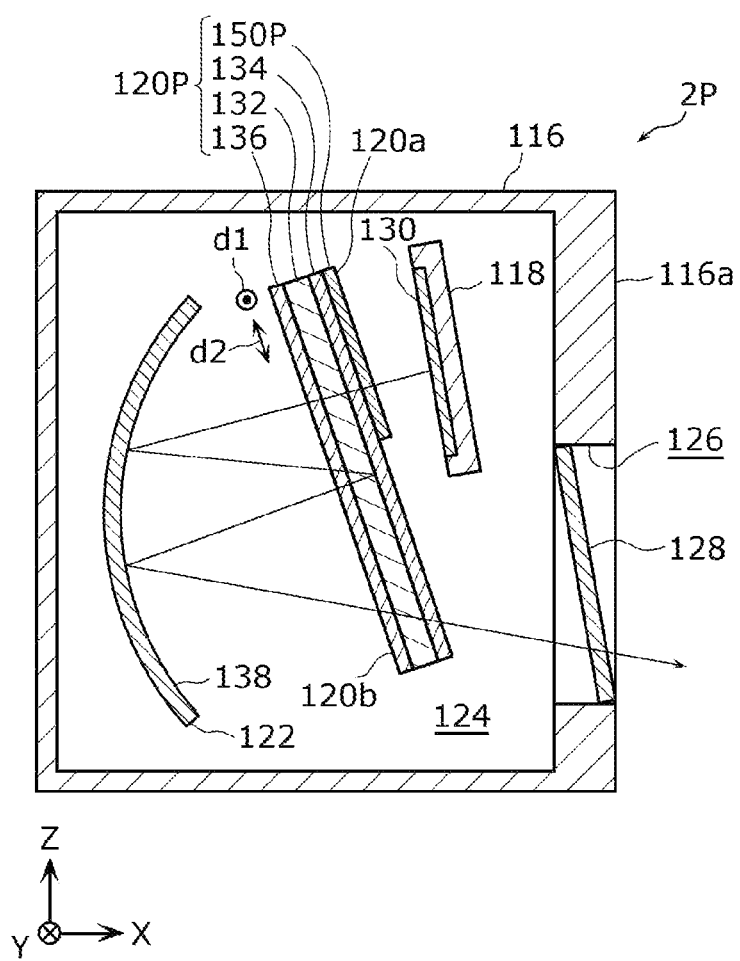
FIG. 30 is a cross-sectional view of a display system according to Embodiment 13.

A configuration of display system 2P according to Embodiment 13 is to be described with reference to FIG. 30. FIG. 30 is a cross-sectional view of display system 2P according to Embodiment 13.

In display system 2P according to Embodiment 13, the size of transmissive polarizing plate 150P of optical element 120P is different from Embodiment 12 described above, as illustrated in FIG. 30. Specifically, transmissive polarizing plate 150P covers only a region in which light emitted through display surface 130 of display element 118 enters, of the surface of reflective polarizing plate 134 facing display element 118.

[13-2. Advantageous Effects]

In the present embodiment, transmissive polarizing plate 150P covers only a region in which light emitted through display surface 130 of display element 118 enters, of the surface of reflective polarizing plate 134 facing display element 118, and thus surface reflected light as described above can be prevented from being reflected by reflective polarizing plate 134. As a result, reflection of such surface reflected light in a rear-view image displayed on display surface 130 of display element 118 can be reduced.

Embodiment 14

[14-1. Configuration of Display System]

A configuration of display system 2Q according to Embodiment 14 is to be described with reference to FIG. 31.

Figure 31:
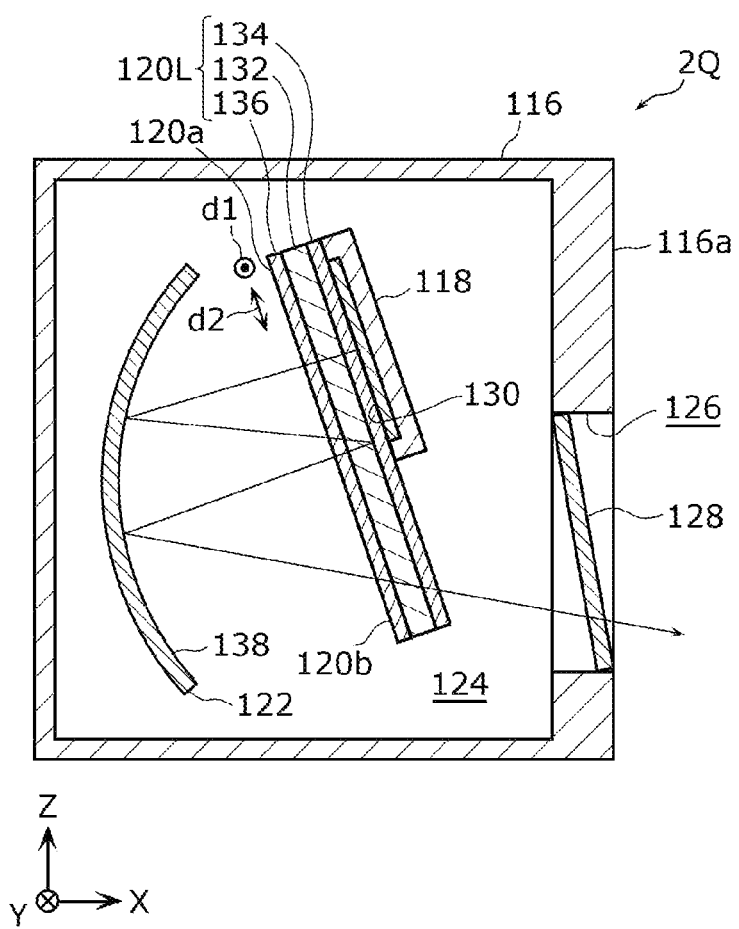
FIG. 31 is a cross-sectional view of a display system according to Embodiment 14.

FIG. 31 is a cross-sectional view of display system 2Q according to Embodiment 14.

In display system 2Q according to Embodiment 14, display surface 130 of display element 118 is in contact with the surface of reflective polarizing plate 134 facing display element 118, as illustrated in FIG. 31. The other configuration of display system 2Q is the same as that of Embodiment 10 described above.

[14-2. Advantageous Effects]

In the present embodiment, display surface 130 of display element 118 is in contact with the surface of reflective polarizing plate 134 facing display element 118, and thus the distance between display element 118 and reflective polarizing plate 134 can be shortened so that the size of display system 2Q can be reduced.

Embodiment 15

[15-1. Configuration of Display System]

Figure 32:
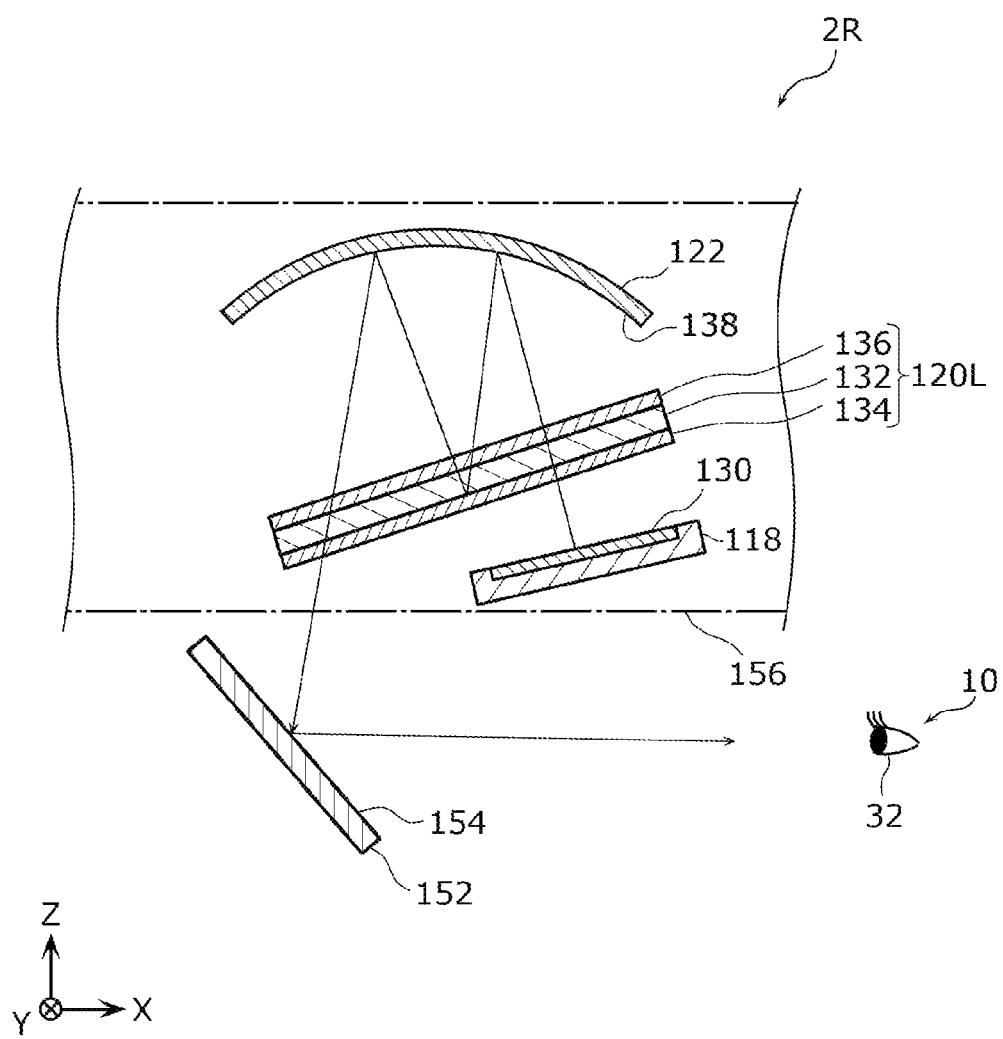
FIG. 32 is a cross-sectional view of a display system according to Embodiment 15.

A configuration of display system 2R according to Embodiment 15 is to be described with reference to FIG. 32. FIG. 32 is a cross-sectional view of display system 2R according to Embodiment 15.

In display system 2R according to Embodiment 15, display element 118, optical element 120L, and mirror 122 are disposed in overhead console 156 of vehicle 4 (see FIG. 21), as illustrated in FIG. 32. Display element 118 is disposed on ceiling 94 of vehicle 4, and also mirror 122 is disposed on ceiling 94.

Display system 2R includes mirror 152 (an example of a second mirror), in addition to display element 118, optical element 120L, and mirror 122. Mirror 152 is a plane mirror, and includes planar reflection surface 154. Mirror 152 is formed by depositing a reflecting metal film such as an aluminum film on the surface of a resin-molded member, for example. Mirror 152 is disposed such that reflection surface 154 faces the surface of reflective polarizing plate 134 that faces display element 118. Note that mirror 152 is supported by a supporting member (not illustrated) disposed under overhead console 156, for example.

[15-2. Operation of Display System]

Next, an operation of display system 2R according to Embodiment 15 is to be described with reference to FIG. 32.

As illustrated in FIG. 32, light emitted through display surface 130 of display element 118 (i) is reflected by reflection surface 138 of mirror 122, (ii) is reflected by reflective polarizing plate 134, and (iii) is reflected by reflection surface 138 of mirror 122 again, similarly to Embodiment 9 described above.

After that, light reflected again by reflection surface 138 of mirror 122 (second circularly polarized light) is converted into first linearly polarized light by wave plate 136, and passes through glass substrate 132 and reflective polarizing plate 134, similarly to Embodiment 10 described above. After that, in the present embodiment, the first linearly polarized light passing through reflective polarizing plate 134 travels toward mirror 152, is reflected by reflection surface 154 of mirror 152, and enters eye 32 of driver 10.

[15-3. Advantageous Effects]

In the present embodiment, display system 2R is disposed such that reflection of light back and forth between reflective polarizing plate 134 and mirror 122 is in the vertical direction, thus decreasing the thickness of display system 2R in the up-and-down direction. As a result, the view of driver 10 can be ensured. Since mirror 152 is a plane mirror, sunlight entering from the rear of vehicle 4 is hardly collected. Thus, a rise in temperature due to light being collected can be reduced.

Note that display system 2R may include a half mirror, instead of mirror 152 described above. Accordingly, driver 10 can see an image formed by light reflected by mirror 152 superposed on a view seen ahead of vehicle 4 through the half mirror. Thus, display system 2R is used as a head-up display (HUD) for a vehicle.

Embodiment 16

[16-1. Configuration of Display System]

Figure 33:
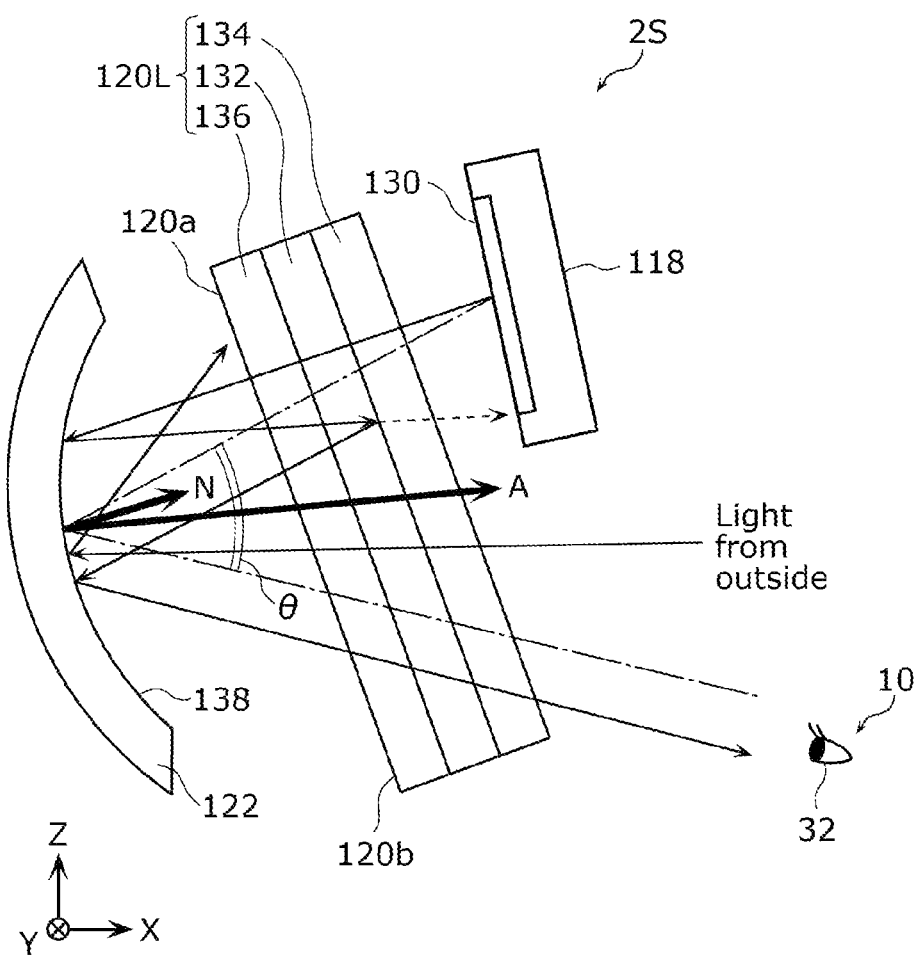
FIG. 33 is a schematic diagram illustrating a display system according to Embodiment 16.

A configuration of display system 2S according to Embodiment 16 is to be described with reference to FIG. 33. FIG. 33 is a schematic diagram illustrating display system 2S according to Embodiment 16.

As illustrated in FIG. 33, in display system 2S according to Embodiment 16, in the XZ side view of display system 2S, normal vector N at the center of reflection surface 138 of mirror 122 extends along an axis closer to the center of display surface 130 than an axis along which half-angle vector A extends, half-angle vector A dividing angle G (for example, 35 degrees) into two, angle G being formed between (i) a line that connects the center of display surface 130 of display element 118 and the center of reflection surface 138 of mirror 122 and (ii) a line that connects the center of reflection surface 138 of mirror 122 and eye 32 of driver 10. The distance between mirror 122 and upper end portion 120a of optical element 120L is shorter than the distance between mirror 122 and lower end portion 120b of optical element 120L.

Note that in the XZ side view of display system 2S, optical element 120L is set at an angle relative to the vertical direction (the Z-axis direction), which allows light emitted through display surface 130 of display element 118 enters eye 32 of driver 10 after traveling back and forth twice between reflective polarizing plate 134 and mirror 122. Also when display system 2S is rotated relative to ball joint 38 (see FIG. 21), the positional relation between normal vector N and half-angle vector A is constant.

Accordingly, as shown by the broken line arrow in FIG. 33, out of the light emitted through display surface 130 of display element 118, a portion of light reflected once by reflection surface 138 of mirror 122 passes through optical element 120L and travels toward display surface 130 of display element 118. As a result, the light reflected only once by mirror 122 can be prevented from reaching eye 32 of driver 10, and reflection of such light in an image displayed on display surface 130 of display element 118 can be prevented.

Further, out of the light emitted through display surface 130 of display element 118, light reflected by reflection surface 138 of mirror 122 three times or more passes through optical element 120L and travels toward a position lower than eye 32 of driver 10. As a result, the light reflected three times or more by mirror 122 can be prevented from reaching eye 32 of driver 10, and reflection of such light in an image displayed on display surface 130 of display element 118 can be prevented.

Furthermore, when light from the outside entering from the rear of vehicle 4 enters optical element 120L, the light from the outside passes through optical element 120L, and thereafter is reflected by reflection surface 138 of mirror 122. At this time, the light from the outside reflected by reflection surface 138 of mirror 122 passes through optical element 120L and travels toward display surface 130 of display element 118. As a result, the light from the outside can be prevented from reaching eye 32 of driver 10.

Figure 34:
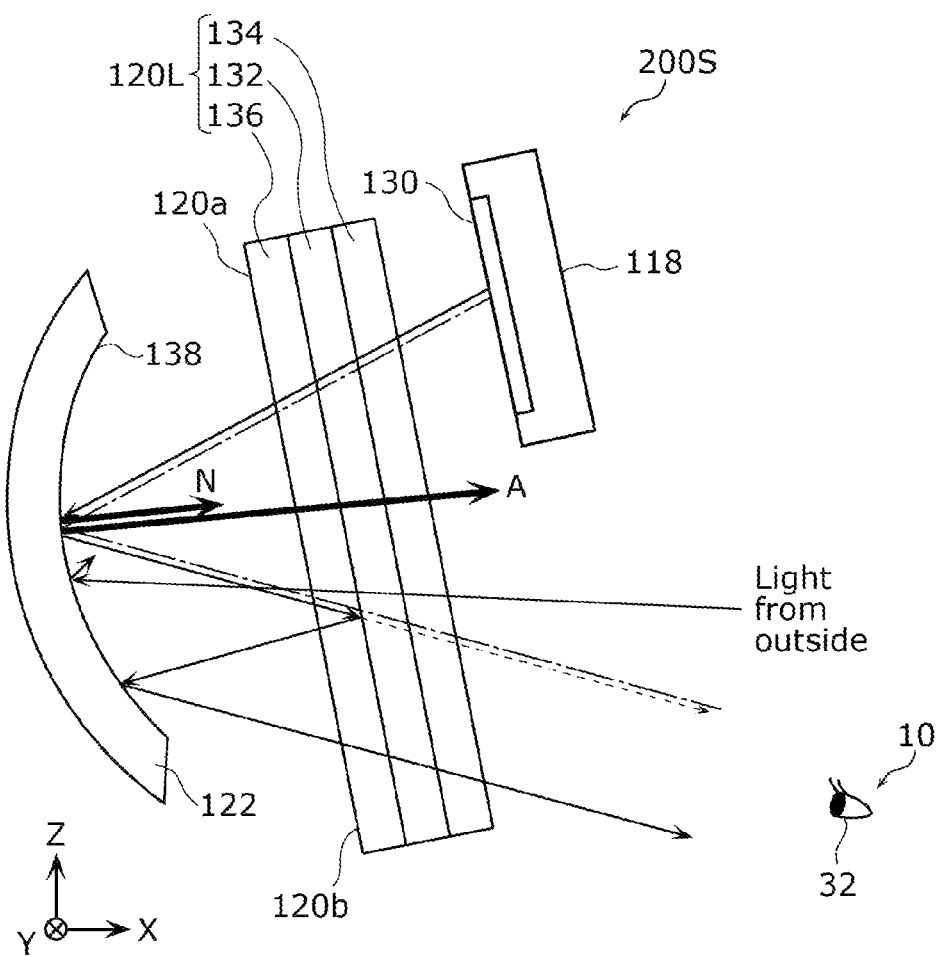
FIG. 34 is a schematic diagram illustrating a display system according to a comparative example.
Figure 35:
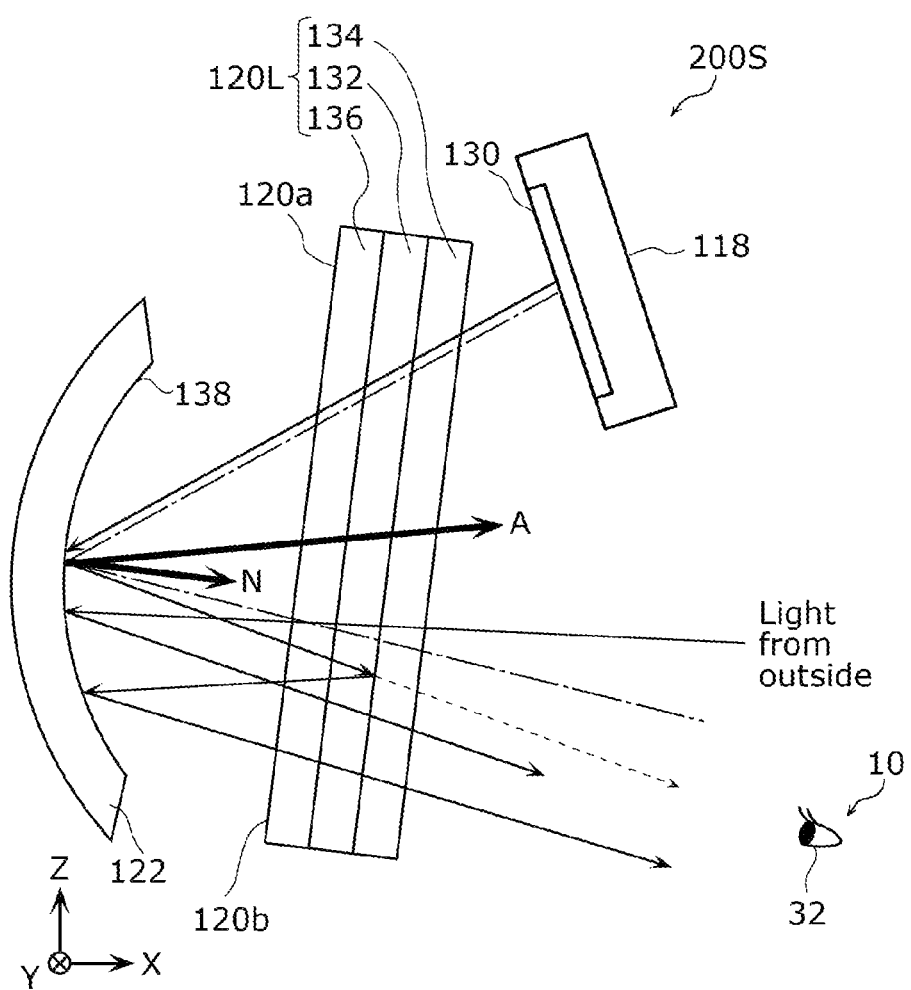
FIG. 35 is a schematic diagram illustrating a display system according to a comparative example.

FIG. 34 and FIG. 35 are schematic diagrams each illustrating display system 200S according to a comparative example. As illustrated in FIG. 34, in display system 200S according to the comparative example, normal vector N overlaps half-angle vector A in the XZ side view of display system 200S. The distance between mirror 122 and upper end portion 120a of optical element 120L is substantially the same as the distance between mirror 122 and lower end portion 120b of optical element 120L. In this case, light reflected once or more by mirror 122 reaches eye 32 of driver 10, and thus such light is reflected in an image displayed on display surface 130 of display element 118.

On the other hand, in display system 200S according to another comparative example, normal vector N is on a side farther from display surface 130 relative to half-angle vector A in the XZ side view of display system 200S as illustrated in FIG. 35. The distance between mirror 122 and upper end portion 120a of optical element 120L is longer than the distance between mirror 122 and lower end portion 120b of optical element 120L. In this case, light reflected once or more by mirror 122 reaches eye 32 of driver 10, and thus such light is reflected in an image displayed on display surface 130 of display element 118. Further, when light from the outside entering from the rear of vehicle 4 enters optical element 120L, the light from the outside passes through optical element 120L, and thereafter is reflected by reflection surface 138 of mirror 122. At this time, light from the outside reflected by reflection surface 138 of mirror 122 passes through optical element 120L and reaches eye 32 of driver 10.

From the above, by adopting the configuration in FIG. 33, reflection can be prevented and also light from the outside can be prevented from reaching eye 32 of driver 10.

[16-2. Variation]

Figure 36:
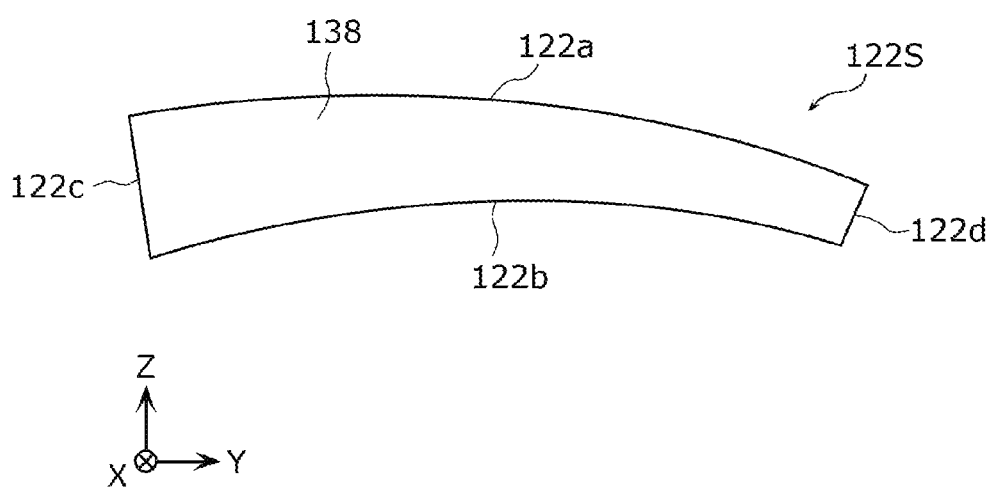
FIG. 36 is a front view of a mirror according to a variation.

FIG. 36 is a front view of mirror 122S according to a variation. As illustrated in FIG. 36, mirror 122S according to the variation is a concave mirror. In the YZ front view of mirror 122S, upper side 122a and lower side 122b of mirror 122S are each formed into a convex curved upward. Left side 122c and right side 122d of mirror 122S are each formed into a straight line, and the length of left side 122c (the vertical side farther from driver 10) is longer than right side 122d (the vertical side closer to driver 10). Stated differently, mirror 122S is formed into an arch, overall. Note that vehicle 4 is a right-hand drive vehicle.

Note that when vehicle 4 is a left-hand drive vehicle, the length of left side 122c (the vertical side closer to driver 10) is shorter than right side 122d (the vertical side farther from driver 10).

Accordingly, when driver 10 seated in driver seat 8 looks up at mirror 122S obliquely from below, the shape of a rear-view image reflected by reflection surface 138 of mirror 122S can be made to appear closer to a rectangle to driver 10.

Other Variations

The above has described the display systems according to one or more aspects based on the above embodiments, yet the present disclosure is not limited to these embodiments. The scope of the one or more aspects also encompasses embodiments as a result of adding, to the embodiments, various modifications that may be conceived by those skilled in the art, and embodiments obtained by combining elements in different embodiments, as long as the resultant embodiments do not depart from the gist of the present disclosure.

In Embodiments 9 to 16 described above, mirror 122 is a concave mirror, but is not limited thereto, and may be, for example, a Fresnel mirror having a Fresnel reflection surface.

Furthermore, the locations of optical elements such as concave mirror 26 and mirror 122, display element 12 (118), and eye 32 in the embodiments above are mere examples, and are not limited to those described.

In the embodiments above, optical element 28 (28A, 28C, 28G, 120, 120L, 120N, 120P) is formed into a flat plate, but the shape is not limited thereto and optical element 28G may be formed into a cylinder, for example.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specifications, drawings and claims are incorporated herein by reference in their entirety: Japanese Patent Application No. 2020-115490 filed on Jul. 3, 2020, Japanese Patent Application No. 2020-115555 filed on Jul. 3, 2020, and Japanese Patent Application No. 2021-040844 filed on Mar. 12, 2021.

INDUSTRIAL APPLICABILITY

The display system according to the present disclosure is applicable to, for instance, an electron mirror provided in a vehicle, for example.

The invention claimed is:

1. A display system that is provided in a mobile body and displays an image to a user, the display system comprising:
   a display element fixed to the mobile body and that includes a display surface through which light showing the image is emitted;
   an optical reflector that is supported rotatably relative to the mobile body, and includes:
     an entrance through which the light emitted through the display surface of the display element enters;
     an exit through which the light that has entered exits and travels toward an eye of the user;
     a first mirror that reflects the light emitted through the display surface of the display element; and
     an optical element disposed at the exit and between the display element and the first mirror, the optical element including a wave plate and a polarizing element, the optical element facing the first mirror, wherein;
   the first mirror and the optical element are each provided separately from the display element,
   the optical element (i) transmits reflected light resulting from the light emitted through the display surface of the display element being reflected by the first mirror, and (ii) reflects light from outside off a surface of the optical element, the surface facing the first mirror, the light from the outside entering the optical element from a side through which the reflected light exits, and being reflected by the first mirror, and
   the light emitted through the display surface of the display element passes through the optical element toward the first mirror, is reflected by the first mirror toward the optical element, is reflected by the optical element toward the first mirror, is reflected by the first mirror again toward the optical element, passes through the optical element, and enters the eye of the user.

2. The display system according to claim 1,
   wherein the optical reflector further includes:
     a second mirror that faces the display surface of the display element, and is disposed on an optical path between the display surface of the display element and the first mirror.

3. The display system according to claim 2,
   wherein the second mirror faces the optical element,
   the polarizing element is a reflective polarizing plate, and
   the light emitted through the display surface of the display element is reflected by the second mirror toward the optical element, is reflected by the optical element toward the first mirror, is reflected by the first mirror toward the optical element, passes through the optical element, and enters the eye of the user.

4. The display system according to claim 2,
   wherein the optical reflector further includes a half mirror disposed between the first mirror and the second mirror, and
   the light emitted through the display surface of the display element is reflected by the second mirror toward the half mirror, passes through the half mirror toward the first mirror, is reflected by the first mirror toward the half mirror, is reflected by the half mirror toward the optical element, passes through the optical element, and enters the eye of the user.

5. The display system according to claim 1,
   wherein the mobile body includes a storage,
   the display element and the entrance of the optical reflector are stored in the storage, and
   the exit of the optical reflector is exposed outside the storage.

6. The display system according to claim 1,
   wherein in a top view, the display element and the first mirror are tilted relative to a direction in which the mobile body moves, and are disposed substantially parallel to each other.

7. The display system according to claim 1,
   wherein the optical element further includes a liquid-crystal optical element for switching between a transmission mode for transmitting incident light and a reflection mode for reflecting incident light.

8. The display system according to claim 1, further comprising:
   a holding member for maintaining a positional relation between the display element and the optical reflector by holding the display element and the optical reflector, the holding member being disposed in the mobile body.

9. The display system according to claim 1,
   wherein first linearly polarized light showing the image is emitted through the display surface of the display element,
   the first mirror faces toward the display surface of the display element,
   the polarizing element is a reflective polarizing plate that is disposed between the display element and the first mirror, transmits the first linearly polarized light, and reflects second linearly polarized light having a polarization direction different from a polarization direction of the first linearly polarized light,
   the wave plate is disposed between the reflective polarizing plate and the first mirror, and
   the first linearly polarized light emitted through the display surface of the display element (a) passes through the reflective polarizing plate and travels toward the wave plate, (b) is converted by the wave plate into first circularly polarized light and travels toward the first mirror, (c) is reflected by the first mirror and travels toward the wave plate, (d) is converted by the wave plate into the second linearly polarized light and travels toward the reflective polarizing plate, (e) is reflected by the reflective polarizing plate and travels toward the wave plate, (f) is converted by the wave plate into second circularly polarized light having a polarization direction different from a polarization direction of the first circularly polarized light and travels toward the first mirror, and (g) is reflected again by the first mirror and enters the eye of the user.

10. The display system according to claim 9, wherein the second circularly polarized light reflected again by the first mirror further (h) travels toward the wave plate, (i) is converted by the wave plate into the first linearly polarized light and travels toward the reflective polarizing plate, and (j) passes through the reflective polarizing plate and enters the eye of the user.

11. The display system according to claim 9, further comprising:
a frame that includes an opening, and is opposed to the first mirror with the display element being provided therebetween,
wherein the second circularly polarized light reflected again by the first mirror enters the eye of the user through the opening.

12. The display system according to claim 9, wherein the first mirror and the reflective polarizing plate are disposed non-parallel to each other.

13. The display system according to claim 9, wherein the first mirror is a concave mirror or a Fresnel mirror.

14. The display system according to claim 9, wherein the reflective polarizing plate is cylindrical.

15. The display system according to claim 9, wherein the first mirror includes:
a first reflection region in which the first circularly polarized light from the wave plate is reflected; and
a second reflection region in which the second circularly polarized light from the wave plate is reflected, and
a portion of the first reflection region overlaps a portion of the second reflection region.

16. The display system according to claim 10, further comprising:
a second mirror facing a surface of the reflective polarizing plate, the surface facing the display element,
wherein the first linearly polarized light passing through the reflective polarizing plate further (k) travels toward the second mirror, and (l) is reflected by the second mirror and enters the eye of the user.

17. The display system according to claim 9, wherein the first mirror is a concave mirror, and
in a side view of the display system, a normal vector at a center of a reflection surface of the first mirror extends along an axis closer to a center of the display surface than an axis along which a half-angle vector extends, the half-angle vector dividing an angle into two, the angle being formed between (i) a line that connects the center of the display surface of the display element and the center of the reflection surface of the first mirror and (ii) a line that connects the center of the reflection surface of the first mirror and the eye of the user.

18. The display system according to claim 1, wherein the optical reflector further includes a half mirror disposed on an optical path.

* * * * *